(12) United States Patent
Kim

(10) Patent No.: US 12,739,713 B2
(45) Date of Patent: Sep. 15, 2026

(54) EARLY SYNCHRONIZATION IN WIRELESS COMMUNICATION SYSTEM

(71) Applicant: Samsung Electronics Co., Ltd., Suwon-si (KR)

(72) Inventor: Donggun Kim, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 18/894,663

(22) Filed: Sep. 24, 2024

(65) Prior Publication Data

US 2025/0106705 A1 Mar. 27, 2025

(30) Foreign Application Priority Data

Sep. 25, 2023 (GB) .................................... 2314675
Aug. 23, 2024 (GB) .................................... 2412447

(51) Int. Cl.
*H04W 36/00* (2009.01)
*H04W 36/08* (2009.01)

(52) U.S. Cl.
CPC ....... *H04W 36/0072* (2013.01); *H04W 36/08* (2013.01)

(58) Field of Classification Search
None
See application file for complete search history.

(56) References Cited

U.S. PATENT DOCUMENTS

2020/0344817 A1* 10/2020 Chen .................... H04W 24/04
2021/0159967 A1* 5/2021 Cirik ..................... H04B 7/024
2021/0195547 A1 6/2021 Pezeshki et al.
2021/0385708 A1 12/2021 Damnjanovic et al.
2022/0124786 A1* 4/2022 Mukherjee ............. H04L 5/001

FOREIGN PATENT DOCUMENTS

WO 2024/086336 A1 4/2024

OTHER PUBLICATIONS

Media Tek Inc et al., 38.300 running CR for introduction of NR further mobility enhancements, R2-2309335, 3GPP TSG-RAN WG2 Meeting #123, Sep. 11, 2023, Toulouse, France.

(Continued)

*Primary Examiner* — Robert M Morlan
(74) *Attorney, Agent, or Firm* — Jefferson IP Law, LLP

(57) ABSTRACT

The disclosure relates to a fifth-generation (5G) or sixth-generation (6G) communication system for supporting a higher data transmission rate. A method performed by a user equipment (UE) in a wireless communication system is provided. The method comprises receiving, from a base station, a physical downlink control channel (PDCCH) order for a random access procedure on a layer 1/layer 2 triggered mobility (LTM) candidate cell, transmitting a random access preamble for an early timing advance (TA) acquisition for the LTM candidate cell, based on the PDCCH order and receiving, from the base station, a cell switch command including a TA value of the LTM candidate cell, wherein a bandwidth part (BWP) operation is not performed for the LTM candidate cell based on the random access procedure being initiated by the PDCCH order.

20 Claims, 21 Drawing Sheets

(56) References Cited

OTHER PUBLICATIONS

LG Electronics Inc. et al., Discussion on BWP operation by PDCCH-order based RACH for a candidate cell, R2-2308745, 3GPP TSG-RAN WG2 Meeting #123, Aug. 11, 2023, Toulouse, France.
Huawei et al., 38.321 running CR for introduction of NR further mobility enhancements, R2-2309281, 3GPP TSG-RAN2 Meeting #123, Sep. 11, 2023, Toulouse, France.
International Search Report dated Jan. 6, 2025, issued in International Application No. PCT/KR2024/014383.
Huawei et al., RRC aspects for LTM, R2-2307610, 3GPP TSG-RAN WG2 Meeting #123, Aug. 11, 2023, Toulouse, France.
GB Search Report dated Feb. 14, 2025, issued in GB Application No. GB2412447.1.

* cited by examiner

FIG.11

EARLY SYNCHRONIZATION IN WIRELESS COMMUNICATION SYSTEM

CROSS-REFERENCE TO RELATED APPLICATION(S)

This application is based on and claims priority under 35 U.S.C. § 119(a) of a United Kingdom patent application number 2314675.6, filed on Sep. 25, 2023, in the United Kingdom Intellectual Property Office, and of a United Kingdom patent application number 2412447.1, filed on Aug. 23, 2024, in the United Kingdom Intellectual Property Office, the disclosure of each of which is incorporated by reference herein its entirety.

BACKGROUND

1. Field

The disclosure relates to improvement relating to early synchronization in a wireless communication system.

2. Description of Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as millimeter wave (mmWave) including 28 GHz and 39 GHz. In addition, it has been considered to implement 6th generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple input multiple output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

A method performed by a user equipment (UE) in a wireless communication system is provided. The method comprises receiving, from a base station, a physical downlink control channel (PDCCH) order for a random access procedure on a layer 1/layer 2 triggered mobility (LTM) candidate cell, transmitting a random access preamble for an early timing advance (TA) acquisition for the LTM candidate cell, based on the PDCCH order and receiving, from the base station, a cell switch command including a TA value of the LTM candidate cell, wherein a bandwidth part (BWP) operation is not performed for the LTM candidate cell based on the random access procedure being initiated by the PDCCH order.

A method performed by a base station in a wireless communication system is provided. The method comprises transmitting, to a user equipment (UE), a physical downlink control channel (PDCCH) order for a random access procedure on a layer 1/layer 2 triggered mobility (LTM) candidate cell and transmitting, to the UE, a cell switch command including a timing advance (TA) value of the LTM candidate cell, wherein a random access preamble for an early TA acquisition for the LTM candidate cell is based on the PDCCH order, and wherein a bandwidth part (BWP) operation is not performed for the LTM candidate cell based on the random access procedure being initiated by the PDCCH order.

A user equipment (UE) in a wireless communication system is provided. The UE comprises a transceiver and a controller coupled with the transceiver and configured to receive, from a base station, a physical downlink control channel (PDCCH) order for a random access procedure on a layer 1/layer 2 triggered mobility (LTM) candidate cell, transmit a random access preamble for an early timing advance (TA) acquisition for the LTM candidate cell, based on the PDCCH order, and receive, from the base station, a cell switch command including a TA value of the LTM candidate cell, wherein a bandwidth part (BWP) operation is not performed for the LTM candidate cell based on the random access procedure being initiated by the PDCCH order.

A base station in a wireless communication system is provided. The base station comprises a transceiver and a controller coupled with the transceiver and configured to transmit, to a user equipment (UE), a physical downlink control channel (PDCCH) order for a random access procedure on a layer 1/layer 2 triggered mobility (LTM) candidate cell, and transmit, to the UE, a cell switch command including a timing advance (TA) value of the LTM candidate cell, wherein a random access preamble for an early TA acquisition for the LTM candidate cell is based on the PDCCH order, and wherein a bandwidth part (BWP) operation is not performed for the LTM candidate cell based on the random access procedure being initiated by the PDCCH order.

Aspects of the disclosure are to address at least the above-mentioned problems and/or disadvantages and to provide at least the advantages described below. Accordingly, an aspect of the disclosure is to provide an improvement relating to early synchronization in wireless communication system.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and its advantages, of certain embodiments of the disclosure will be more apparent from the following description taken in conjunction with the accompanying drawings, in which:

FIG. 11 illustrates various Random Access Procedures according to an embodiment of the disclosure;

The same reference numerals are used to represent the same elements throughout the drawings.

DETAILED DESCRIPTION

Figure 1:
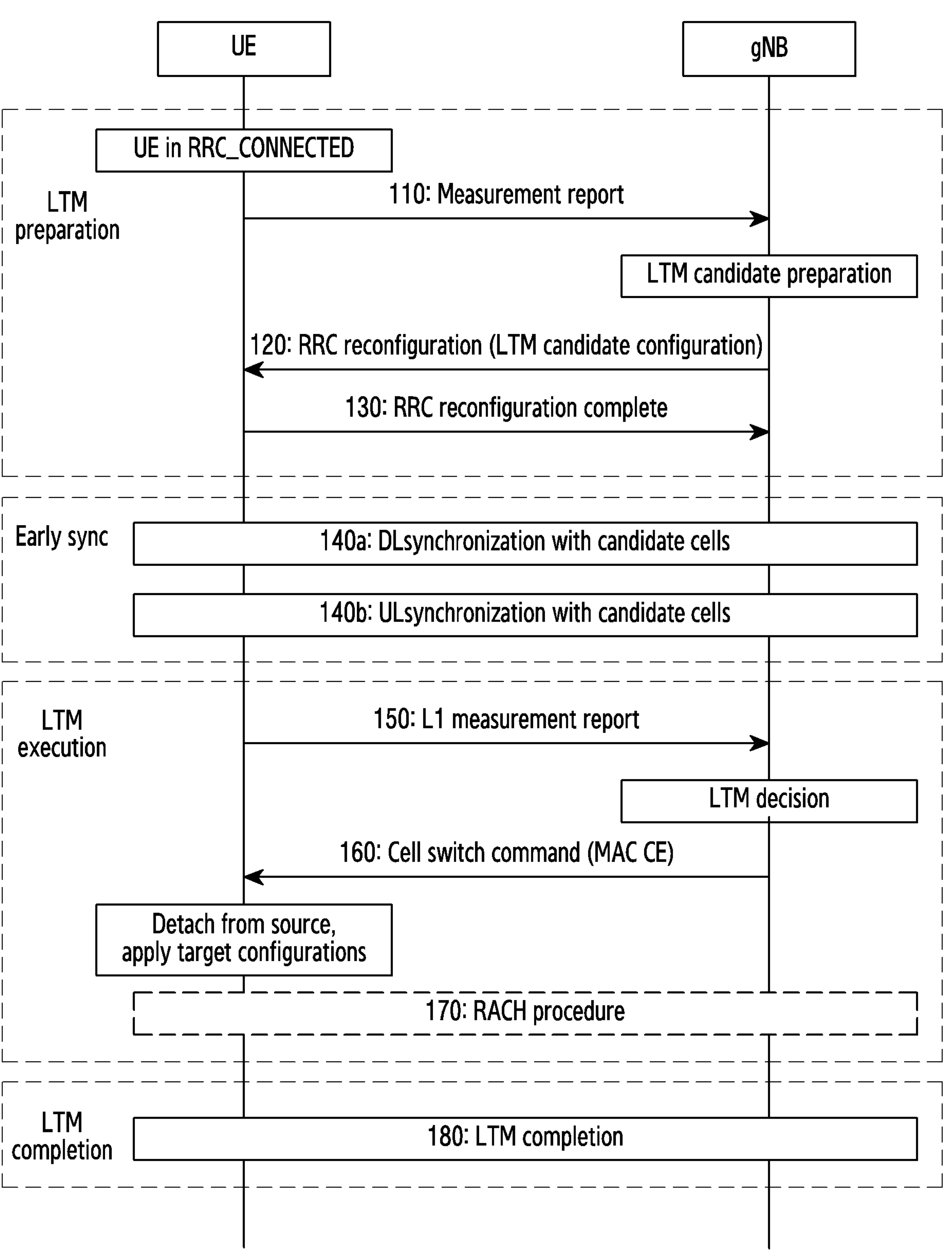
FIG. 1 illustrates a signalling procedure for local traffic manager (LTM) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

The disclosure supports layer 1 (L1)/layer 2 (L2)-Triggered Mobility (Triggered Mobility)) with low latency, low complexity and no user plane (UP) data loss. It also takes into account the impacts on the legacy behaviors in order to ensure that this LTM cell switch feature does not conflict with them. Moreover, methods are provided to support LTM cell switch for a UE configured with dual connectivity (DC), e.g. LTM cell switch for Secondary cell group (SCG). This disclosure also provides solutions to handle failure cases for LTM execution in order to recover quickly.

Throughout the following, certain definitions are used, as listed below:

Physical downlink control channel (PDCCH) occasion: A time duration (i.e. one or a consecutive number of symbols) during which the MAC entity is configured to monitor the PDCCH.

Serving Cell: A PCell, a PSCell, or an SCell.

Special Cell (SpCell): For Dual Connectivity operation the term Special Cell refers to the PCell of the master cell group (MCG) or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.

Timing Advance Group: A group of Serving Cells that is configured by RRC and that, for the cells with a UL configured, using the same timing reference cell and the same Timing Advance value. A Timing Advance Group containing the SpCell of a MAC entity is referred to as Primary Timing Advance Group (PTAG), whereas the term Secondary Timing Advance Group (STAG) refers to other TAGs.

Msg3: Message transmitted on UL-SCH containing a C-RNTI MAC control element (CE) or common control channel (CCCH) service data unit (SDU), submitted from upper layer and associated with the UE Contention Resolution Identity, as part of a Random Access procedure.

LTM candidate cell: A candidate cell configured to the UE as specified by LTM candidate cell configuration (i.e. LTM-CandidateConfig) for LTM in RRC layer.

Multi-Radio Dual Connectivity (MR-DC) is a generalization of the Intra-E-UTRA Dual Connectivity (DC), where a multiple Rx/Tx capable UE may be configured to utilize resources provided by two different nodes connected via non-ideal backhaul, one providing NR access and the other one providing either E-UTRA or NR access. One node acts as the MN (Master Node or MCG (Master Cell Group)) and the other as the SN (Secondary Node or SCG (Secondary Cell Group)). The MN and SN are connected via a network interface and at least the MN is connected to the core network.

MR-DC with the EPC: E-UTRAN supports MR-DC via E-UTRA-NR Dual Connectivity (EN-DC), in which a UE is connected to one eNB that acts as a MN and one en-gNB that acts as a SN. The eNB is connected to the EPC via the S1 interface and to the en-gNB via the X2 interface. The en-gNB might also be connected to the EPC via the S1-U interface and other en-gNBs via the X2-U interface.

MR-DC with the 5GC: NG-RAN supports NG-RAN E-UTRA-NR Dual Connectivity (NGEN-DC), in which a UE is connected to one ng-eNB that acts as a MN and one gNB that acts as a SN. NG-RAN supports NR-E-UTRA Dual Connectivity (NE-DC), in which a UE is connected to one gNB that acts as a MN and one ng-eNB that acts as a SN. NG-RAN supports NR-NR Dual Connectivity (NR-DC), in which a UE is connected to one gNB that acts as a MN and another gNB that acts as a SN. In addition, NR-DC can also be used when a UE is connected to a single gNB, acting both as a MN and as a SN, and configuring both MCG and SCG.

Herein, the term "cell switch" for the procedure of triggering change of cells via the LTM feature and use the term "Subsequent LTM" for the case when cell switch between L1/L2 mobility candidates is done without RRC reconfiguration in between.

Further, the reception of LTM triggering MAC CE (i.e. LTE Command MAC CE) indicates the triggering of LTM cell switch execution (i.e. LTM cell switch procedure).

It is an aim of an embodiment of the disclosure to provide improvements in the arena of LTM, particularly with regard to synchronization.

According to the disclosure there is provided an apparatus and method as set forth in the appended claims. Other features of the disclosure will be apparent from the dependent claims, and the description which follows.

To expedite LTM cell switch procedure, it would be beneficial to perform downlink synchronization and uplink synchronization in advance before triggering LTM cell switch execution as UE starts synchronization with the network during LTM cell switch execution which causes delay. In embodiments of this invention, early downlink synchronization and early uplink synchronization are defined separately, as described herein. Downlink (DL) and Uplink (UL) Bandwidth Part (BWP) handling are described, including how to activate/deactivate which BWP for LTM candidate cells and at what point because, in NR, the radio link between the network and UE is maintained on the specific Bandwidth Part (BWP), e.g. initial BWP, default BWP, first Active BWP or dormant BWP, and the corresponding BWP behaviors have a big impact on UE power saving. Specifically, the corresponding BWP behaviors during early downlink/uplink synchronizations are described. To maximize the benefits of early downlink/uplink synchronizations, the possible execution orders are proposed. For early uplink synchronization, additional BWP behaviors are defined for a newly-defined random access procedure to avoid UE power consumption and save radio resources.

In early uplink synchronization, for MAC entity, a new power ramping procedure is provided to make early uplink synchronization procedure more successful, i.e. the more the UE sends preamble, the more power UE transmits, which make the early uplink synchronization more successful. To make it efficient, additional conditions are provided to manage the variable called PREAMBLE_POWER_RAMPING_COUNTER. Moreover, when UE performs early uplink synchronization, the preamble (re)transmission is the main action and thus the preamble resource should be defined, e.g. when UE keeps it or discards it at what point. In the prior art, parallel random access procedures are not supported. However, another random access procedure may be triggered at UE side during early uplink synchronization procedure. To avoid this, a new condition is provided. Additionally, several solutions to make LTM cell switch procedure work correctly are described.

According to a first aspect of the disclosure, there is provided a method of a User Equipment, UE, performing a random access for early synchronization procedure in a telecommunication network, wherein the random access procedure is initiated on an LTM candidate cell by a PDCCH order and if the PDCCH order indicates preamble initial transmission, then the UE is prohibited from performing a certain action in connection with BWP behavior.

In an embodiment, the certain action is one or more of:
- transmitting on UL-SCH on the BWP; or
- monitoring PDCCH on the BWP; or
- monitoring the PDCCH for the BWP; or
- transmitting PUCCH on the BWP; or
- reporting CSI on the BWP; or
- transmitting SRS on the BWP; or
- receiving DL-SCH on the BWP.

In an embodiment, a power ramping variable is increased.

According to a second aspect of the disclosure, there is provided apparatus arranged to perform the method of the first aspect.

In an embodiment, the apparatus is a UE.

Although a few preferred embodiments of the disclosure have been shown and described, it will be appreciated by those skilled in the art that various changes and modifications might be made without departing from the scope of the disclosure, as defined in the appended claims.

For a better understanding of the disclosure, and to show how embodiments of the same may be carried into effect, reference will now be made, by way of example only, to the accompanying diagrammatic drawings in which:

LTM is a procedure in which a base station, gNB, receives L1 measurement reports from User Equipment, UEs, and on their basis the gNB changes UEs' serving cell(s) by a cell switch command through a Media Access Control (MAC) Control Element (CE), which indicates an LTM candidate cell configuration that the gNB previously prepared and provided to the UE through Radio Resource Control (RRC) signaling. Then cell switch is triggered, by selecting the indicated LTM candidate cell configuration as the target configuration by the gNB. An LTM candidate cell configuration can only be added, modified and released by network via RRC signaling. The LTM procedure can be used to reduce the mobility.

The network may request the UE to perform early Timing Advance (TA) acquisition (or TA acquisition) of a candidate cell (i.e. LTM candidate cell) before a cell switch. The early TA acquisition (or TA acquisition) is triggered by Physical Downlink Control Channel (PDCCH) order or through UE-based TA measurement.

The network indicates in the cell switch command whether the UE shall access the target cell with a Random Access (RA) procedure if a TA value is not provided or with Physical Uplink Shared Channel (PUSCH) transmission using the indicated TA value. For RACH-less LTM, the UE accesses the target cell via the configured grant provided in the RRC signaling and selects the configured grant occasion associated with the beam indicated in the cell switch command.

If the UE does not receive the configured grant in the RRC signaling, the UE monitors PDCCH for dynamic scheduling from the target cell upon LTM cell switch. Before RACH-less LTM procedure completion, the UE shall not trigger random access procedure if it does not have a valid PUCCH resource for triggered SRs. The following principles apply to LTM:

Each LTM candidate cell configuration can be provided as delta configuration on top of a reference configuration, which is used to form a complete candidate cell configuration. The reference configuration can be managed separately, and a UE stores the reference configuration as a separate configuration. The LTM candidate cell configuration can be configured in RRCReconfiguration message via SRB1 (e.g. Signaling Radio Bearer), i.e. it can be configured after SRB1 establishment.

When a complete candidate cell configuration is applied, it replaces the current UE configuration at the time of cell switch. Although the reconfiguration procedure makes replacement, it doesn't necessarily reset MAC, radio link control (RLC) or packet data convergence protocol (PDCP) layer.

User plane is continued without reset to support lossless delivery of user plane data (e.g. intra-distributed unit (DU) LTM), in case that it is configured in RRC signaling, with the target to avoid data loss and the additional delay of data recovery. Specifically, indicators for RLC re-establishment or MAC reset (or Partial MAC reset) or PDCP re-establishment or PDCP data recovery or service data unit (SDU) discard can be included in RRCReconfiguration message as listed below, which can be included with LTM candidate cell configuration together:

an indicator for MAC reset or Partial MAC reset included in RRCReconfiguration message (e.g. in Cell group (or Cell) configuration)

an indicator for RLC re-establishment (e.g. reestablishRLC) included in RRCReconfiguration message (e.g. in Cell group (or Cell) configuration)

an indicator for PDCP re-establishment (e.g. reestablishPDCP) included in RRCReconfiguration message (e.g. in radio bearer configuration, i.e. RadioBearerConfig IE)

an indicator for PDCP data recovery (e.g. recoverPDCP) included in RRCReconfiguration message (e.g. in radio bearer configuration, i.e. RadioBearerConfig IE)

an indicator for SDU discard (e.g. discardOnPDCP) for SRBs (e.g. SRB1 or SRB3) included in RRCReconfiguration message (e.g. in radio bearer configuration, i.e. RadioBearerConfig IE), which can be called PDCP SDU discard.

The above indicators can be included in RRCReconfiguration message (e.g. in Cell group configuration or LTM candidate cell configuration) including candidate cell configurations for LTM. Upon the reception of the RRCReconfiguration message, UE can store the cell configuration and the indicators and does not apply them to UE configuration. When UE successfully completes it after triggering the LTM procedure (or cell switch) by a cell switch command through a MAC CE indicating the target cell(s) (e.g. identifier(s)), beam index, or, Timing Advance (TA) value, UE can apply the LTM candidate cell configuration and the indicators corresponding to the target cell (or indicated cell in MAC CE). The following conditions are considered as successful completion of the LTM procedure (i.e. cell switch):

For RACH-based LTM procedure (cell switch), the UE considers that LTM execution procedure is successfully completed when the RACH is successfully completed.

For RACH-less LTM procedure (cell switch), the UE considers that LTM execution procedure is successfully complete when the UE determines the NW has successfully received its first UL data. The UE determines successful reception of its first UL data based on receiving a PDCCH addressing the UE's C-RNTI in the target cell scheduling a new transmission after the first UL data and the UE considers that LTM execution procedure successfully completed.

When the above condition for successful completion of LTM cell switch is met (or the LTM cell candidate configuration is complete, i.e. if the LTM cell candidate configuration is indicated to be applied by an indicator), UE can apply the LTM candidate cell configuration and the indicators corresponding to the target cell (or indicated cell in MAC CE) to UE configuration. This approach can avoid UE's early application and reverting it back when it fails, which eases UE implementation. Moreover, the UE cannot know the time when the network sends MAC CE indicating LTM cell switch to UE.

For example, when the above condition is met, UE performs MAC reset (or partial MAC reset) if the indicator is configured in the stored configuration (e.g. LTM candidate cell configuration for LTM) corresponding to the target cell (or indicated cell in MAC CE or successfully switched cell), which can be done by applying the complete LTM cell configuration. When the condition is met, the MAC layer can indicate the successful completion of LTM cell switch to the RRC layer. The RRC layer can indicate MAC reset (or partial MAC reset) to MAC layer, if configured.

For example, when the above condition is met, UE performs RLC re-establishment if the indicator is configured in the stored configuration (e.g. LTM candidate cell configuration for LTM) corresponding to the target cell (or indicated cell in MAC CE or successfully switched cell), which can be done by applying the complete LTM cell configuration. When the condition is met, the MAC layer can indicate the successful completion of LTM cell switch to the RRC layer. The RRC layer can indicate RLC re-establishment to RLC layer, if configured.

For example, when the above condition is met, UE performs PDCP re-establishment if the indicator is configured in the stored configuration (e.g. LTM candidate cell configuration for LTM) corresponding to the target cell (or indicated cell in MAC CE or successfully switched cell), which can be done by applying the complete LTM cell configuration. When the condition is met, the MAC layer can indicate the successful completion of LTM cell switch to the RRC layer. The RRC layer can indicate PDCP re-establishment to PDCP layer, if configured.

For example, when the above condition is met, UE performs PDCP data recovery in case that the indicator is configured in the stored configuration (e.g. LTM candidate cell configuration for LTM) corresponding to the target cell (or indicated cell in MAC CE or successfully switched cell), which can be done by applying the complete LTM cell configuration. PDCP data recovery can be configured only for a PDCP entity associated with AM RLC entities (RLC entity with (Acknowledged Mode (AM) mode). When the condition is met, the MAC layer can indicate the successful completion of LTM cell switch to the RRC layer. The RRC layer can indicate PDCP data recovery to PDCP layer, if configured.

For example, when the above condition is met, UE performs SDU discard in PDCP entity (i.e. PDCP SDU discard) in case that the indicator is configured in the stored configuration (e.g. LTM candidate cell configuration for LTM) corresponding to the target cell (or indicated cell in MAC CE or successfully switched cell), which can be done by applying the complete LTM cell configuration. SDU discard can be configured only for a PDCP entity of SRBs associated with AM RLC entities (RLC entity with Acknowledged Mode (AM) mode). When the condition is met, the MAC layer can indicate the successful completion of LTM cell switch to the RRC layer. The RRC layer can indicate SDU discard to PDCP layer, if configured. For SRBs, when upper layers (e.g. RRC layer) request a PDCP SDU discard, the PDCP entity shall discard all stored PDCP SDUs and PDCP PDUs. It is beneficial to discard old RRC messages of SRBs to prevent unnecessary (re-) transmission to the target cell. The PDCP SDU discard for SRBs (e.g. SRB1 or SRB3) can be triggered and performed when the LTM cell switch procedure fails (e.g. the supervisor timer for LTM cell switch is expired), in order to avoid unnecessary (re-)transmission of RRC message (e.g. RRC Reconfiguration Complete message for the target cell UE failed to LTM cell switch to). The RLC re-establishment for SRBs (e.g. SRB1 or SRB3) can be triggered and performed when the LTM cell switch procedure fails (e.g. the supervisor timer for LTM cell switch is expired), in order to avoid unnecessary (re-)transmission of RRC message (e.g. RRC Reconfiguration Complete message for the target cell UE failed to LTM cell switch to). When the above condition is met, UE can stop the supervisor timer as the LTM execution was successfully completed.

In an embodiment, upon the reception of MAC CE indicating LTM cell switch (or LTM cell switch execution), UE can apply the LTM candidate cell configuration and the indicators corresponding to the target cell (or indicated cell in MAC CE) to UE configuration. This approach can avoid UE's early application and revert it back when it fails, which eases UE implementation. This approach can avoid UE's early application. As the UE cannot know the time when the network sends MAC CE indicating LTM cell switch, UE can follow this approach to apply the configuration timely. The reception of MAC CE indicating LTM cell switch can implies LTM cell switch execution.

For example, upon the reception of MAC CE indicating LTM cell switch (or LTM cell switch execution), UE performs MAC reset (or partial MAC reset) if the indicator is configured in the stored configuration (e.g. LTM candidate cell configuration for LTM) corresponding to the target cell (or indicated cell in MAC CE or successfully switched cell), which can be done by applying the complete LTM cell configuration. Upon the reception of MAC CE indicating LTM cell switch (or LTM cell switch execution), the MAC layer can indicate the successful completion of LTM cell switch to the RRC layer. The RRC layer can indicate MAC reset (or partial MAC reset) to MAC layer, if configured.

For example, upon the reception of MAC CE indicating LTM cell switch (or LTM cell switch execution), UE performs RLC re-establishment if the indicator is configured in the stored configuration (e.g. LTM candidate cell configuration for LTM) corresponding to the target cell (or indicated cell in MAC CE or successfully switched cell), which can be done by applying the complete LTM cell configuration. Upon the reception of MAC CE indicating LTM cell switch (or LTM cell switch execution), the MAC layer can indicate the successful completion of LTM cell switch to the RRC layer. The RRC layer can indicate RLC re-establishment to RLC layer, if configured.

For example, upon the reception of MAC CE indicating LTM cell switch (or LTM cell switch execution), UE performs PDCP re-establishment if the indicator is configured in the stored configuration (e.g. LTM candidate cell configuration for LTM) corresponding to the target cell (or indicated cell in MAC CE or successfully switched cell), which can be done by applying the complete LTM cell configuration. Upon the reception of MAC CE indicating LTM cell switch (or LTM cell switch execution), the MAC layer can indicate the successful completion of LTM cell switch to the RRC layer. The RRC layer can indicate PDCP re-establishment to PDCP layer, if configured.

For example, upon the reception of MAC CE indicating LTM cell switch (or LTM cell switch execution), UE performs PDCP data recovery if the indicator is configured in the stored configuration (e.g. LTM candidate cell configuration for LTM) corresponding to the target cell (or indicated cell in MAC CE or successfully switched cell), which can be done by applying the complete LTM cell configuration. PDCP data recovery can be configured only for a PDCP entity associated with AM RLC entities (RLC entity with Acknowledged Mode (AM) mode). Upon the reception of MAC CE indicating LTM cell switch (or LTM cell switch execution), the MAC layer can indicate the successful completion of LTM cell switch to the RRC layer. The RRC layer can indicate PDCP data recovery to PDCP layer, if configured.

For example, upon the reception of MAC CE indicating LTM cell switch (or LTM cell switch execution), UE performs SDU discard in PDCP entity (i.e. PDCP SDU discard) if the indicator is configured in the stored configuration (e.g. LTM candidate cell configuration for LTM) corresponding to the target cell (or indicated cell in MAC CE or successfully switched cell), which can be done by applying the complete LTM cell configuration. SDU discard can be configured only for a PDCP entity of SRBs associated with AM RLC entities (RLC entity with Acknowledged Mode (AM) mode). Upon the reception of MAC CE indicating LTM cell switch (or LTM cell switch execution), the MAC layer can indicate the successful completion of LTM cell switch to the RRC layer. The RRC layer can indicate SDU discard to PDCP layer, if configured. For SRBs, when upper layers (e.g. RRC layer) request a PDCP SDU discard, the PDCP entity shall discard all stored PDCP SDUs and PDCP PDUs. It is beneficial to discard old RRC messages of SRBs to prevent unnecessary (re-)transmission to the target cell. The PDCP SDU discard for SRBs (e.g. SRB1 or SRB3) can be triggered and performed when the LTM cell switch procedure fails (e.g. the supervisor timer for LTM cell switch is expired), in order to avoid unnecessary (re-) transmission of RRC message (e.g. RRC Reconfiguration Complete message for the target cell UE failed to LTM cell switch to). The RLC re-establishment for SRBs (e.g. SRB1 or SRB3) can be triggered and performed when the LTM cell switch procedure fails (e.g. the supervisor timer for LTM cell switch is expired), in order to avoid unnecessary (re-)transmission of RRC message (e.g. RRC Reconfiguration Complete message for the target cell UE failed to LTM cell switch to)

In another embodiment, upon the reception of MAC CE indicating LTM cell switch (or LTM cell switch execution) or upon the reception of RRCReconfiguration message including the indicators (or the LTM cell candidate configuration is complete, i.e. if the LTM cell candidate configuration is indicated to be applied by an indicator), UE can apply the LTM candidate cell configuration (e.g. complete LTM cell configuration) and the indicators corresponding to the target cell (or indicated cell in MAC CE) to UE configuration. This approach can be efficiently performed by the network. For example, the network sends MAC CE indicating LTM cell switch and RRCReconfiguration message including indicators together (e.g. at a time or in the same MAC PDU) to make UE perform the following actions.

For example, upon the reception of MAC CE indicating LTM cell switch (or LTM cell switch execution) or upon the reception of RRCReconfiguration message including the indicators, UE performs MAC reset (or partial MAC reset) if the indicator is configured in the stored configuration (e.g. LTM candidate cell configuration for LTM) corresponding to the target cell (or indicated cell in MAC CE or successfully switched cell), which can be done by applying the complete LTM cell configuration. Upon the reception of MAC CE indicating LTM cell switch (or LTM cell switch execution), the MAC layer can indicate the successful completion of LTM cell switch to the RRC layer. The RRC layer can indicate MAC reset (or partial MAC reset) to MAC layer, if configured.

For example, upon the reception of RRCReconfiguration message including the indicators, UE performs RLC re-establishment if the indicator is configured in the stored configuration (e.g. LTM candidate cell configuration for LTM) corresponding to the target cell (or indicated cell in MAC CE or successfully switched cell), which can be done by applying the complete LTM cell configuration. Upon the reception of RRCReconfiguration message including the indicators, the MAC layer can indicate the successful completion of LTM cell switch to the RRC layer. The RRC layer can indicate RLC re-establishment to RLC layer, if configured.

For example, upon the reception of RRCReconfiguration message including the indicators, UE performs PDCP re-establishment if the indicator is configured in the stored configuration (e.g. LTM candidate cell configuration for LTM) corresponding to the target cell (or indicated cell in MAC CE or successfully switched cell), which can be done by applying the complete LTM cell configuration. Upon the reception of RRCReconfiguration message including the indicators, the MAC layer can indicate the successful completion of LTM cell switch to the RRC layer. The RRC layer can indicate PDCP re-establishment to PDCP layer, if configured.

For example, upon the reception of RRCReconfiguration message including the indicators, UE performs PDCP data recovery if the indicator is configured in the stored configuration (e.g. LTM candidate cell configuration for LTM) corresponding to the target cell (or indicated cell in MAC CE or successfully switched cell), which can be done by applying the complete LTM cell configuration. PDCP data recovery can be configured only for a PDCP entity associated with AM RLC entities (RLC entity with AM (Acknowledged Mode) mode). Upon the reception of RRCReconfiguration message including the indicators, the MAC layer can indicate the successful completion of LTM cell switch to the RRC layer. The RRC layer can indicate PDCP data recovery to PDCP layer, if configured.

For example, upon the reception of RRCReconfiguration message including the indicators UE performs SDU discard in PDCP entity (i.e. PDCP SDU discard) if the indicator is configured in the stored configuration (e.g. LTM candidate cell configuration for LTM) corresponding to the target cell (or indicated cell in MAC CE or successfully switched cell), which can be done by applying the complete LTM cell configuration. SDU discard can be configured only for a PDCP entity of SRBs associated with AM RLC entities (RLC entity with AM (Acknowledged Mode) mode). Upon the reception of RRCReconfiguration message including the indicators, the MAC layer can indicate the successful completion of LTM cell switch to the RRC layer. The RRC layer can indicate SDU discard to PDCP layer, if configured. For SRBs, when upper layers (e.g. RRC layer) request a PDCP SDU discard, the PDCP entity shall discard all stored PDCP SDUs and PDCP PDUs. It is beneficial to discard old RRC messages of SRBs to prevent unnecessary (re-)transmission to the target cell. The PDCP SDU discard for SRBs (e.g. SRB1 or SRB3) can be triggered and performed when the LTM cell switch procedure fails (e.g. the supervisor timer for LTM cell switch is expired), in order to avoid unnecessary (re-)transmission of RRC message (e.g. RRC Reconfiguration Complete message for the target cell UE failed to LTM cell switch to). The RLC re-establishment for SRBs (e.g. SRB1 or SRB3) can be triggered and performed when the LTM cell switch procedure fails (e.g. the supervisor timer for LTM cell switch is expired), in order to avoid unnecessary (re-) transmission of RRC message (e.g. RRC Reconfiguration Complete message for the target cell UE failed to LTM cell switch to)

Note that this delayed application of configuration is totally different from the legacy behavior because UE performs MAC reset/RLC/PDCP re-establishment, if configured, upon the reception of RRCReconfiguration in legacy procedure. In the above, the stored LTM candidate cell configuration can be regarded as reference configuration, which can be applied at a specific time as proposed.

Security is not updated in LTM. In an embodiment, the network decides whether to update the security based on the type of mobility (e.g. to which cell UE is indicated to perform cell switch). For example, the security configuration for security update is not included in the LTM candidate cell configuration (RRCReconfiguration) for the case that this candidate cell belongs to intra-gNB-DU or intra-gNB-central unit (CU). However, the security configuration for security update is included in the LTM candidate cell configuration (RRCReconfiguration) for the case that this candidate cell belongs to inter-gNB-DU (i.e. inter-gNB-DU mobility case) When the condition for successful completion of LTM cell switch is met after triggering the LTM procedure (or cell switch) by a cell switch command through a MAC CE, UE applies and updates the security configuration to the current configuration, if configured.

Subsequent LTM between LTM candidate cell configurations (i.e., UE does not release other LTM candidate cell configurations after LTM is triggered) can be performed without RRC reconfiguration.

LTM supports both intra-gNB-DU and intra-gNB-CU inter-gNB-DU mobility. LTM also supports inter-frequency mobility, including mobility to inter-frequency cell that is not a current serving cell. The following scenarios are supported:

Primary cell (PCell) change in non-CA scenario,

PCell change without secondary cell (SCell) change in CA scenario,

PCell change with SCell change(s) in carrier aggregation (CA) scenario, including the following cases:

a) The target PCell/target SCell(s) is not a current serving cell (CA-to-CA scenario with PCell change)

b) The target PCell is a current SCell c) The target SCell is the current PCell.

Dual connectivity scenario, at least for the PSCell change without MN involvement case, i.e. intra-SN. When UE is configured with dual connectivity (i.e. Secondary Cell Group (SCG) and Master Cell Group (MCG)), For SCG (or LTM procedure for SCG), the LTM candidate cell configuration of SCG can be configured in RRCReconfiguration message via SRB3, i.e. it can be configured after SRB3 establishment. For SCG (or LTM procedure for SCG), the LTM candidate cell configuration of SCG cannot be configured via SRB1. For MCG (or LTM procedure for MCG), the LTM candidate cell configuration of MCG can be configured in RRCReconfiguration message via SRB1, i.e. it can be configured after SRB1 establishment.

To support the above scenarios, additional procedures may be needed. For example, when the scenario, b) The target PCell is a current SCell, is considered in LTM configuration and LTM procedure (or execution or cell switch), the Random Access procedure for TA acquisition of LTM candidate cell can be performed on the SCell if the SCell is activated (or in activated state). However, in case that the SCell is deactivated (in deactivated state), the Random Access procedure for TA acquisition of LTM candidate cell cannot be performed on the SCell as the SCell is off. To support this scenario, we can go for one of the following options to easy UE and network implementation.

Option 1: As UE cannot perform the Random Access procedure (i.e. transmit on RACH or perform RACH) on the deactivated SCell, the network does not indicate LTM cell switch (or Random access procedure for TA acquisition) to the deactivated SCell as the target LTM candidate cell. The network does not send the first MAC CE (LTM Command MAC CE) including the indicator (or identity) for LTM candidate configuration to a UE in case that the configuration corresponds to the deactivated SCell of UE. In other words, UE does not expect the reception of the first MAC CE indicating LTM execution to the deactivated SCell of UE. In this option, "b) The target PCell is a current SCell" can be restricted to the case that the target PCell is a current activated SCell, i.e. the network can indicate LTM cell switch to the activated SCell as the target LTM candidate cell. The network can send the first MAC CE (LTM Command MAC CE) including the indicator (or identity) for LTM candidate configuration to a UE if the configuration corresponds to the activated SCell of UE.

Option 2: In this option, we can allow UE to perform the Random Access procedure on a deactivated (or an activated) SCell when the Random Access procedure (i.e. transmit on RACH or perform RACH) is triggered by PDCCH order to acquire TA of the SCell and the SCell is one of LTM candidate cells configured to UE. Except for this case, we do not allow UE to perform RACH on the deactivated SCell. Therefore, the network can indicate LTM cell switch to the deactivated SCell (or activated SCell) as the target LTM candidate cell. The network can send the first MAC CE (LTM Command MAC CE) including the indicator (or identity) for LTM candidate configuration to a UE regardless of SCell state. To enable this option (i.e. to support the scenario b)), the following procedure is proposed:

1> if the SCell is deactivated:

2> not transmit SRS on the SCell;

2> not report CSI for the SCell;

2> not transmit on UL-SCH on the SCell;

2> not transmit on RACH on the SCell, except when the Random Access procedure (i.e. RACH) is initiated by the PDCCH order for the LTM candidate cell (i.e. the SCell) for TA acquisition of the SCell or when the SCell is configured as one of LTM candidate cell or when the SCell is the LTM candidate cell;

2> not monitor the PDCCH on the SCell;

2> not monitor the PDCCH for the SCell;

2> not transmit PUCCH on the SCell.

Option 3: In this option, LTM supports both intra-gNB-DU and intra-gNB-CU inter-gNB-DU mobility. LTM also supports inter-frequency mobility, including mobility to inter-frequency cell that is not a current serving cell (i.e. PCell, PSCell or SCell). In other words, the network does not indicate LTM cell switch (or Random access procedure for TA acquisition) to the current serving cell (i.e. PCell, PSCell or SCell) of the UE as the target LTM candidate cell. The network does not send the first MAC CE (LTM Command MAC CE) including the indicator (or identity) for LTM candidate configuration to a UE if the configuration corresponds to the current serving cell of UE. In other words, UE does not expect the reception of the first MAC CE indicating LTM execution to the current serving cell of UE. In another embodiment, the network does not configure LTM candidate configuration corresponding the current serving cell of a UE to the UE. This configuration restriction can work the same as the intention of this option, i.e. the network cannot indicate LTM cell switch (or Random access procedure for TA acquisition) to the current serving cell (i.e. PCell, PSCell or SCell) of the UE as the target LTM candidate cell. The network can indicate LTM cell switch (or Random access procedure for TA acquisition) to a candidate cell except the current serving cell (i.e. PCell, PSCell or SCell) of the UE as the target LTM candidate cell. The network can send the first MAC CE (LTM Command MAC CE) including the indicator (or identity) for LTM candidate configuration to a UE if the configuration does not corresponds to the current serving cell of UE.

The following relates to Control Plane (CP) handling. Cell switch trigger is conveyed in a MAC CE (i.e. the first MAC CE described later), which contains at least a candidate configuration index together with beam indication.

UE may perform Contention Based Random Access (CBRA) or Contention Free Random Access (CFRA) at cell switch. The UE may also skip random access procedure (i.e. RACH-less solution) if UE doesn't need to acquire TA for the target cell during cell switch.

The overall procedure for LTM is shown in FIG. 1. Subsequent LTM is done by repeating the early synchronization, LTM execution, and LTM completion steps without releasing other LTM candidate cell configurations after each LTM completion.

FIG. 1 illustrates a signalling procedure for LTM according to an embodiment of the disclosure.

Details of the steps performed in FIG. 1 are set out below:

Operation 110. The UE sends a MeasurementReport message to the gNB. The gNB decides to use LTM and initiates candidate cell(s) preparation.

Operation 120. The gNB transmits an RRCReconfiguration message to the UE including the LTM candidate cell configurations of one or multiple candidate cells.

Operation 130. The UE stores the LTM candidate cell configurations and transmits a RRCReconfigurationComplete message to the gNB.

Operation 140*a*. The UE may performs DL synchronization with candidate cell(s) before receiving the cell switch command. DL synchronization for candidate cell(s) before cell switch command can be supported, at least based on synchronization signal block (SSB).

Operation 140*b*. The UE may]performs early TA acquisition with candidate cell(s) requested by the network before receiving the cell switch command. This is done via Random access procedure (i.e. Contention-Free Random Access procedure, CFRA) triggered by a PDCCH order from the source cell, following which the UE sends preamble towards the indicated candidate cell. In order to minimize the data interruption of the source cell due to CFRA towards the candidate cell(s), the UE doesn't receive RAR for the purpose of TA value acquisition and the TA value of the candidate cell is indicated in the cell switch command (i.e. the first MAC CE described in Section 4.1). The UE doesn't maintain the TA timer for the candidate cell and relies on network implementation to guarantee the TA validity.

synchronization for candidate cell(s) before cell switch command is supported, at least based on SSB. FFS necessary mechanism.

In an embodiment, TA acquisition of candidate cell(s) before LTM cell switch command is supported, at least based on PDCCH ordered RACH, where the PDCCH order is only triggered by source cell. The source cell can trigger UE's RACH (Random Access Procedure) toward a candidate cell by PDCCH order to acquire TA (Timing Advance or Timing Advance value) for the candidate cell, which only performs preamble transmission and does not expect the reception of RAR (Random Access Response) to ease network implementation and UE implementation. Specifically, the preamble transmission during this Random Access procedure (RACH) for TA acquisition (i.e. early RACH) can be considered as this Random Access procedure is successfully completed. To reduce the processing complexity, UE does not have to calculate RA-RNTI (Radio Network Temporary Identifier (RNTI) for Random Access Response) before/when the preamble is transmitted, unlike normal Random Access procedure (RACH). To be more specific, UE transmits preamble to a candidate cell as indicated by PDCCH order. The network (or Distributed Unit (DU) or the candidate cell) calculates the Timing Advance (TA). The source cell/DU can get the calculated TA from the candidate cell/DU. By doing this Random Access procedure (RACH) for TA acquisition (i.e. early RACH), the network can have the TA values for the candidate cells and knows whether these TAs are still valid or not, e.g., by maintaining a network side timer (i.e. TAT(timeAlignmentTimer) for each TA value or each candidate cell). In this way, the source cell/DU gets to know the value and the validity of candidate cell TA. The source cell/DU needs to know whether a candidate cell TA is still valid because the source cell/DU needs to determine whether it can initiate a RACH-less solution for LTM cell switch and then determine whether it needs to include a beam indication (e.g. TCI state) and TA information in the LTM MAC CE. Therefore, the network can indicate a valid TA to the UE or indicate whether a TA is still valid in LTM MAC CE. The UE may not need to maintain a TA timer for candidate cells, which simplifies UE implementation. Upon the reception of the TA information indicated in LTM MAC CE, the UE can apply the TA value and start the TA timer for the target LTM candidate cell upon LTM execution (i.e. LTM cell switch) and UE can perform LTM cell switch without Random access procedure (i.e. with RACH-less solution to skip the Random access procedure) if TAT for the target LTM candidate cell is running (i.e. TA value is valid) or if Beam failure is not detected for the target LTM candidate cell, which means that UE can monitor PDCCH from the target LTM candidate cell or UE can use configured grants the first UL data transmission to the target cell for RACH-less LTM execution (LTM cell switch).

Operation 150. The UE performs L1 measurements on the configured candidate cell(s), and transmits lower-layer measurement reports to the gNB.

Operation 160. The gNB decides to execute cell switch to a target cell, and transmits a MAC CE triggering cell switch by including the candidate configuration index of the target cell. The UE switches to the configuration of the target cell.

Operation 170. The UE performs random access procedure towards the target cell, if cell switch needs to include performing random access procedure.

Operation 180. The UE completes the LTM cell switch procedure by sending RRCReconfigurationComplete message to target cell. If the UE has performed a RA procedure in operation 170, the UE considers that LTM execution is successfully completed when the random access procedure is successfully completed. For RACH-less LTM, the UE considers that LTM execution is successfully completed when the UE determines that the network has successfully received its first UL data. The UE determines successful reception of its first UL data by receiving a PDCCH addressing the UE's C-RNTI in the target cell, which schedules a new transmission following the first UL data.

The UE can perform the operations 140-180 multiple times for subsequent LTM cell switch based on the configuration provided in operation 120.

The following relates to Early Downlink Synchronization. When configured by the network, it is possible for a UE in RRC_CONNECTED to be DL synchronized with a cell which is different from the current serving cell. This is possible by activating in advance TCI state(s) or a downlink BWP (Bandwidth Part) that belongs to the cell to which the early DL sync is needed.

The downlink BWP can be active or activated as the BWP indicated by the firstActiveDownlinkBWP-Id in the cell configuration to which the early DL synch is needed (e.g. ServingCellConfig), which can be configured in RRCReconfiguration. The TCI state(s) can be activated on the downlink BWP.

Figure 2:
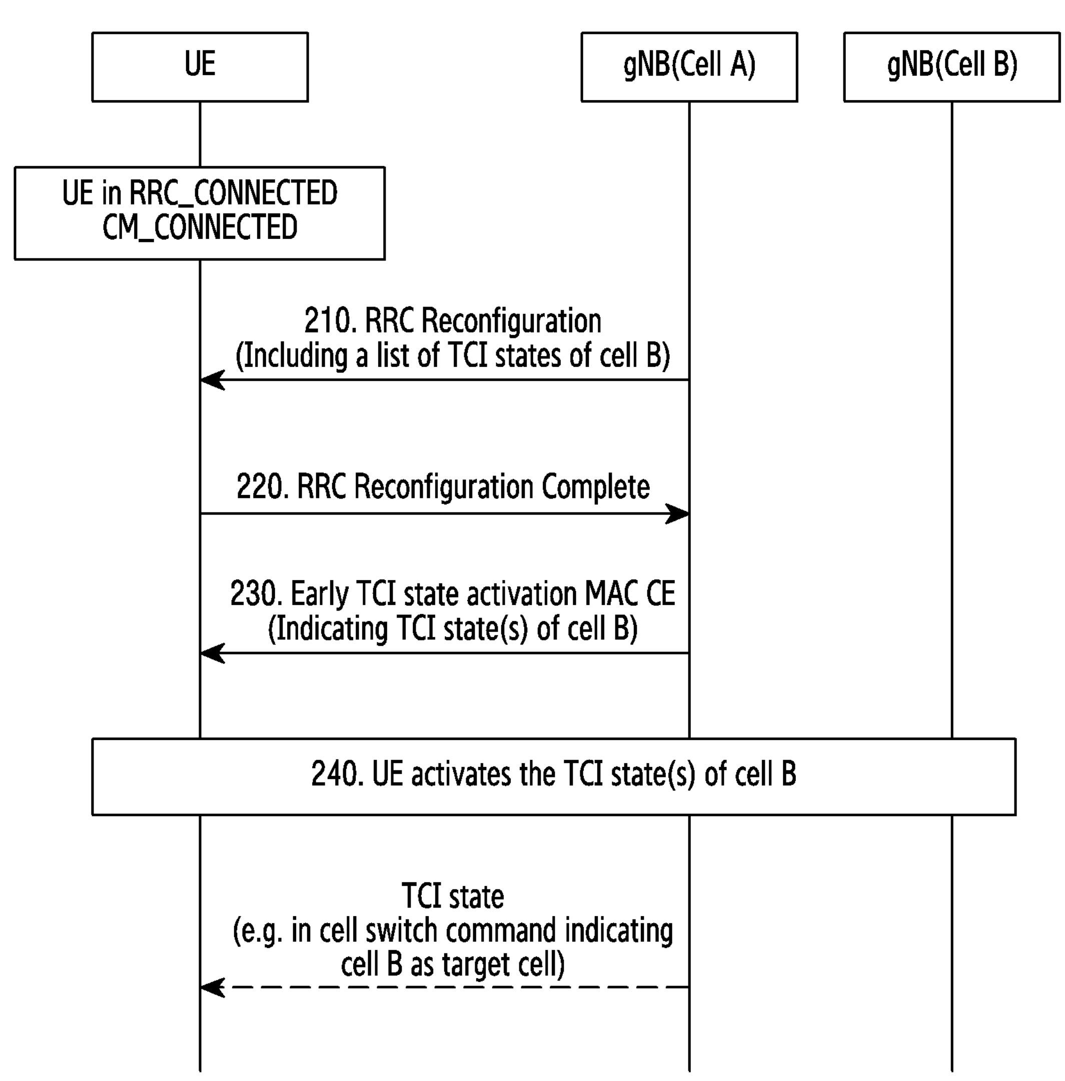
FIG. 2 illustrates Early transmission configuration indicator (TCI) state activation procedures according to an embodiment of the disclosure.

FIG. 2 describes the early TCI state (or a downlink BWP) activation (early DL sync) procedure triggered by the network according to an embodiment of the disclosure.

The operations in the figure are as described below:

Operation 210. The gNB to which Cell A belongs provides a list of TCI states of Cell B to the UE within the RRCReconfiguration message. The gNB to which Cell A belongs may provide a list of TCI state(s) for one or multiple cells to which the early TCI state activation procedure may be executed by the UE.

Operation 220. The UE replies with the RRCReconfigurationComplete message.

Operation 230. The gNB to which Cell A belongs sends an early TCI state activation MAC CE to the UE in order to initiate an early TCI state activation procedure with Cell B. UE receives the early TCI state activation MAC CE from the current serving cell (i.e. Cell A (special cell (SpCell), PCell or primary and secondary cell (PSCell))). The early TCI state activation MAC CE may also indicate TCI state(s) of other cells during the TCI state activation procedure, which may include/indicate index (indices) for TCI state or the corresponding Cell identity or the corresponding downlink BWP identity for early DL synchronization. To indicates these in MAC CE, a bitmap may be used to reduce the overhead of MAC CE, which can be mapped to the configuration information (e.g. cell identifiers or BWP ID) in the ascending order of the values and '1' (or '0') means the indication of the corresponding TCI state or Cell or downlink BWP.

Operation 240. (e.g. upon the reception of early TCI state activation MAC CE indicating a cell (e.g. Cell B) and TCI state(s) for the cell) the UE activates the TCI state(s) of Cell B indicated in the early TCI state activation MAC CE. In other words, the UE activates the TCI state(s) of Cell B indicated in the early TCI state activation MAC CE on the indicated downlink BWP (e.g. by the firstActiveDownlinkBWP-Id for Cell B in RRCReconfiguration or by indication in MAC CE). In this case, it would be beneficial for the early uplink synchronization procedure as TCI states between the network and UE get aligned well.

In another embodiment, in operation 240, UE may activate the TCI state(s) of Cell B indicated in the early TCI state activation MAC CE when UE triggers LTM cell switch procedure (i.e. upon the reception of the first MAC CE (i.e. LTM Cell switch command MAC CE)) to save UE power consumption or UE may activate the TCI state(s) of Cell B indicated in the early TCI state activation MAC CE on the indicated downlink BWP (e.g. by the firstActiveDownlinkBWP-Id for Cell B in RRCReconfiguration or by indication in MAC CE) when UE triggers LTM cell switch procedure (i.e. upon the reception of the first MAC CE (i.e. LTM Cell switch command MAC CE)) to save UE power consumption as PDCCH monitoring on active BWP causes unnecessary UE power consumption.

There are several options about how to handle the downlink BWP for Cell B in the early downlink synchronization procedure:

Option 1: Upon the reception of early TCI state activation MAC CE indicating a cell (e.g. Cell B) and TCI state(s) for the cell, the downlink BWP (e.g. indicated by the firstActiveDownlinkBWP-Id for the indicated cell (e.g. Cell B) in RRCReconfiguration or indicated by the MAC CE) is activated or active. The UE activates the downlink BWP and the TCI state(s) of the cell on the downlink BWP in the early downlink synchronization procedure or after completion of the early downlink synchronization procedure.

Option 2: Upon the reception of early TCI state activation MAC CE indicating a cell (e.g. Cell B) and TCI state(s) for the cell, the UE decides the TCI state(s) of the cell in the early downlink synchronization procedure or after completion of the early downlink synchronization procedure. The downlink BWP (e.g. indicated by the firstActiveDownlinkBWP-Id for the indicated cell (e.g. Cell B) in RRCReconfiguration or indicated by the MAC CE) is activated or active when UE triggers LTM cell switch procedure (i.e. upon the reception of the first MAC CE (i.e. LTM Cell switch command MAC CE)) and UE activates the TCI state(s) of the cell on the downlink BWP. The early TCI state activation MAC CE and LTM Cell switch command MAC CE may be received together in the same MAC PDU.

Upon RRC (re-)configuration of firstActiveDownlinkBWP-Id and/or firstActiveUplinkBWP-Id for SpCell except for PSCell when SCG is deactivated or activation of an SCell or early downlink (or uplink) synchronization, the DL BWP and/or UL BWP indicated by firstActiveDownlinkBWP-Id and/or firstActiveUplinkBWP-Id is active without receiving PDCCH indicating a downlink assignment or an uplink grant. Upon RRC (re-)configuration of firstActiveDownlinkBWP-Id for PSCell when SCG is deactivated, the DL BWP is switched to the firstActiveDownlinkBWP-Id. The active BWP for a Serving Cell is indicated by either RRC or PDCCH or MAC CE (early TCI state activation MAC CE or LTM Cell switch command MAC CE). For unpaired spectrum, a DL BWP is paired with a UL BWP, and BWP switching is common for both UL and DL.

The UE is assumed to have early DL synchronization with the gNB to which Cell B belongs. With this, the gNB to which Cell A belongs may initiate cell switch procedure to Cell B by proving a cell switch command which indicates Cell B as target cell. The cell switch command can be e.g., the LTM cell switch command MAC CE.

This procedure can be applied to both MCG or SCG separately when UE is configured with dual connectivity.

The early downlink synchronization can be performed before the early uplink synchronization as the exact TA value can be measured by the network when the TCI states between UE and the network are well aligned, i.e. the network can trigger the early downlink synchronization to UE first and then trigger early uplink synchronization to UE (e.g. after completion of the early downlink synchronization). In other embodiment, the network can skip the early downlink synchronization and trigger early uplink synchronization to UE.

In other embodiment, the early downlink synchronization and LTM cell switch procedure can be indicated together by two MAC CEs, i.e. early TCI state activation MAC CE and LTM Cell switch command MAC CE. The two MAC CEs can be included in the same MAC PDU and the network send the MAC PDU to UE. In this way, UE activates the indicated TCI states (e.g. on the indicated downlink BWP) and triggers LTM cell switch procedure based on the two MAC CEs.

The following relates to Early Uplink Synchronization. When configured by the network, it is possible for a UE in RRC_CONNECTED to be UL synchronized with a cell which is different from the current serving cell.

Figure 3:
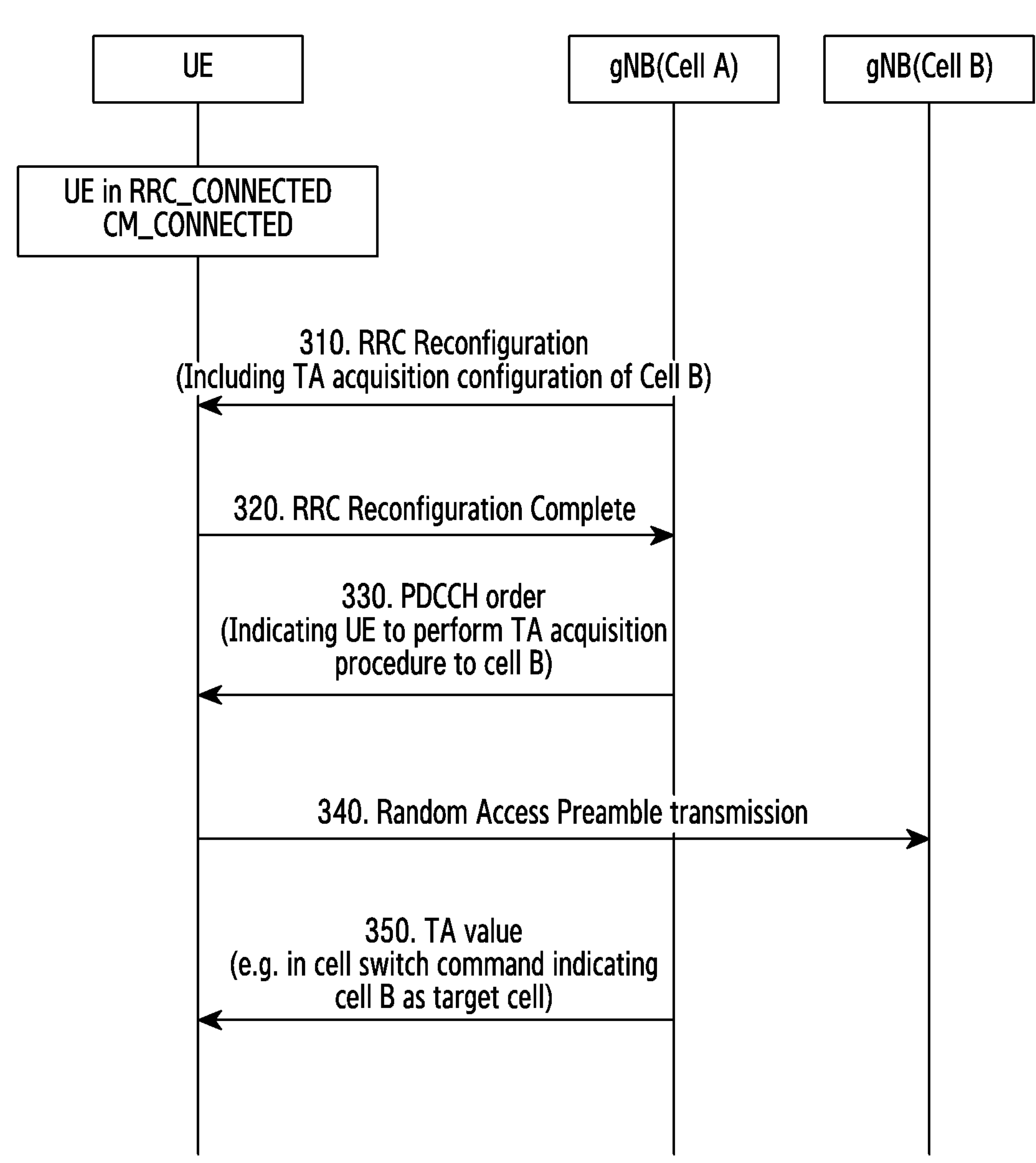
FIG. 3 illustrates Early technology assessment (TA) acquisition procedures according to an embodiment of the disclosure.

FIG. 3 describes the early TA acquisition (early UL sync) procedure triggered by the network (i.e. In this application, early uplink synchronization means early TA acquisition procedure) according to an embodiment of the disclosure. The operations illustrated in FIG. 3 are as follows:

310. The gNB to which Cell A belongs provides the TA acquisition configuration to the UE within the RRCReconfiguration message. The TA acquisition configuration includes RRC configuration information required to send a Random Access Preamble to Cell B so that the gNB to which Cell B belongs can calculate a TA value to be used by the UE, e.g., in case an LTM cell switch procedure is executed to Cell B. The TA acquisition configuration may include information for one or multiple cells to which the TA acquisition procedure may be executed by the UE. UE receives the TA acquisition configuration from the current serving cell (i.e. Cell A or SpCell or PCell or PSCell) by RRCReconfiguration message.

320. The UE replies with the RRCReconfigurationComplete message.

330. The gNB to which Cell A belongs sends a PDCCH order message to the UE in order to initiate a TA acquisition procedure with Cell B. The PDCCH order may include the information required to sends a Random Access Preamble to Cell B and indication whether to perform preamble transmission or preamble retransmission. The gNB to which Cell A belongs may indicate the retransmission of preamble for TA acquisition in case no TA is obtained. UE receives the PDCCH order indicating random access procedure (or preamble (re)transmission) to other cell(s) (e.g. Cell B) from the current serving cell (i.e. Cell A or SpCell or PCell or PSCell).

340. The UE sends a Random Access Preamble to Cell B so that the gNB to which Cell B belongs can calculate a TA value to be used by the UE, e.g., if an LTM cell switch procedure is triggered to Cell B.

There are several options about how to handle the uplink BWP for Cell B to transmit the Random Access Preamble to Cell B.

Option 1: For each LTM candidate cell, the DL BWP and/or UL BWP indicated by firstActiveDownlinkBWP-Id and/or firstActiveUplinkBWP-Id respectively is active when the Random Access procedure on an LTM candidate cell is initiated by a PDCCH order for early uplink synchronization or when early downlink synchronization is initiated (or completed), i.e. UE performs random access preamble (re) transmission on the UL BWP to the indicated cell (a LTM candidate cell indicated by PDCCH order) in the random access procedure triggered by a PDCCH order (of the serving cell (Spcell or PCell or PSCell)) for early uplink synchronization (e.g. if physical random access channel (PRACH) occasions or resources are configured on the UL BWP). The DL BWP and/or UL BWP on an LTM candidate cell is deactivated upon reception of LTM Cell Switch Command MAC CE except for the LTM candidate cell indicated by the Target Configuration ID included in the LTM Cell Switch Command MAC CE. The DL BWP and/or UL BWP for the LTM candidate cell indicated by the Target Configuration ID included in the LTM Cell Switch Command MAC CE are active for the Serving Cell.

Option 2: For each LTM candidate cell, the DL BWP and/or UL BWP indicated by firstActiveDownlinkBWP-Id and/or firstActiveUplinkBWP-Id respectively is active when the Random Access procedure on an LTM candidate cell is initiated by a PDCCH order for early uplink synchronization or when early downlink synchronization is initiated (or completed), i.e. UE performs random access preamble (re) transmission on the UL BWP to the indicated cell (a LTM candidate cell indicated by PDCCH order) in the random access procedure triggered by a PDCCH order (of the serving cell (Spcell or PCell or PSCell)) for early uplink synchronization (e.g. if PRACH occasions or resources are configured on the UL BWP). The DL BWP and/or UL BWP on an LTM candidate cell is deactivated upon the preamble (re)transmission (i.e. when Random Access procedure initiated by a PDCCH order for early uplink synchronization is completed).

For Option 1 and Option 2, the BWP behavior is specifically as follows (To save UE power consumption, PDCCH monitoring, sounding reference signal (SRS) transmission, channel state information (CSI) reporting etc., should not be allowed when UE performs early Uplink (or Downlink) Synchronization):

1> if a BWP is activated and the active DL BWP for the Serving Cell is not the dormant BWP and the Serving Cell is not the PSCell of deactivated SCG, UE shall 2> transmit on UL-SCH on the BWP;

2> transmit on RACH on the BWP, if PRACH occasions are configured;

2> monitor the PDCCH on the BWP;

2> transmit PUCCH on the BWP, if configured;

2> report CSI for the BWP;

2> transmit SRS on the BWP, if configured;

2> receive DL-SCH on the BWP;

2> (re-)initialize any suspended configured uplink grants of configured grant Type 1 on the active BWP according to the stored configuration, if any, and to start in the symbol according to rules;

2> if lbt-FailureRecoveryConfig is configured:

3> stop the lbt-FailureDetectionTimer, if running;

3> set LBT_COUNTER to 0;

3> monitor LBT failure indications from lower layers.

1> if a BWP on an LTM candidate cell is activated for early uplink synchronization, UE shall 2> transmit on RACH on the BWP, if PRACH occasions are configured; or 2> not transmit on UL-SCH on the BWP; or 2> not monitor the PDCCH on the BWP; or 2> not monitor the PDCCH for the BWP (e.g. UE doesn't have to monitor PDCCH for the BWP by cross scheduling (i.e. on other BWP); or 2> not transmit PUCCH on the BWP; or 2> not report CSI on the BWP; or 2> not transmit SRS on the BWP; or 2> not receive DL-SCH on the BWP; or 2> clear any configured downlink assignment and any configured uplink grant Type 2 associated with this cell (e.g. SCell or LTM candidate cell) respectively (e.g. if one of SCells is indicated as a LTM candidate cell, the configured downlink assignment and configured uplink grant Type 2 should be cleared in order to save radio resources); or 2> suspend any configured uplink grant Type 1 associated with this cell (e.g. SCell or LTM candidate cell) (e.g. if one of SCells is indicated as a LTM candidate cell, the configured uplink grant Type 1 should be suspended in order to save radio resources); or 2> stop the bwp-InactivityTimer of this Cell, if running.

Option 3: For each LTM candidate cell, the DL BWP and/or UL BWP indicated by firstActiveDownlinkBWP-Id and/or firstActiveUplinkBWP-Id respectively is not active (i.e. deactivated or keep the deactivate state) when the Random Access procedure on an LTM candidate cell is initiated by a PDCCH order for early uplink synchronization or when early downlink synchronization is initiated (or completed), i.e. UE performs random access preamble (re) transmission on the UL BWP (i.e. on the deactivated UL BWP) to the indicated cell (a LTM candidate cell indicated by PDCCH order) in the random access procedure triggered by a PDCCH order (of the serving cell (Spcell or PCell or PSCell)) for early uplink synchronization (e.g. if PRACH occasions or resources are configured on the UL BWP). In this way, UE is allowed to perform preamble (re)transmission on the deactivated BWP for LTM candidate cells. The DL BWP and/or UL BWP on an LTM candidate cell is activated as SpCell (i.e. PCell or PSCell) when UE successfully completes the LTM cell switch procedure to the LTM candidate cell indicated by the Target Configuration ID included in the LTM Cell Switch Command MAC CE.

For Option 3, the BWP behavior is specifically as follows (To save UE power consumption, PDCCH monitoring, SRS transmission, CSI reporting etc., should not be allowed when UE performs early Uplink (or Downlink) Synchronization):

1> if a BWP is activated and the active DL BWP for the Serving Cell is not the dormant BWP and the Serving Cell is not the PSCell of deactivated SCG, UE shall 2> transmit on UL-SCH on the BWP;

2> transmit on RACH on the BWP, if PRACH occasions are configured;

2> monitor the PDCCH on the BWP;

2> transmit PUCCH on the BWP, if configured;

2> report CSI for the BWP;

2> transmit SRS on the BWP, if configured;

2> receive DL-SCH on the BWP;

2> (re-)initialize any suspended configured uplink grants of configured grant Type 1 on the active BWP according to the stored configuration, if any, and to start in the symbol according to rules;

2> if lbt-FailureRecoveryConfig is configured:

3> stop the lbt-FailureDetectionTimer, if running;

3> set LBT_COUNTER to 0;

3> monitor LBT failure indications from lower layers.

1> if a BWP is deactivated or the Serving Cell is PSCell of deactivated SCG or early uplink synchronization for a LTM candidate cell is initiated, UE shall 2> not transmit on UL-SCH on the BWP;

2> not transmit on RACH on the BWP, except for the LTM candidate cell (i.e. UE transmits on RACH on the BWP for the LTM candidate cell while UE shall not transmit on RACH on the BWP for the Serving Cell)

2> not monitor the PDCCH on the BWP;

2> not transmit PUCCH on the BWP;

2> not report CSI for the BWP;

2> not transmit SRS on the BWP;

2> not receive DL-SCH on the BWP;

2> clear any configured downlink assignment and configured uplink grant of configured grant Type 2 on the BWP;

2> suspend any configured uplink grant of configured grant Type 1 on the inactive BWP 5. The gNB to which Cell A belongs provides the TA value calculated by the gNB to which Cell B belongs during the TA acquisition procedure, e.g. in LTM cell switch command MAC CE which initiate LTM cell switch procedure to Cell B in case an LTM cell switch procedure is triggered to Cell B. UE receives the first MAC CE (i.e. LTM Cell switch command MAC CE) from the current serving cell (i.e. Cell A or SpCell or PCell or PSCell), which triggers LTM cell switch procedure to other cell (e.g. Cell B).

This procedure can be applied to both MCG or SCG separately when UE is configured with dual connectivity.

In this application, the reception of the first MAC CE (i.e. LTM Cell switch command MAC CE) means triggering of LTM cell switch procedure.

The following relates to U-plane handling (User plane handling). In LTM, whether the UE performs partial or full MAC reset, re-establishes RLC, performs data recovery with PDCP during cell switch is explicitly controlled by the network through RRC signaling.

MAC/RLC re-establishment/PDCP data recovery/PDCP re-establishment (when configured)

RF retuning (e.g. needed for inter-frequency), baseband retuning

The PDCP data recovery procedure can be applied to the RLC AM bearers for inter-DU LTM cell switch.

The following relates to Principles for Security protection. The following high-level principles should be applied. In this application, the security protection implies ciphering or integrity protection. The ciphering means not only the ciphering operation but also the deciphering operation because the deciphering should be applied to the data at the receiver if a data is ciphered at the transmitter. Likewise, the integrity protection means the integrity verification operation as well as the integrity protection operation because the integrity verification should be applied to the data at the receiver if a data is integrity protected at the transmitter.

AS security comprises of the integrity protection and ciphering of RRC signaling (SRBs) and user data (DRBs).

RRC handles the configuration of the AS security parameters which are part of the AS configuration: the integrity protection algorithm, the ciphering algorithm, if integrity protection and/or ciphering is enabled for a DRB and two parameters, namely the keySetChangeIndicator and the nextHopChainingCount, which are used by the UE to determine the AS security keys upon reconfiguration with sync (with key change), connection re-establishment and/or connection resume.

The integrity protection algorithm is common for SRB1, SRB2, SRB3 (if configured), SRB4 (if configured), SRBx (if configured) and DRBs configured with integrity protection, with the same keyToUse value. The ciphering algorithm is common for SRB1, SRB2, SRB3 (if configured), SRB4 (if configured), SRBx (if configured) and DRBs configured with the same keyToUse value. Neither integrity protection nor ciphering applies for SRB0.

NOTE 0: All DRBs related to the same PDU session have the same enable/disable setting for ciphering and the same enable/disable setting for integrity protection.

RRC integrity protection and ciphering are always activated together, i.e. in one message/procedure. RRC integrity protection and ciphering for SRBs are never de-activated. However, it is possible to switch to a 'NULL' ciphering algorithm (nea0).

For SRBx (if configured), RRC integrity protection and ciphering can be activated and deactivated based on configuration or indication by RRC messages (or MAC CE (Control Element) or PDCP control PDU (Protocol Data Unit)), in order to reduce the UE processing burden. For SRBx (if configured), it is also possible to switch to a 'NULL' ciphering algorithm (nea0) and the 'NULL' integrity protection algorithm (nia0) can be used.

The 'NULL' integrity protection algorithm (nia0) is used only for SRBs and for the UE in limited service mode and when used for SRBs, integrity protection is disabled for DRBs. In case the 'NULL' integrity protection algorithm is used, 'NULL' ciphering algorithm is also used.

NOTE 1: Lower layers discard RRC messages for which the integrity protection check has failed and indicate the integrity protection verification check failure to RRC.

The AS applies four different security keys: one for the integrity protection of RRC signaling (KRRCint), one for the ciphering of RRC signaling (KRRCenc), one for integrity protection of user data (KUPint) and one for the ciphering of user data (KUPenc). All four AS keys are derived from the KgNB key. The KgNB key is based on the KAMF key, which is handled by upper layers.

The integrity protection and ciphering algorithms can only be changed with reconfiguration with sync. The AS keys (KgNB, KRRCint, KRRCenc, KUPint and KUPenc) change upon reconfiguration with sync (if masterKeyUpdate is included), and upon connection re-establishment and connection resume.

For each radio bearer an independent counter (COUNT used in PDCP layer) is maintained for each direction. For each radio bearer, the COUNT is used as input for ciphering and integrity protection.

It is not allowed to use the same COUNT value more than once for a given security key. The network is responsible for avoiding reuse of the COUNT with the same RB identity and with the same key, e.g. due to the transfer of large volumes of data, release and establishment of new RBs, and multiple termination point changes for RLC-UM bearers and multiple termination point changes for RLC-AM bearer with SN terminated PDCP re-establishment (COUNT reset) due to SN only full configuration whilst the key stream inputs (i.e. bearer ID, security key) at MN have not been updated. In order to avoid such re-use, the network may e.g. use different RB identities for RB establishments, change the AS security key, or an RRC_CONNECTED to RRC_IDLE/RRC_INACTIVE and then to RRC_CONNECTED transition.

In order to limit the signaling overhead, individual messages/packets include a short sequence number (PDCP SN (Sequence Number)). In addition, an overflow counter mechanism is used: the hyper frame number (HFN used in PDCP layer). The HFN needs to be synchronized between the UE and the network.

For each SRB, the value provided by RRC to lower layers to derive the 5-bit BEARER parameter used as input for ciphering and for integrity protection is the value of the corresponding srb-Identity with the MSBs padded with zeroes.

For a UE provided with an sk-counter, keyToUse indicates whether the UE uses the master key (KgNB) or the secondary key (S-KeNB or S-KgNB) for a particular DRB. The secondary key is derived from the master key and sk-Counter. Whenever there is a need to refresh the secondary key, e.g. upon change of MN with KgNB change or to avoid COUNT reuse, the security key update is used. When the UE is in NR-DC, the network may provide a UE configured with an SCG with an sk-Counter even when no DRB is setup using the secondary key (S-KgNB) in order to allow the configuration of SRB3. The network can also provide the UE with an sk-Counter, even if no SCG is configured, when using SN terminated MCG bearers.

The following relates to RRC Protocol. A UE is either in RRC_CONNECTED state or in RRC_INACTIVE state when an RRC connection has been established. If this is not the case, i.e. no RRC connection is established, the UE is in RRC_IDLE state. The RRC states can further be characterized as follows:

RRC_IDLE:

- A UE specific DRX may be configured by upper layers;
- At lower layers, the UE may be configured with a DRX for PTM transmission of MBS broadcast;
- UE controlled mobility based on network configuration;
- The UE:
- Monitors Short Messages transmitted with P-RNTI over DCI (see clause 6.5);
- Monitors a Paging channel for CN paging using 5G-S-TMSI, except if the UE is acting as a L2 U2N Remote UE;
- If configured by upper layers for MBS multicast reception, monitors a Paging channel for CN paging using TMGI;
- Performs neighboring cell measurements and cell (re-) selection;
- Acquires system information and can send SI request (if configured);
- Performs logging of available measurements together with location and time for logged measurement configured UEs;
- Performs idle/inactive measurements for idle/inactive measurement configured UEs;
- Performs AI/ML functionality (e.g. collection of AI/ML data or measurements for AI/ML data or reporting AI/ML data) configured UEs;
- If configured by upper layers for MBS broadcast reception, acquires MCCH change notification and MBS broadcast control information and data.

RRC_INACTIVE:

- A UE specific DRX may be configured by upper layers or by RRC layer;
- At lower layers, the UE may be configured with a DRX for PTM transmission of MBS broadcast;
- UE controlled mobility based on network configuration;
- The UE stores the UE Inactive AS context;
- A RAN-based notification area is configured by RRC layer;
- Transfer of unicast data and/or signaling to/from UE over radio bearers configured for small data transmission (SDT).

The UE:

- Monitors Short Messages transmitted with P-radio network temporary identifier (RNTI) over downlink control information (DCI) (see clause 6.5);
- During SDT procedure, monitors control channels associated with the shared data channel to determine if data is scheduled for it;
- While SDT procedure is not ongoing, monitors a Paging channel for CN paging using 5G-S-TMSI and RAN paging using fullI-RNTI, except if the UE is acting as a L2 U2N Remote UE;
- If configured by upper layers for MBS multicast reception, while SDT procedure is not ongoing, monitors a Paging channel for paging using TMGI;
- Performs neighboring cell measurements and cell (re-) selection;
- Performs RAN-based notification area updates periodically and when moving outside the configured RAN-based notification area;
- Acquires system information, while SDT procedure is not ongoing, and can send SI request (if configured);
- While SDT procedure is not ongoing, performs logging of available measurements together with location and time for logged measurement configured UEs;
- While SDT procedure is not ongoing, performs idle/inactive measurements for idle/inactive measurement configured UEs;
- While SDT procedure is not ongoing, performs AI/ML functionality (e.g. collection of AI/ML data or measurements for AI/ML data or reporting AI/ML data) configured UEs;
- If configured by upper layers for MBS broadcast reception, acquires MCCH change notification and MBS broadcast control information and data;
- Transmits SRS for Positioning.

RRC_CONNECTED:

- The UE stores the AS context;
- Transfer of unicast data to/from UE;
- Transfer of MBS multicast data to UE;
- At lower layers, the UE may be configured with a UE specific DRX;
- At lower layers, the UE may be configured with a DRX for PTM transmission of MBS broadcast and/or a DRX for MBS multicast;
- For UEs supporting CA, use of one or more SCells, aggregated with the SpCell, for increased bandwidth;
- For UEs supporting DC, use of one SCG, aggregated with the MCG, for increased bandwidth;
- Network controlled mobility within NR, to/from E-UTRA, and to UTRA-FDD;
- Network controlled mobility (path switch) between a serving cell and a L2 U2N Relay UE, or vice versa.
- The UE:
- Monitors Short Messages transmitted with P-RNTI over DCI (see clause 6.5), if configured;
- Monitors control channels associated with the shared data channel to determine if data is scheduled for it;
- Provides channel quality and feedback information;
- Performs neighboring cell measurements and measurement reporting;
- Performs AI/ML functionality (e.g. collection of AI/ML data or measurements for AI/ML data or reporting AI/ML data) configured UEs;
- Acquires system information;
- Performs immediate MDT measurement together with available location reporting;
- If configured by upper layers for MBS broadcast reception, acquires MCCH change notification and MBS broadcast control information and data.

Figure 4:
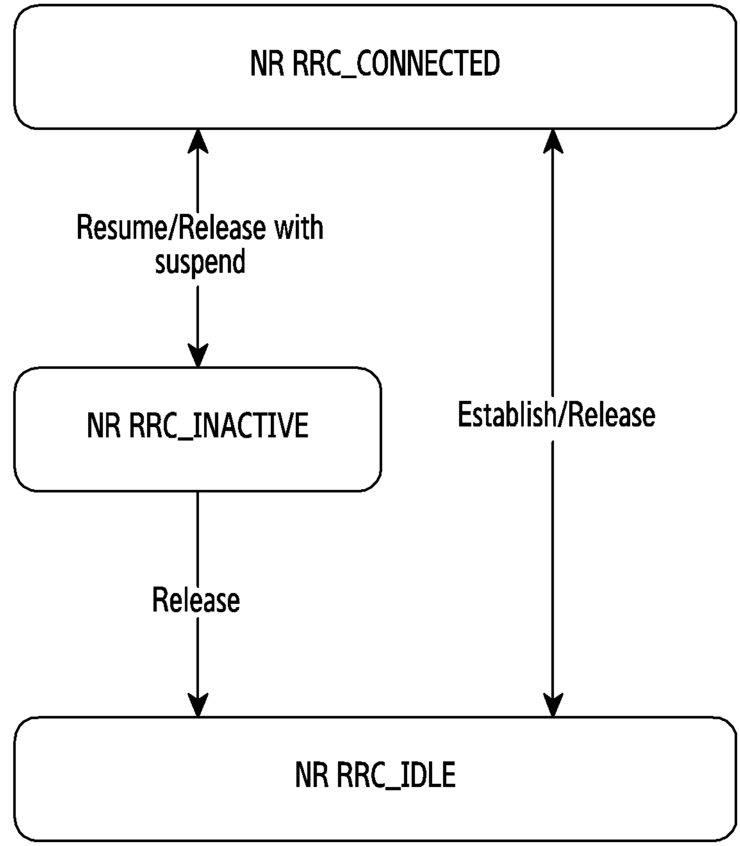
FIG. 4 illustrates UE state machine and state transitions in NR according to an embodiment of the disclosure.

FIG. 4 illustrates an overview of UE RRC state machine and state transitions in NR. A UE has only one RRC state in NR at one time according to an embodiment of the disclosure.

Figure 5:
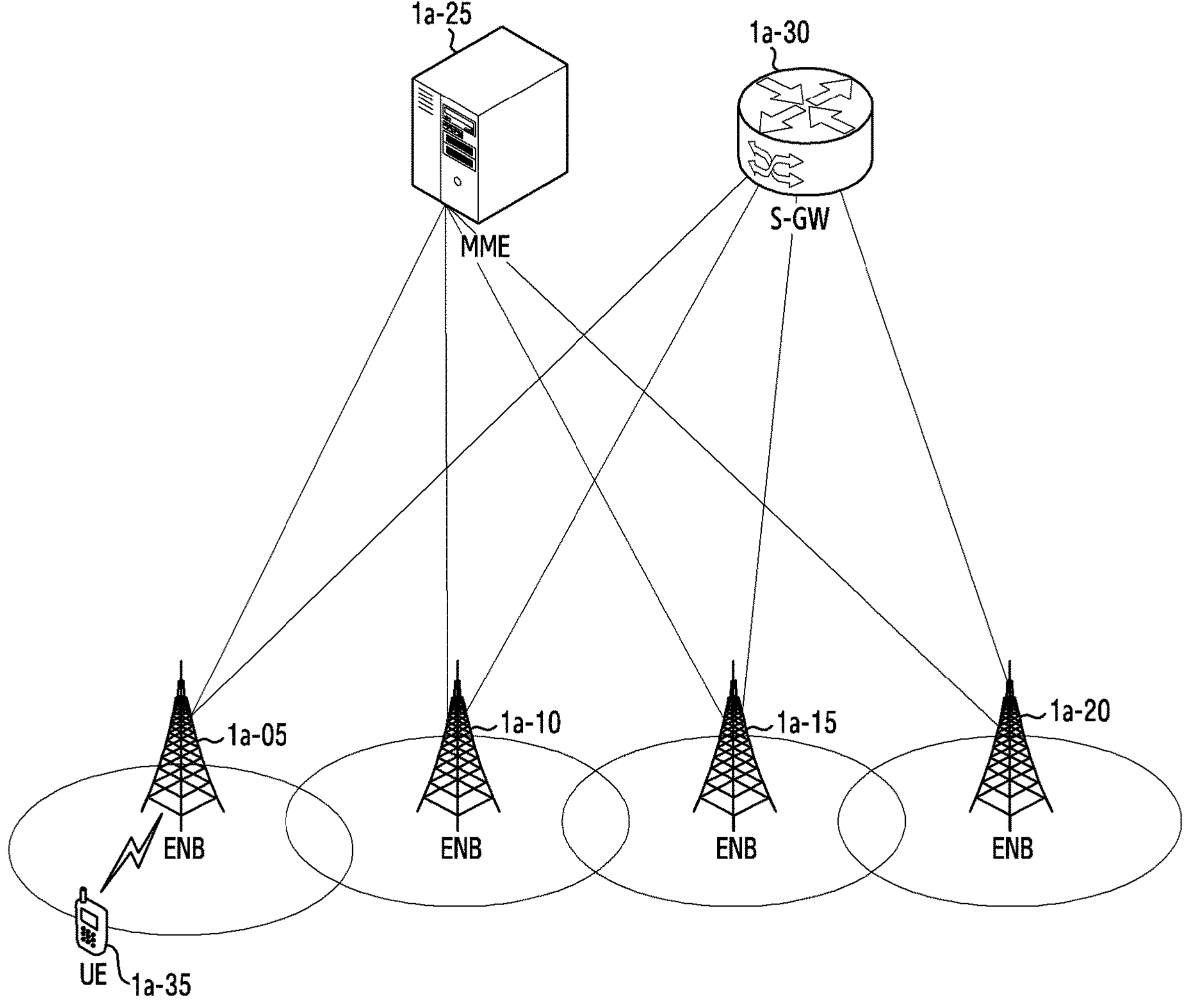
FIG. 5 illustrates an LTE system according to an embodiment of the disclosure.

FIG. 5 illustrates the structure of an LTE system according to an embodiment of the disclosure.

Referring to FIG. 5, a radio access network of an LTE system includes next-generation base stations (also referred to as evolved node Bs, hereinafter eNBs, node Bs, or base stations) 1*a*-05, 1*a*-10, 1*a*-15, and 1*a*-20, a mobility management entity (MME) 1*a*-25, and a serving gateway (S-GW) 1*a*-30. A user equipment (hereinafter UE or terminal) 1*a*-35 accesses an external network through the eNBs 1*a*-05 to 1*a*-20 and S-GW 1*a*-30.

In FIG. 5, the eNBs 1*a*-05 to 1*a*-20 correspond to an existing node B of an UMTS system. The eNBs are connected to the UE 1*a*-35 through a radio channel, and perform a more complicated role than the existing node B. In the LTE system, since all user traffic pertaining to real-time service, such as voice over IP (VoIP), via the Internet protocol, is serviced through a shared channel, a device that performs scheduling by collecting state information, such as buffer states, available transmit power states, and channel states of UEs, is required, and eNBs 1*a*-05 to 1*a*-20 are in charge of this function of the device. In general, one eNB controls multiple cells. For example, in order to implement a transmission rate of 100 Mbps, the LTE system uses orthogonal frequency division multiplexing (OFDM) as a radio access technology in the bandwidth of 20 MHz. In addition, the LTE system adopts an adaptive modulation & coding (hereinafter referred to as AMC) scheme for determining a modulation scheme and a channel coding rate based on the channel state of the UE. The S-GW 1*a*-30 is a device for providing a data bearer and generating or removing a data bearer under the control of the MME 1*a*-25. The MME is in charge of various control functions in addition to a mobility management function for the UE, and is connected to multiple base stations.

Figure 6:
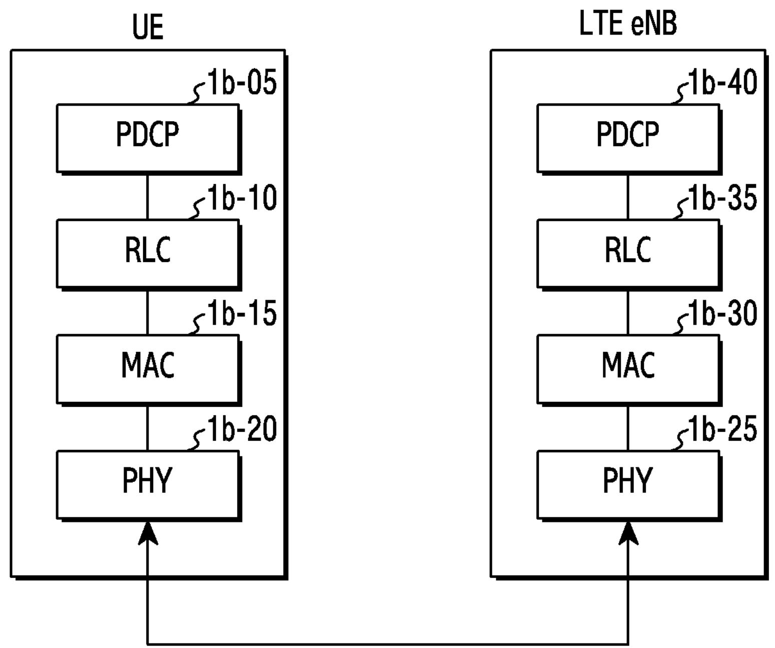
FIG. 6 illustrates a radio protocol structure in an LTE system according to an embodiment of the disclosure.

FIG. 6 illustrates a radio protocol structure in an LTE system according to an embodiment of the disclosure.

Referring to FIG. 6, the radio protocol of the LTE system includes packet data convergence protocols (PDCPs) 1*b*-05 and 1*b*-40, radio link controls (RLCs) 1*b*-10 and 1*b*-35, and medium access controls (MACs) 1*b*-15 and 1*b*-30, in a UE and an eNB, respectively. The packet data convergence protocols (PDCPs) 1*b*-05 and 1*b*-40 are used to perform operations, such as IP header compression/restoration. The main functions of PDCPs are summarized as follows.

Header compression and decompression: ROHC only

Transfer of user data

In-sequence delivery of upper layer PDUs at PDCP re-establishment procedure for RLC acknowledged mode (AM)

Sequence reordering (for split bearers in DC (only support for RLC AM): PDCP PDU routing for transmission and PDCP PDU reordering for reception)

Duplicate detection of lower layer service data units (SDUs) in a PDCP re-establishment procedure for RLC AM Retransmission of PDCP SDUs at handover and, for split bearers in DC, of PDCP PDUs at PDCP data-recovery procedure, for RLC AM)

Ciphering and deciphering

Timer-based SDU discard in uplink

The radio link control (hereinafter referred to as RLC) 1*b*-10 and 1*b*-35 performs ARQ operation by reconfiguring a PDCP protocol data unit (PDU) or RLC service data unit (SDU) to an appropriate size. The main functions of RLC are summarized below.

Transfer of upper layer PDUs

ARQ function (Error correction through ARQ (only for AM data transfer))

Concatenation, segmentation and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MACs 1*b*-15 and 1*b*-30 are connected to multiple RLC layer devices configured in one UE, and may perform an operation of multiplexing RLC PDUs to MAC PDUs and demultiplexing RLC PDUs from MAC PDUs. The main functions of MACs are summarized as follows.

Mapping between logical channels and transport channels

Multiplexing/de-multiplexing of MAC SDUs belonging to one or different logical channels into/from transport blocks (TB) transferred to/from the physical layer on transport channels Scheduling information reporting Error correction through hybrid automatic repeat request (HARQ)

Priority handling between logical channels of one UE

Priority handling between UEs by means of dynamic scheduling

MBMS service identification

Transport format selection

Padding

Physical layers 1*b*-20 and 1*b*-25 may perform operations of channel coding and modulating upper layer data, forming the upper layer data into an OFDM symbol, transmitting the OFDM symbol through a radio channel, or of demodulating an OFDM symbol received through a radio channel, channel-decoding the OFDM symbol, and transmitting the OFDM symbol to an upper layer.

Figure 7:
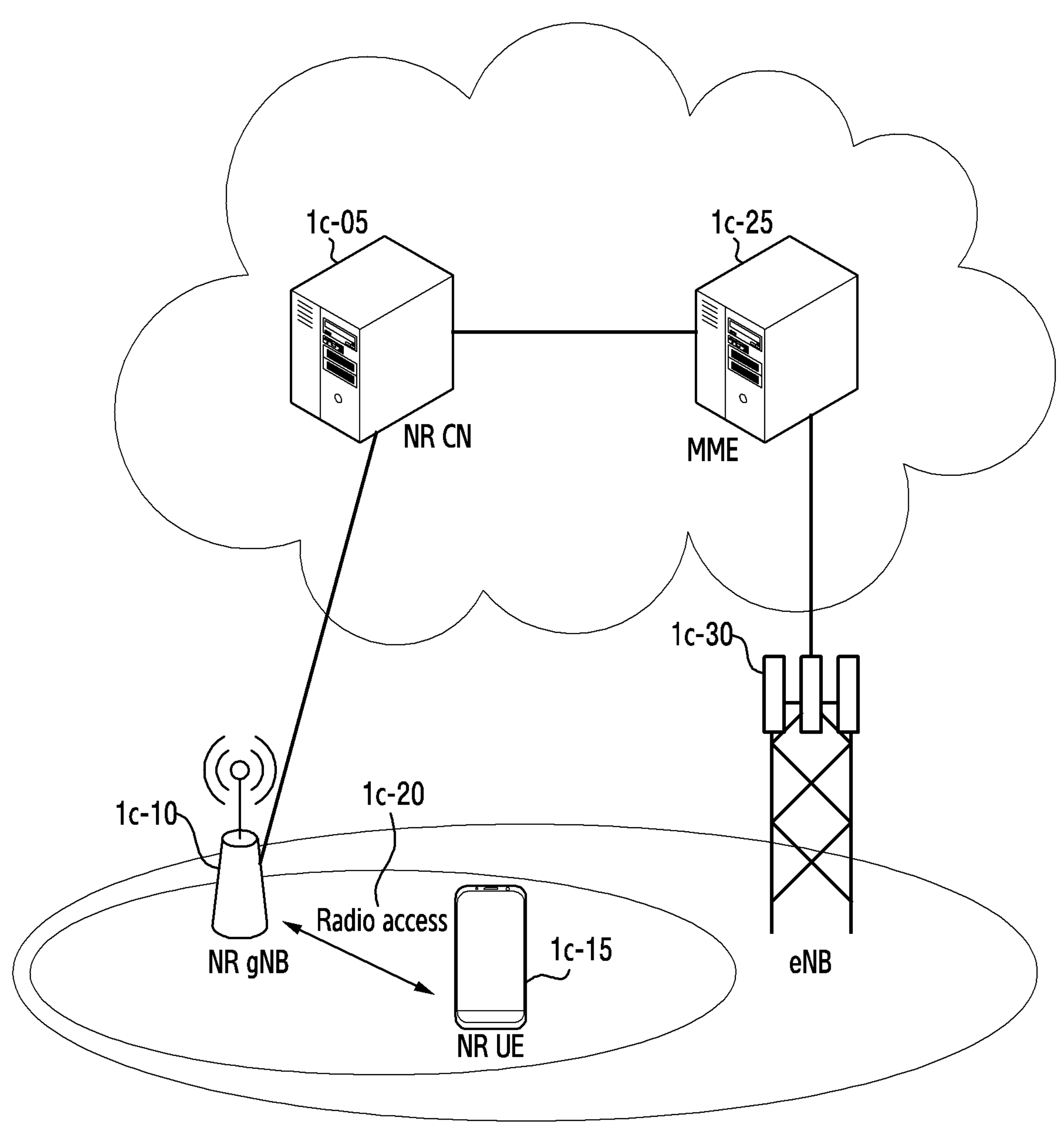
FIG. 7 illustrates a next-generation mobile communication system according to an embodiment of the disclosure.

FIG. 7 illustrates the structure of a next-generation mobile communication system according to an embodiment of the.

Referring to FIG. 7, a radio access network of a next-generation mobile communication system (hereinafter referred to as NR or 5G) includes a new radio node B (hereinafter referred to as an NR gNB, or NR base station) 1*c*-10 and a new radio core network (NR CN) 1*c*-05. A user terminal (a new radio user equipment, hereinafter referred to as NR UE or a UE) 1*c*-15 accesses an external network via an NR gNB 1*c*-10 and an NR CN 1*c*-05.

In FIG. 7, the NR gNB 1*c*-10 corresponds to an evolved node B (eNB) of the existing LTE system. The NR gNB is connected to the NR UE 1*c*-15 via a radio channel 1*c*-20, and may provide an excellent service as compared to the existing node B. In the next-generation mobile communication system, since all types of user traffics are serviced through a shared channel, there is a need for a device for performing scheduling by collecting state information, such as buffer states, available transmission power states, and channel states of UEs. Further, the NR NB 1*c*-10 is in charge of this function of the device. In general, one NR gNB typically controls multiple cells. In order to implement ultra-high speed data transmission as compared to the existing LTE, the NR gNB may have the existing maximum bandwidth or more, and may additionally employ beamforming technology using orthogonal frequency division multiplexing (hereinafter referred to as OFDM) as a radio access technology. In addition, the NR gNB adopts an adaptive modulation & coding (AMC) scheme that determines a modulation scheme and a channel coding rate based on the channel state of a UE. The NR CN 1*c*-05 performs functions, such as mobility support, bearer configuration, QoS configuration, and the like. The NR CN is a device that is in charge of various control functions in addition to a mobility management function for a UE, and is connected to multiple base stations. In addition, the next-generation mobile communication system may also operate in conjunction with the existing LTE system, and the NR CN may be connected to an MME 1*c*-25 via a network interface. The MME is connected to an eNB 1*c*-30, that is, to the existing base station.

Figure 8:
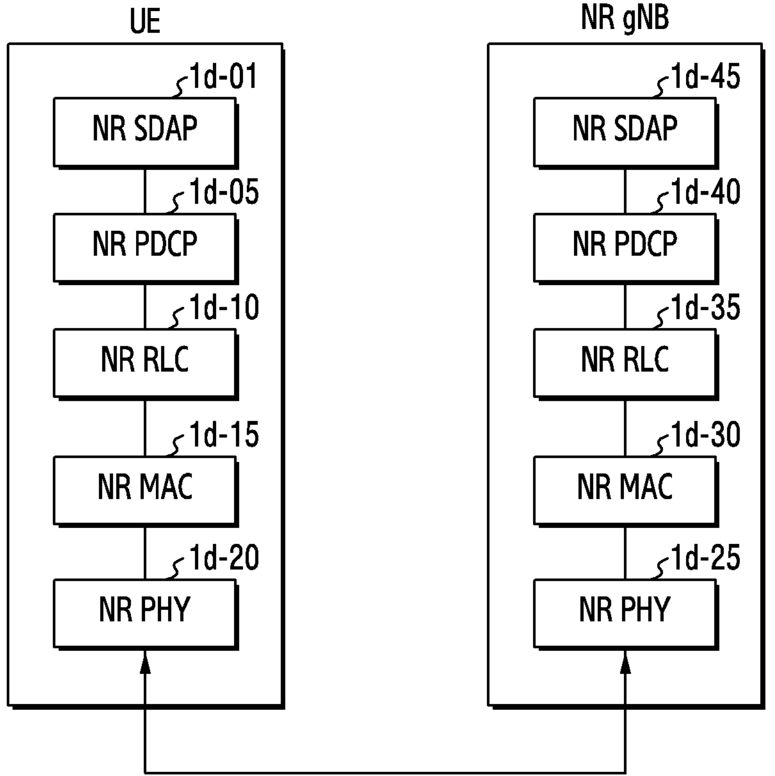
FIG. 8 illustrates a radio protocol structure of a next-generation mobile communication system according to an embodiment of the disclosure.

FIG. 8 illustrates a radio protocol structure of a next-generation mobile communication system according to an embodiment of the disclosure.

Referring to FIG. 8, the radio protocol of the next-generation mobile communication system includes NR SDAPs 1*d*-01 and 1*d*-45, NR PDCPs 1*d*-05 and 1*d*-40, NR RLCs 1*d*-10 and 1*d*-35, and NR MACs 1*d*-15 and 1*d*-30, respectively, in a UE and an NR base station.

The main functions of the NR SDAPs 1*d*-01 and 1*d*-45 may include some of the following functions.

- Transfer of user plane data
- Mapping between a QoS flow and a data bearer (DRB) for both downlink (DL) and uplink (UL)
- Marking QoS flow ID in both DL and UL packets
- Mapping reflective QoS flow to DRB for the UL SDAP PDUs For the SDAP layer device, the UE may be configured as to whether or not use the header of the SDAP layer device (or new layer device) or the function of the SDAP layer device (or new layer device) for each PDCP layer device, for each bearer, and for each logical channel through an RRC message. When the SDAP header is configured, an NAS reflective QoS reflective configuration 1-bit indicator (NAS reflective QoS) and an AS QoS reflective configuration 1-bit indicator (AS reflective QoS) of the SDAP header are used to instruct the UE to enable updating or reconfiguration of the mapping information relating to the QoS flow of uplink and downlink and data bearer. The SDAP header may include QoS flow ID information indicating QoS. The QoS information may be used as data processing priority, scheduling information, etc., in order to support a smooth service.

The main functions of the NR PDCPs 1*d*-05 and 1*d*-40 may include some of the following functions.

- Header compression and decompression (ROHC only)
- Transfer of user data
- In-sequence delivery of upper layer PDUs
- Out-of-sequence delivery of upper layer PDUs
- PDCP PDU reordering for reception
- Duplicate detection of lower layer SDUs
- Retransmission of PDCP SDUs
- Ciphering and deciphering
- Timer-based SDU discard in uplink The reordering function of the NR PDCP device refers to a function of sequentially reordering PDCP PDUs, received from a lower layer, based on a PDCP sequence number (SN), and may include a function of transmitting data to an upper layer in the reordered sequence, a function of directly transmitting data to an upper layer without taking the sequence into consideration, a function of reordering the sequence and recording missing PDCP PDUs, a function of providing a state report on the missing PDCP PDUs to a transmission side, and a function of requesting retransmission of the missing PDCP PDUs.

The main functions of the NR RLCs 1*d*-10 and 1*d*-35 may include some of the following functions.

- Transfer of upper layer PDUs
- In-sequence delivery of upper layer PDUs
- Out-of-sequence delivery of upper layer PDUs
- Error Correction through ARQ
- Concatenation, segmentation and reassembly of RLC SDUs
- Re-segmentation of RLC data PDUs
- Reordering of RLC data PDUs
- Duplicate detection
- Protocol error detection
- RLC SDU discard
- RLC re-establishment The in-sequence delivery function of the NR RLC device refers to a function of transmitting RLC SDUs, received from a lower layer, to an upper layer in a sequence of reception, and may include, if one RLC SDU is originally segmented into multiple RLC SDUs and received, a function of reassembling and transmitting the multiple RLC SDUs. The in-sequence delivery function may include a function of reordering the received RLC PDUs based on an RLC SN or PDCP SN, reordering the sequence and recording missing RLC PDUs, providing a state report on the missing RLC PDUs to a transmission side, and requesting retransmission of the missing RLC PDUs. Alternatively, the in-sequence delivery function of the NR RLC device may include a function of sequentially transmitting only RLC SDUs prior to the missing RLC SDU to an upper layer if an RLC SDU is missing, or sequentially transmitting all the RLC SDUs received before a timer starts to an upper layer if the timer expires even if there is a missing RLC SDU, or sequentially transmitting all RLC SDUs received so far to an upper layer if a predetermined timer expires even if there is a missing RLC SDU. In addition, the RLC PDUs may be processed in the sequence in which the RLC PDUS are received (in a sequence of arrival regardless of the serial number or sequence number), and may be transmitted to a PDCP device in out-of-sequence delivery. The in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer, or may be replaced by a multiplexing function of the NR MAC layer.

The out-of-sequence delivery function of the NR RLC device refers to a function of directly transmitting the RLC SDUs, received from the lower layer, to an upper layer regardless of the order thereof, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs 1*d*-15 and 1*d*-30 may be connected to multiple NR RLC layer devices configured in one UE, and the main function of the NR MAC may include some of the following functions.

- Mapping between logical channels and transport channels
- Multiplexing/de-multiplexing of MAC SDUs
- Scheduling information reporting Error correction through HARQ Priority handling between logical channels of one UE Priority handling between UEs by means of dynamic scheduling MBMS service identification Transport format selection Padding The NR PHY layers 1*d*-20 and 1*d*-25 may perform operations of channel-coding and modulating upper layer data, forming the upper layer data into an OFDM symbol, transmitting the OFDM symbols via a radio channel or demodulating and channel decoding of the OFDM symbols received via the radio channel, and transferring the OFDM symbol to an upper layer.

Figure 9:
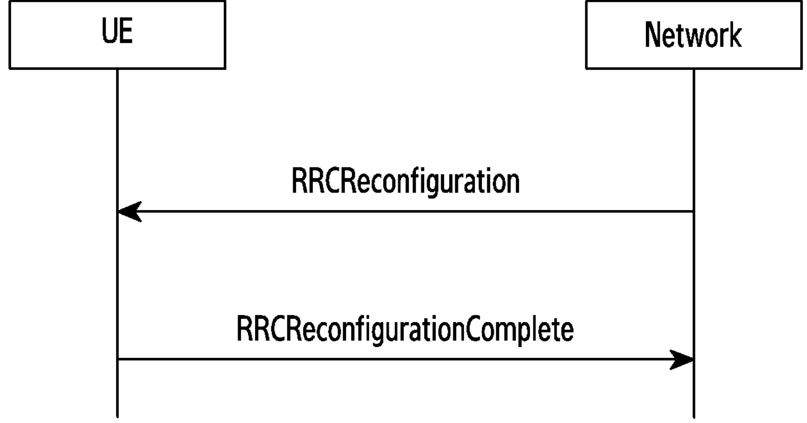
FIG. 9 illustrates a message flow illustrating radio resource control (RRC) reconfiguration, successful according to an embodiment of the disclosure.

FIG. 9 illustrates a message flow illustrating RRC reconfiguration, successful according to an embodiment of the disclosure.

Figure 10:
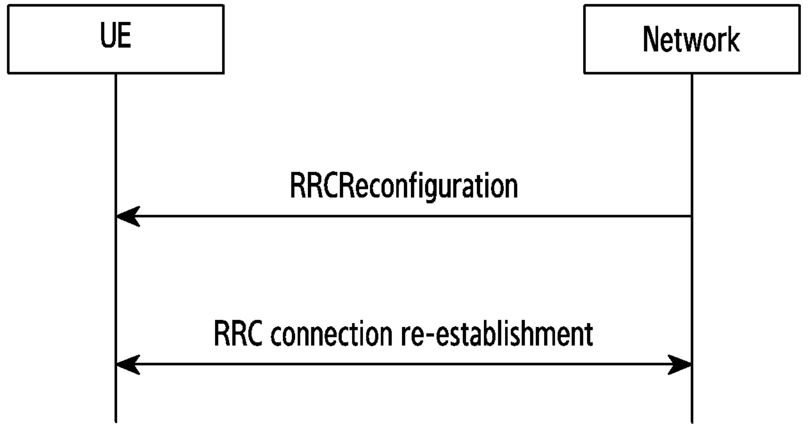
FIG. 10 illustrates a message flow illustrating RRC reconfiguration, failure according to an embodiment of the disclosure.

FIG. 10 illustrates a message flow illustrating RRC reconfiguration, failure according to an embodiment of the disclosure.

The following relates to RRC Procedures. Reference is made to FIGS. 9 and 10.

The purpose of this procedure is to modify an RRC connection, e.g. to establish/modify/release RBs/BH RLC channels/Uu Relay RLC channels/PC5 Relay RLC channels, to perform reconfiguration with sync, to setup/modify/release measurements, to add/modify/release SCells and cell groups, to add/modify/release conditional handover configuration, to add/modify/release conditional PSCell change or conditional PSCell addition configuration, to add/modify/LTM candidate cells. As part of the procedure, NAS dedicated information may be transferred from the Network to the UE.

RRC reconfiguration to perform reconfiguration with sync includes, but is not limited to, the following cases:

reconfiguration with sync and security key refresh, involving RA to the Pcell/PSCell, MAC reset, refresh of security and re-establishment of RLC and PDCP triggered by explicit L2 indicators;

reconfiguration with sync but without security key refresh, involving RA to the Pcell/PSCell, MAC reset and RLC re-establishment and PDCP data recovery (for AM DRB or AM MRB) triggered by explicit L2 indicators.

reconfiguration with sync for DAPS and security key refresh, involving RA to the target Pcell, establishment of target MAC, and for non-DAPS bearer: refresh of security and re-establishment of RLC and PDCP triggered by explicit L2 indicators;

for DAPS bearer: establishment of RLC for the target Pcell, refresh of security and reconfiguration of PDCP to add the ciphering function, the integrity protection function and ROHC function of the target Pcell;

for SRB: refresh of security and establishment of RLC and PDCP for the target Pcell;

reconfiguration with sync for DAPS but without security key refresh, involving RA to the target Pcell, establishment of target MAC, and for non-DAPS bearer: RLC re-establishment and PDCP data recovery (for AM DRB or AM MRB) triggered by explicit L2 indicators.

for DAPS bearer: establishment of RLC for target Pcell, reconfiguration of PDCP to add the ciphering function, the integrity protection function and ROHC function of the target Pcell;

for SRB: establishment of RLC and PDCP for the target Pcell.

reconfiguration with sync for direct-to-indirect path switch, not involving RA at target side, involving re-establishment of PDCP/PDCP data recovery (for AM DRB) triggered by explicit L2 indicators.

In (NG)EN-DC and NR-DC, SRB3 can be used for measurement configuration and reporting, for UE assistance (re-)configuration and reporting for power savings, for IP address (re-)configuration and reporting for IAB-nodes, to (re-)configure MAC, RLC, BAP, physical layer and RLF timers and constants of the SCG configuration, and to reconfigure PDCP for DRBs associated with the S-KgNB or SRB3, and to reconfigure SDAP for DRBs associated with S-KgNB in NGEN-DC and NR-DC, and to add/modify/release conditional PSCell change configuration, provided that the (re-)configuration does not require any MN involvement, and to transmit RRC messages between the MN and the UE during fast MCG link recovery. In (NG)EN-DC and NR-DC, only measConfig, radioBearerConfig, conditionalReconfiguration, bap-Config, iab-IP-AddressConfigurationList, otherConfig and/or secondaryCellGroup are included in RRCReconfiguration received via SRB3, except when RRCReconfiguration is received within DLInformationTransferMRDC.

Initiation

The Network may initiate the RRC reconfiguration procedure to a UE in RRC_CONNECTED. The Network applies the procedure as follows:

the establishment of RBs (other than SRB1, that is established during RRC connection establishment) is performed only when AS security has been activated;

the establishment of BH RLC Channels for IAB is performed only when AS security has been activated;

the establishment of Uu Relay RLC channels and PC5 Relay RLC channels (other than SL-RLC0 and SL-RLC1) for L2 U2N Relay UE is performed only when AS security has been activated, and the establishment of PC5 Relay RLC channels for L2 U2N Remote UE (other than SL-RLC0 and SL-RLC1) is performed only when AS security has been activated;

the addition of Secondary Cell Group and SCells is performed only when AS security has been activated;

the reconfigurationWithSync is included in secondaryCellGroup only when at least one RLC bearer or BH RLC channel is setup in SCG;

the reconfigurationWithSync is included in masterCellGroup only when AS security has been activated, and SRB2 with at least one DRB or multicast MRB or, for IAB, SRB2, are setup and not suspended;

the conditionalReconfiguration for CPC is included only when at least one RLC bearer is setup in SCG;

the conditionalReconfiguration for CHO or CPA is included only when AS security has been activated, and SRB2 with at least one DRB or multicast MRB or, for IAB, SRB2, are setup and not suspended.

the ltm-CandidateConfig (LTM candidate cell configuration) for LTM is included only when AS security has been activated, and SRB2 with at least one DRB are setup and not suspended.

Reception of an RRCReconfiguration by the UE

The UE shall perform the following actions upon reception of the RRCReconfiguration, or upon execution of the conditional reconfiguration (CHO, CPA or CPC):

For LTM cell switch, how to generate the RRCReconfigurationComplete message is proposed in the following.

Option 1. The RRCReconfigurationComplete message is generated upon the reception of LTM triggering MAC CE (or LTM cell switch execution) and then is sent to the target cell during LTM cell switch procedure (e.g. by Message 3 if random access procedure is performed or uplink data transmission if random access procedure is skipped (or not performed, i.e. RACH-less case). This Option 1 makes UE implementation simple because UE cannot know to which cell UE will perform LTM cell switch in advance.

NOTE: To reduce the processing delay for generation of RRCReconfiguration complete, UE may generate the RRCReconfigurationComplete message for each LTM candidate cell configuration upon the reception of RRCReconfiguration message including the ltm-CandidateConfig (LTM candidate cell configuration) in advance, i.e. UE can decide to send one of RRCReconfigurationComplete messages based on the received LTM triggering MAC CE in MAC entity for LTM cell switch procedure.

1> if the LTM cell switch is triggered from lower layers (e.g. by receiving the LTM triggering MAC CE in MAC entity or LTM cell switch execution) or if the target LTM candidate cell configuration is applied due to a LTM candidate cell execution (In another embodiment, the second RRCReconfigurationComplete message can be generated when the LTM cell switch (LTM execution) is successfully completed):

2> set the content of the RRCReconfigurationComplete message as follows:

3> include the LTM candidate cell configuration/information (e.g. cell identity or UE identity or configuration index or configuration identity) for the target cell indicated from lower layers (e.g. as indicated by LTM triggering MAC CE)

NOTE: In case this procedure is initiated due to the generation of a complete LTM candidate cell configuration, the UE should generate only one RRCReconfigurationComplete message even if it process the LTM reference configuration and a LTM candidate cell configuration. The RRCReconfigurationComplete message includes the contents for the target cell indicated by LTM triggering MAC CE.

1> if the RRCReconfiguration message includes the ltm-CandidateConfig (LTM candidate cell configuration):

2> perform the LTM configuration procedure as specified in 3.3.1.3;

1> set the content of the RRCReconfigurationComplete message as follows if the RRCReconfiguration message does not include the ltm-CandidateConfig (LTM candidate cell configuration):

NOTE: In case this procedure is initiated due to the generation of a complete LTM candidate cell configuration, the UE should generate only one RRCReconfigurationComplete message even if it process the LTM reference configuration and a LTM candidate cell configuration. The RRCReconfigurationComplete message includes the contents for the target cell indicated by LTM triggering MAC CE.

2> if the RRCReconfiguration includes the masterCellGroup containing the reportUplinkTxDirectCurrent:

3> include the uplinkTxDirectCurrentList for each MCG serving cell with UL;

3> include uplinkDirectCurrentBWP-SUL for each MCG serving cell configured with SUL carrier, if any, within the uplinkTxDirectCurrentList;

2> if the RRCReconfiguration includes the masterCellGroup containing the reportUplinkTxDirectCurrentTwoCarrier:

3> include in the uplinkTxDirectCurrentTwoCarrierList the list of uplink Tx DC locations for the configured intra-band uplink carrier aggregation in the MCG;

2> if the RRCReconfiguration includes the masterCellGroup containing the reportUplinkTxDirectCurrentMoreCarrier:

3> include in the uplinkTxDirectCurrentMoreCarrierList the list of uplink Tx DC locations for the configured intra-band uplink carrier aggregation in the MCG;

2> if the RRCReconfiguration includes the secondaryCellGroup containing the reportUplinkTxDirectCurrent:

3> include the uplinkTxDirectCurrentList for each SCG serving cell with UL;

3> include uplinkDirectCurrentBWP-SUL for each SCG serving cell configured with SUL carrier, if any, within the uplinkTxDirectCurrentList;

2> if the RRCReconfiguration includes the secondaryCellGroup containing the reportUplinkTxDirectCurrentTwoCarrier:

3> include in the uplinkTxDirectCurrentTwoCarrierList the list of uplink Tx DC locations for the configured intra-band uplink carrier aggregation in the SCG;

2> if the RRCReconfiguration includes the secondaryCellGroup containing the reportUplinkTxDirectCurrentMoreCarrier:

3> include in the uplinkTxDirectCurrentMoreCarrierList the list of uplink Tx DC locations for the configured intra-band uplink carrier aggregation in the SCG;

NOTE 0b: The UE does not expect that the reportUplinkTxDirectCurrentTwoCarrier or reportUplinkTxDirectCurrentMoreCarrier is received in both masterCellGroup and in secondaryCellGroup. Network only configures at most one of reportUplinkTxDirectCurrent, reportUplinkTxDirectCurrentTwoCarrier or reportUplinkTxDirectCurrentMoreCarrier in one RRC message.

2> if the RRCReconfiguration message includes the mrdc-SecondaryCellGroupConfig with mrdc-SecondaryCellGroup set to eutra-SCG:

3> include in the eutra-SCG-Response the E-UTRA RRCConnectionReconfigurationComplete message in accordance with TS 36.331 [10] clause 5.3.5.3;

2> if the RRCReconfiguration message includes the mrdc-SecondaryCellGroupConfig with mrdc-SecondaryCellGroup set to nr-SCG:

3> include in the nr-SCG-Response the SCG RRCReconfigurationComplete message;

3> if the RRCReconfiguration message is applied due to conditional reconfiguration execution and the RRCReconfiguration message does not include the reconfigurationWithSync in the masterCellGroup:

4> include in the selectedCondRRCReconfig the condReconfigId for the selected cell of conditional reconfiguration execution;

2> if the RRCReconfiguration includes the reconfigurationWithSync in spCellConfig of an MCG:

3> if the UE has logged measurements available for NR and if the RPLMN is included in plmn-IdentityList stored in VarLogMeasReport:

4> include the logMeasAvailable in the RRCReconfigurationComplete message;

4> if Bluetooth measurement results are included in the logged measurements the UE has available for NR:

5> include the logMeasAvailableBT in the RRCReconfigurationComplete message;

4> if WLAN measurement results are included in the logged measurements the UE has available for NR:

5> include the logMeasAvailableWLAN in the RRCReconfigurationComplete message;

3> if the sigLoggedMeasType in VarLogMeasReport is included:

4> if T330 timer is running and the logged measurements configuration is for NR:

5> set sigLogMeasConfigAvailable to true in the RRCReconfigurationComplete message;

4> else:

5> if the UE has logged measurements available for NR:

6> set sigLogMeasConfigAvailable to false in the RRCReconfigurationComplete message;

3> if the UE has connection establishment failure or connection resume failure information available in VarConnEstFailReport or VarConnEstFailReportList and if the RPLMN is equal to plmn-Identity stored in VarConnEstFailReport or in at least one of the entries of VarConnEstFailReportList:

4> include connEstFailInfoAvailable in the RRCReconfigurationComplete message;

3> if the UE has radio link failure or handover failure information available in VarRLF-Report and if the RPLMN is included in plmn-IdentityList stored in VarRLF-Report; or 3> if the UE has radio link failure or handover failure information available in VarRLF-Report of TS 36.331 [10] and if the UE is capable of cross-RAT RLF reporting and if the RPLMN is included in plmn-IdentityList stored in VarRLF-Report of TS 36.331 [10]:

4> include rlf-InfoAvailable in the RRCReconfiguration-Complete message;

3> if the UE was configured with successHO-Config when connected to the source Pcell; and 3> if the applied RRCReconfiguration is not due to a conditional reconfiguration execution upon cell selection performed while timer T311 was running, as defined in 5.3.7.3:

4> perform the actions for the successful handover report determination as specified in clause 5.7.10.6, upon successfully completing the Random Access procedure triggered for the reconfigurationWithSync in spCell-Config of the MCG;

3> if the UE has successful handover information available in VarSuccessHO-Report and if the RPLMN is included in plmn-IdentityList stored in VarSuccessHO-Report:

4> include successHO-InfoAvailable in the RRCReconfigurationComplete message;

2> if the RRCReconfiguration message was received via SRB1, but not within mrdc-SecondaryCellGroup or E-UTRA RRCConnectionReconfiguration or E-UTRA RRCConnectionResume:

3> if the UE is configured to provide the measurement gap requirement information of NR target bands:

4> if the RRCReconfiguration message includes the needForGapsConfigNR; or

4> if the NeedForGapsInfoNR information is changed compared to last time the UE reported this information:

5> include the NeedForGapsInfoNR and set the contents as follows:

6> include intraFreq-needForGap and set the gap requirement information of intra-frequency measurement for each NR serving cell;

6> if requestedTargetBandFilterNR is configured:

7> for each supported NR band that is also included in requestedTargetBandFilterNR, include an entry in interFreq-needForGap and set the gap requirement information for that band;

6> else:

7> include an entry in interFreq-needForGap and set the corresponding gap requirement information for each supported NR band;

3> if the UE is configured to provide the measurement gap and NCSG requirement information of NR target bands:

4> if the RRCReconfiguration message includes the needForGapNCSG-ConfigNR; or

4> if the needForGapNCSG-InfoNR information is changed compared to last time the UE reported this information:

5> include the NeedForGapNCSG-InfoNR and set the contents as follows:

6> include intraFreq-needForNCSG and set the gap and NCSG requirement information of intra-frequency measurement for each NR serving cell;

6> if requestedTargetBandFilterNCSG-NR is configured:

7> for each supported NR band included in requestedTargetBandFilterNCSG-NR, include an entry in interFreq-needForNCSG and set the NCSG requirement information for that band;

6> else:

7> include an entry for each supported NR band in interFreq-needForNCSG and set the corresponding NCSG requirement information;

3> if the UE is configured to provide the measurement gap and NCSG requirement information of E UTRA target bands:

4> if the RRCReconfiguration message includes the needForGapNCSG-ConfigEUTRA; or 4> if the needForGapNCSG-InfoEUTRA information is changed compared to last time the UE reported this information:

5> include the NeedForGapNCSG-InfoEUTRA and set the contents as follows:

6> if requestedTargetBandFilterNCSG-EUTRA is configured, for each supported E-UTRA band included in requestedTargetBandFilterNCSG-EUTRA, include an entry in needForNCSG-EUTRA and set the NCSG requirement information for that band; otherwise, include an entry for each supported E-UTRA band in needForNCSG-EUTRA and set the corresponding NCSG requirement information;

2> if this procedure is initiated due to the generation of a complete LTM candidate cell configuration:

3> the procedure ends.

Option 2. Upon the reception of RRCReconfiguation, RRCReconfigurationComplete is generated corresponding to the RRCReconfiguration, and sent to the source cell (serving cell or the current cell UE received the RRCReconfiguration from). Another RRCReconfigurationComplete message is generated upon the reception of LTM triggering MAC CE (or LTM cell switch execution) and then is sent to the target cell during LTM cell switch procedure (e.g. by Message 3 if random access procedure is performed or uplink data transmission if random access procedure is skipped (or not performed, i.e. RACH-less case). This Option 2 has the network know the successful delivery of RRCReconfiguration and makes UE implementation simple because UE cannot know to which cell UE will perform LTM cell switch in advance.

NOTE: To reduce the processing delay for generation of RRCReconfiguration complete, UE may generate the RRCReconfigurationComplete message for each LTM candidate cell configuration upon the reception of RRCReconfiguration message including the ltm-CandidateConfig (LTM candidate cell configuration) in advance, i.e. UE can decide to send one of RRCReconfigurationComplete messages based on the received LTM triggering MAC CE in MAC entity for LTM cell switch procedure.

1> if the LTM cell switch is triggered from lower layers (e.g. by receiving the LTM triggering MAC CE in MAC entity or LTM cell switch execution) or if the target LTM candidate cell configuration is applied due to a LTM candidate cell execution (In another embodiment, the second RRCReconfigurationComplete message can be generated when the LTM cell switch (LTM execution) is successfully completed):

2> set the content of the RRCReconfigurationComplete message as follows:

3> include the LTM candidate cell configuration/information (e.g. cell identity or UE identity or configuration index or configuration identity) for the target cell indicated from lower layers (e.g. as indicated by LTM triggering MAC CE)

NOTE: In case this procedure is initiated due to the generation of a complete LTM candidate cell configuration, the UE should generate only one RRCReconfigurationComplete message even if it process the LTM reference configuration and a LTM candidate cell configuration. The RRCReconfigurationComplete message includes the contents for the target cell indicated by LTM triggering MAC CE.

1> if the RRCReconfiguration message includes the ltm-CandidateConfig (LTM candidate cell configuration):

2> perform the LTM configuration procedure as specified in 3.3.1.3;

2> set the content of the RRCReconfigurationComplete message as follows:

NOTE: In case this procedure is initiated due to the generation of a complete LTM candidate cell configuration, the UE should generate only one RRCReconfigurationComplete message even if it process the LTM reference configuration and a LTM candidate cell configuration. The RRCReconfigurationComplete message includes the contents for the target cell indicated by LTM triggering MAC CE.

2> if the RRCReconfiguration includes the masterCellGroup containing the reportUplinkTxDirectCurrent:

3> include the uplinkTxDirectCurrentList for each MCG serving cell with UL;

3> include uplinkDirectCurrentBWP-SUL for each MCG serving cell configured with SUL carrier, if any, within the uplinkTxDirectCurrentList;

2> if the RRCReconfiguration includes the masterCellGroup containing the reportUplinkTxDirectCurrentTwoCarrier:

3> include in the uplinkTxDirectCurrentTwoCarrierList the list of uplink Tx DC locations for the configured intra-band uplink carrier aggregation in the MCG;

2> if the RRCReconfiguration includes the masterCellGroup containing the reportUplinkTxDirectCurrentMoreCarrier:

3> include in the uplinkTxDirectCurrentMoreCarrierList the list of uplink Tx DC locations for the configured intra-band uplink carrier aggregation in the MCG;

2> if the RRCReconfiguration includes the secondaryCellGroup containing the reportUplinkTxDirectCurrent:

3> include the uplinkTxDirectCurrentList for each SCG serving cell with UL;

3> include uplinkDirectCurrentBWP-SUL for each SCG serving cell configured with SUL carrier, if any, within the uplinkTxDirectCurrentList;

2> if the RRCReconfiguration includes the secondaryCellGroup containing the reportUplinkTxDirectCurrentTwoCarrier:

3> include in the uplinkTxDirectCurrentTwoCarrierList the list of uplink Tx DC locations for the configured intra-band uplink carrier aggregation in the SCG;

2> if the RRCReconfiguration includes the secondaryCellGroup containing the reportUplinkTxDirectCurrentMoreCarrier:

3> include in the uplinkTxDirectCurrentMoreCarrierList the list of uplink Tx DC locations for the configured intra-band uplink carrier aggregation in the SCG;

NOTE 0b: The UE does not expect that the reportUplinkTxDirectCurrentTwoCarrier or reportUplinkTxDirectCurrentMoreCarrier is received in both masterCellGroup and in secondaryCellGroup. Network only configures at most one of reportUplinkTxDirectCurrent, reportUplinkTxDirectCurrentTwoCarrier or reportUplinkTxDirectCurrentMoreCarrier in one RRC message.

2> if the RRCReconfiguration message includes the mrdc-SecondaryCellGroupConfig with mrdc-SecondaryCellGroup set to eutra-SCG:

3> include in the eutra-SCG-Response the E-UTRA RRCConnectionReconfigurationComplete message in accordance with TS 36.331 [10] clause 5.3.5.3;

2> if the RRCReconfiguration message includes the mrdc-SecondaryCellGroupConfig with mrdc-SecondaryCellGroup set to nr-SCG:

3> include in the nr-SCG-Response the SCG RRCReconfigurationComplete message;

3> if the RRCReconfiguration message is applied due to conditional reconfiguration execution and the RRCReconfiguration message does not include the reconfigurationWithSync in the masterCellGroup:

4> include in the selectedCondRRCReconfig the condReconfigId for the selected cell of conditional reconfiguration execution;

2> if the RRCReconfiguration includes the reconfigurationWithSync in spCellConfig of an MCG:

3> if the UE has logged measurements available for NR and if the RPLMN is included in plmn-IdentityList stored in VarLogMeasReport:

4> include the logMeasAvailable in the RRCReconfigurationComplete message;

4> if Bluetooth measurement results are included in the logged measurements the UE has available for NR:

5> include the logMeasAvailableBT in the RRCReconfigurationComplete message;

4> if WLAN measurement results are included in the logged measurements the UE has available for NR:

5> include the logMeasAvailableWLAN in the RRCReconfigurationComplete message;

3> if the sigLoggedMeasType in VarLogMeasReport is included:

4> if T330 timer is running and the logged measurements configuration is for NR:

5> set sigLogMeasConfigAvailable to true in the RRCReconfigurationComplete message;

4> else:

5> if the UE has logged measurements available for NR:

6> set sigLogMeasConfigAvailable to false in the RRCReconfigurationComplete message;

3> if the UE has connection establishment failure or connection resume failure information available in VarConnEstFailReport or VarConnEstFailReportList and if the RPLMN is equal to plmn-Identity stored in VarConnEstFailReport or in at least one of the entries of VarConnEstFailReportList:

4> include connEstFailInfoAvailable in the RRCReconfigurationComplete message;

3> if the UE has radio link failure or handover failure information available in VarRLF-Report and if the RPLMN is included in plmn-IdentityList stored in VarRLF-Report; or 3> if the UE has radio link failure or handover failure information available in VarRLF-Report of TS 36.331 [10] and if the UE is capable of cross-RAT RLF reporting and if the RPLMN is included in plmn-IdentityList stored in VarRLF-Report of TS 36.331 [10]:

4> include rlf-InfoAvailable in the RRCReconfigurationComplete message;

3> if the UE was configured with successHO-Config when connected to the source Pcell; and 3> if the applied RRCReconfiguration is not due to a conditional reconfiguration execution upon cell selection performed while timer T311 was running, as defined in 5.3.7.3:

4> perform the actions for the successful handover report determination as specified in clause 5.7.10.6, upon successfully completing the Random Access procedure triggered for the reconfigurationWithSync in spCellConfig of the MCG;

3> if the UE has successful handover information available in VarSuccessHO-Report and if the RPLMN is included in plmn-IdentityList stored in VarSuccessHO-Report:

4> include successHO-InfoAvailable in the RRCReconfigurationComplete message;

2> if the RRCReconfiguration message was received via SRB1, but not within mrdc-SecondaryCellGroup or E-UTRA RRCConnectionReconfiguration or E-UTRA RRCConnectionResume:

3> if the UE is configured to provide the measurement gap requirement information of NR target bands:

4> if the RRCReconfiguration message includes the needForGapsConfigNR; or

4> if the NeedForGapsInfoNR information is changed compared to last time the UE reported this information:

5> include the NeedForGapsInfoNR and set the contents as follows:

6> include intraFreq-needForGap and set the gap requirement information of intra-frequency measurement for each NR serving cell;

6> if requestedTargetBandFilterNR is configured:

7> for each supported NR band that is also included in requestedTargetBandFilterNR, include an entry in interFreq-needForGap and set the gap requirement information for that band;

6> else:

7> include an entry in interFreq-needForGap and set the corresponding gap requirement information for each supported NR band;

3> if the UE is configured to provide the measurement gap and NCSG requirement information of NR target bands:

4> if the RRCReconfiguration message includes the needForGapNCSG-ConfigNR; or

4> if the needForGapNCSG-InfoNR information is changed compared to last time the UE reported this information:

5> include the NeedForGapNCSG-InfoNR and set the contents as follows:

6> include intraFreq-needForNCSG and set the gap and NCSG requirement information of intra-frequency measurement for each NR serving cell;

6> if requestedTargetBandFilterNCSG-NR is configured:

7> for each supported NR band included in requestedTargetBandFilterNCSG-NR, include an entry in interFreq-needForNCSG and set the NCSG requirement information for that band;

6> else:

7> include an entry for each supported NR band in interFreq-needForNCSG and set the corresponding NCSG requirement information;

3> if the UE is configured to provide the measurement gap and NCSG requirement information of E UTRA target bands:

4> if the RRCReconfiguration message includes the needForGapNCSG-ConfigEUTRA; or 4> if the needForGapNCSG-InfoEUTRA information is changed compared to last time the UE reported this information:

5> include the NeedForGapNCSG-InfoEUTRA and set the contents as follows:

6> if requestedTargetBandFilterNCSG-EUTRA is configured, for each supported E-UTRA band included in requestedTargetBandFilterNCSG-EUTRA, include an entry in needForNCSG-EUTRA and set the NCSG requirement information for that band; otherwise, include an entry for each supported E-UTRA band in needForNCSG-EUTRA and set the corresponding NCSG requirement information;

2> if this procedure is initiated due to the generation of a complete LTM candidate cell configuration:

3> the procedure ends.

Option 3. Upon the reception of RRCReconfiguration, RRCReconfigurationComplete is generated corresponding to the RRCReconfiguration, and sent to the source cell (serving cell or the current cell UE received the RRCReconfiguration from). A RRCReconfigurationComplete message is generated and sent to the target LTM cell if the Random Access procedure is triggered upon the reception of LTM triggering MAC CE (or LTM cell switch execution) (e.g. by Message 3). However, the RRCReconfigurationComplete message is not generated and not sent to the target LTM Cell if the random access procedure is not triggered or not performed (i.e. skipped (RACH-less case) upon the reception of LTM triggering MAC CE (or LTM cell switch execution). UE can perform the uplink data transmission without RRCReconfigurationComplete message (i.e. only with user plane data). This Option 3 reduces the signaling overhead on top of the benefits of Option 2.

To reduce the processing delay for generation of RRCReconfiguration complete, UE may generate the RRCReconfigurationComplete message for each LTM candidate cell configuration upon the reception of RRCReconfiguration message including the ltm-CandidateConfig (LTM candidate cell configuration) in advance, i.e. UE can decide to send one of RRCReconfigurationComplete messages based on the received LTM triggering MAC CE in MAC entity for LTM cell switch procedure.

3> if the LTM cell switch is triggered from lower layers (e.g. by receiving the LTM triggering MAC CE in MAC entity or LTM cell switch execution) or if the target LTM candidate cell configuration is applied due to a LTM candidate cell execution or the Random Access procedure is triggered (or if lower layers (i.e. MAC layer) indicate that a Random Access procedure is needed for LTM Cell execution or if BFI_COUNTER>=beamFailureInstanceMaxCount for the target LTM candidate cell or the timeAlignmentTimer associated with the target LTM candidate cell (or TAG that the target LTM cell belongs to) is not running or if the first MAC CE does not include TA value (i.e. Timing Advance Command) or if the first MAC CE indicates that a Random access procedure is needed by indicator (e.g. special TA value)) (In another embodiment, the second RRCReconfigurationComplete message can be generated when the LTM cell switch (LTM execution) is successfully completed):

2> set the content of the RRCReconfigurationComplete message as follows:

3> include the LTM candidate cell configuration/information (e.g. cell identity or UE identity or configuration index or configuration identity) for the target cell indicated from lower layers (e.g. as indicated by LTM triggering MAC CE)

NOTE: In case this procedure is initiated due to the generation of a complete LTM candidate cell configuration, the UE should generate only one RRCReconfigurationComplete message even if it process the LTM reference configuration and a LTM candidate cell configuration. The RRCReconfigurationComplete message includes the contents for the target cell indicated by LTM triggering MAC CE.

1> if the RRCReconfiguration message includes the ltm-CandidateConfig (LTM candidate cell configuration):

2> perform the LTM configuration procedure as specified in 3.3.1.3;

4> set the content of the RRCReconfigurationComplete message as follows:

NOTE: In case this procedure is initiated due to the generation of a complete LTM candidate cell configuration, the UE should generate only one RRCReconfigurationComplete message even if it process the LTM reference configuration and a LTM candidate cell configuration. The RRCReconfigurationComplete message includes the contents for the target cell indicated by LTM triggering MAC CE.

2> if the RRCReconfiguration includes the masterCellGroup containing the reportUplinkTxDirectCurrent:

3> include the uplinkTxDirectCurrentList for each MCG serving cell with UL;

3> include uplinkDirectCurrentBWP-SUL for each MCG serving cell configured with SUL carrier, if any, within the uplinkTxDirectCurrentList;

2> if the RRCReconfiguration includes the masterCellGroup containing the reportUplinkTxDirectCurrentTwoCarrier:

3> include in the uplinkTxDirectCurrentTwoCarrierList the list of uplink Tx DC locations for the configured intra-band uplink carrier aggregation in the MCG;

2> if the RRCReconfiguration includes the masterCellGroup containing the reportUplinkTxDirectCurrentMoreCarrier:

3> include in the uplinkTxDirectCurrentMoreCarrierList the list of uplink Tx DC locations for the configured intra-band uplink carrier aggregation in the MCG;

2> if the RRCReconfiguration includes the secondaryCellGroup containing the reportUplinkTxDirectCurrent:

3> include the uplinkTxDirectCurrentList for each SCG serving cell with UL;

3> include uplinkDirectCurrentBWP-SUL for each SCG serving cell configured with SUL carrier, if any, within the uplinkTxDirectCurrentList;

2> if the RRCReconfiguration includes the secondaryCellGroup containing the reportUplinkTxDirectCurrentTwoCarrier:

3> include in the uplinkTxDirectCurrentTwoCarrierList the list of uplink Tx DC locations for the configured intra-band uplink carrier aggregation in the SCG;

2> if the RRCReconfiguration includes the secondaryCellGroup containing the reportUplinkTxDirectCurrentMoreCarrier:

3> include in the uplinkTxDirectCurrentMoreCarrierList the list of uplink Tx DC locations for the configured intra-band uplink carrier aggregation in the SCG;

NOTE 0b: The UE does not expect that the reportUplinkTxDirectCurrentTwoCarrier or reportUplinkTxDirectCurrentMoreCarrier is received in both masterCellGroup and in secondaryCellGroup. Network only configures at most one of reportUplinkTxDirectCurrent, reportUplinkTxDirectCurrentTwoCarrier or reportUplinkTxDirectCurrentMoreCarrier in one RRC message.

2> if the RRCReconfiguration message includes the mrdc-SecondaryCellGroupConfig with mrdc-SecondaryCellGroup set to eutra-SCG:

3> include in the eutra-SCG-Response the E-UTRA RRCConnectionReconfigurationComplete message in accordance with TS 36.331 [10] clause 5.3.5.3;

2> if the RRCReconfiguration message includes the mrdc-SecondaryCellGroupConfig with mrdc-SecondaryCellGroup set to nr-SCG:

3> include in the nr-SCG-Response the SCG RRCReconfigurationComplete message;

3> if the RRCReconfiguration message is applied due to conditional reconfiguration execution and the RRCReconfiguration message does not include the reconfigurationWithSync in the masterCellGroup:

4> include in the selectedCondRRCReconfig the condReconfigId for the selected cell of conditional reconfiguration execution;

2> if the RRCReconfiguration includes the reconfigurationWithSync in spCellConfig of an MCG:

3> if the UE has logged measurements available for NR and if the RPLMN is included in plmn-IdentityList stored in VarLogMeasReport:

4> include the logMeasAvailable in the RRCReconfigurationComplete message;

4> if Bluetooth measurement results are included in the logged measurements the UE has available for NR:

5> include the logMeasAvailableBT in the RRCReconfigurationComplete message;

4> if WLAN measurement results are included in the logged measurements the UE has available for NR:

5> include the logMeasAvailableWLAN in the RRCReconfigurationComplete message;

3> if the sigLoggedMeasType in VarLogMeasReport is included:

4> if T330 timer is running and the logged measurements configuration is for NR:

5> set sigLogMeasConfigAvailable to true in the RRCReconfigurationComplete message;

4> else:

5> if the UE has logged measurements available for NR:

6> set sigLogMeasConfigAvailable to false in the RRCReconfigurationComplete message;

3> if the UE has connection establishment failure or connection resume failure information available in VarConnEstFailReport or VarConnEstFailReportList and if the RPLMN is equal to plmn-Identity stored in VarConnEstFailReport or in at least one of the entries of VarConnEstFailReportList:

4> include connEstFailInfoAvailable in the RRCReconfigurationComplete message;

3> if the UE has radio link failure or handover failure information available in VarRLF-Report and if the RPLMN is included in plmn-IdentityList stored in VarRLF-Report; or 3> if the UE has radio link failure or handover failure information available in VarRLF-Report of TS 36.331 [10] and if the UE is capable of cross-RAT RLF reporting and if the RPLMN is included in plmn-IdentityList stored in VarRLF-Report of TS 36.331 [10]:

4> include rlf-InfoAvailable in the RRCReconfigurationComplete message;

3> if the UE was configured with successHO-Config when connected to the source Pcell; and 3> if the applied RRCReconfiguration is not due to a conditional reconfiguration execution upon cell selection performed while timer T311 was running, as defined in 5.3.7.3:

4> perform the actions for the successful handover report determination as specified in clause 5.7.10.6, upon successfully completing the Random Access procedure triggered for the reconfigurationWithSync in spCellConfig of the MCG;

3> if the UE has successful handover information available in VarSuccessHO-Report and if the RPLMN is included in plmn-IdentityList stored in VarSuccessHO-Report:

4> include successHO-InfoAvailable in the RRCReconfigurationComplete message;

2> if the RRCReconfiguration message was received via SRB1, but not within mrdc-SecondaryCellGroup or E-UTRA RRCConnectionReconfiguration or E-UTRA RRCConnectionResume:

3> if the UE is configured to provide the measurement gap requirement information of NR target bands:

4> if the RRCReconfiguration message includes the needForGapsConfigNR; or

4> if the NeedForGapsInfoNR information is changed compared to last time the UE reported this information:

5> include the NeedForGapsInfoNR and set the contents as follows:

6> include intraFreq-needForGap and set the gap requirement information of intra-frequency measurement for each NR serving cell;

6> if requestedTargetBandFilterNR is configured:

7> for each supported NR band that is also included in requestedTargetBandFilterNR, include an entry in interFreq-needForGap and set the gap requirement information for that band;

6> else:

7> include an entry in interFreq-needForGap and set the corresponding gap requirement information for each supported NR band;

3> if the UE is configured to provide the measurement gap and NCSG requirement information of NR target bands:

4> if the RRCReconfiguration message includes the needForGapNCSG-ConfigNR; or

4> if the needForGapNCSG-InfoNR information is changed compared to last time the UE reported this information:

5> include the NeedForGapNCSG-InfoNR and set the contents as follows:

6> include intraFreq-needForNCSG and set the gap and NCSG requirement information of intra-frequency measurement for each NR serving cell;

6> if requestedTargetBandFilterNCSG-NR is configured:

7> for each supported NR band included in requestedTargetBandFilterNCSG-NR, include an entry in interFreq-needForNCSG and set the NCSG requirement information for that band;

6> else:

7> include an entry for each supported NR band in interFreq-needForNCSG and set the corresponding NCSG requirement information;

3> if the UE is configured to provide the measurement gap and NCSG requirement information of E UTRA target bands:

4> if the RRCReconfiguration message includes the needForGapNCSG-ConfigEUTRA; or 4> if the needForGapNCSG-InfoEUTRA information is changed compared to last time the UE reported this information:

5> include the NeedForGapNCSG-InfoEUTRA and set the contents as follows:

6> if requestedTargetBandFilterNCSG-EUTRA is configured, for each supported E-UTRA band included in requestedTargetBandFilterNCSG-EUTRA, include an entry in needForNCSG-EUTRA and set the NCSG requirement information for that band; otherwise, include an entry for each supported E-UTRA band in needForNCSG-EUTRA and set the corresponding NCSG requirement information;

2> if this procedure is initiated due to the generation of a complete LTM candidate cell configuration:

3> the procedure ends.

RRCReconfigurationComplete

As set out above, RRCReconfigurationComplete message is generated and transmitted to the target LTM candidate cell during LTM execution procedure or when the target LTM cell configuration (indicated by the configuration Identity in the first MAC CE) is applied or upon the reception of the first MAC CE in Option 1, Option 2 or Option 3 (e.g. if the Random Access procedure (or RACH-less solution) is triggered upon the reception of LTM triggering MAC CE).

For Option 1, Option 2 or Option 3, we also propose how to submit the RRCReconfigurationComplete message via which SRB during LTM execution procedure, which is also extended to the dual connectivity scenario (e.g. for UE configured with MCG and SCG). As proposed in this disclosure, the LTM candidate cell configurations can be configured via SRB1 or split SRB1 or SRB3 by RRCReconfiguration message. The LTM candidate cell configurations for MCG or SCG can be configured via SRB1 or split SRB1 or SRB3 by RRCReconfiguration message. The RRCReconfiguration message including LTM candidate cell configurations does not include reconfigurationWithSync to avoid RRC message triggered handover.

The UE configured with single connectivity (i.e. MCG only) or not configured with dual connectivity (i.e. MCG and SCG or MCG) can be configured with LTM candidate cell configurations (e.g. for MCG) by the reception of a first RRCReconfiguration message via SRB1. Then, a first RRCReconfigurationComplete message corresponding to the first RRCReconfiguration can be generated and sent to the source serving cell (Master gNB, i.e. MCG) via SRB1 where sent the first RRCReconfiguration message to UE. When UE receives the first MAC CE including the target LTM configuration ID (Identity) from the source serving cell, UE can apply the corresponding target LTM configuration (e.g., for MCG) (or RRCReconfiguration for the target LTM cell of MCG) indicated by the configuration ID in the first MAC CE. Upon the reception of the first MAC CE or the application of the target LTM configuration, UE generates a second RRCReconfigurationComplete corresponding the target LTM configuration with the contents (e.g. configuration ID or information for the target LTM configuration or reply or confirmation) and sends to the target cell (or gNB or MCG) via SRB1. In another embodiment, the second RRCReconfigurationComplete message can be generated when the LTM cell switch (LTM execution) is successfully completed.

Furthermore, we propose how to submit the first RRCReconfigurationComplete as follows (which can be also applied to UE configured with dual connectivity):

1> if the UE is configured with E-UTRA nr-SecondaryCellGroupConfig (UE in (NG)EN-DC):

2> submit the first RRCReconfigurationComplete via E-UTRA;

1> else if the first RRCReconfiguration message was received via SRB3 (UE in NR-DC):

2> if the first RRCReconfiguration message was received within DLInformationTransferMRDC:

3> if the first RRCReconfiguration message was received within the nr-SCG within mrdc-SecondaryCellGroup (NR SCG RRC Reconfiguration):

4> perform SCG reconfiguration accordingly:

3> else (e.g. first RRCReconfiguration message was received within master cell group configuration (NR MCG RRCReconfiguration):

4> submit the first RRCReconfigurationComplete message via SRB1 to lower layers for transmission using the new configuration;

2> else:

3> submit the first RRCReconfigurationComplete message via SRB3 to lower layers for transmission using the new configuration;

1> else (the first RRCReconfiguration was received via SRB1):

2> submit the first RRCReconfigurationComplete message via SRB1 to lower layers for transmission using the new configuration;

The UE configured with dual connectivity (i.e. MCG and SCG) can be configured with LTM candidate cell configurations (e.g. for MCG or SCG) by the reception of a first RRCReconfiguration message via SRB1 (or split SRB1) or SRB3. a first RRCReconfigurationComplete message corresponding to the first RRCReconfiguration can be generated and sent to the source serving cell.

For each case of dual connectivity, we propose how to submit the second RRCReconfigurationComplete as follows:

In case that a UE is configured with LTM candidate cell configuration for SCG or in case that the LTM cell switch is triggered from lower layers (e.g. by receiving the LTM triggering MAC CE from SCG in MAC entity of SCG or LTM cell switch execution in SCG) or if the target LTM candidate cell configuration for SCG is applied due to a LTM candidate cell execution, UE generates the second RRCReconfigurationComplete message. And then, if the UE is configured with E-UTRA nr-SecondaryCellGroupConfig (UE in (NG)EN-DC), UE submit the second RRCReconfigurationComplete via E-UTRA. In another embodiment, the second RRCReconfigurationComplete message can be generated when the LTM cell switch (LTM execution) is successfully completed.

If a UE is configured with LTM candidate cell configuration for SCG or if the LTM cell switch is triggered from lower layers (e.g. by receiving the LTM triggering MAC CE from SCG in MAC entity of SCG or LTM cell switch execution in SCG) or if the target LTM candidate cell configuration for SCG is applied due to a LTM candidate cell execution, UE generates the second RRCReconfigurationComplete message. And then, if the RRCReconfiguration message (or LTM candidate configuration for SCG) was received via SRB1 within the nr-SCG within mrdc-SecondaryCellGroup (UE in NR-DC, mrdc-SecondaryCellGroup was received in RRCReconfiguration or RRCResume via SRB1), UE submits the second RRCReconfigurationComplete message (e.g. to SCG or MCG via SRB1 (or via split SRB1)) via the NR MCG embedded in NR RRC message ULInformationTransferMRDC. In another embodiment, the second RRCReconfigurationComplete message can be generated when the LTM cell switch (LTM execution) is successfully completed.

In case that a UE is configured with received via SRB3 (UE in NR-DC) and if the RRCReconfiguration message (or LTM candidate configuration for SCG) was received within DLInformationTransferMRDC and in case that the RRCReconfiguration message was not received within the nr-SCG within mrdc-SecondaryCellGroup (i.e. it's not NR SCG RRC Reconfiguration, or if target LTM candidate cell configuration for SCG or if the LTM cell switch is triggered from lower layers (e.g. by receiving the LTM triggering MAC CE from SCG in MAC entity of SCG or LTM cell switch execution in SCG) or if the target LTM candidate cell configuration for SCG is applied due to a LTM candidate cell execution, UE generates the second RRCReconfigurationComplete message. And then, if the RRCReconfiguration message (or LTM candidate configuration for SCG) was LTM candidate configuration was received within master cell group configuration (i.e. it's NR MCG RRCReconfiguration), UE submits the second RRCReconfigurationComplete message via SRB1 to lower layers for transmission using the new configuration because DLInformationTransferMRDC includes the configuration from MCG, which need to be sent to MCG via SRB1. In another embodiment, the second RRCReconfigurationComplete message can be generated when the LTM cell switch (LTM execution) is successfully completed.

If a UE is configured with LTM candidate cell configuration for SCG or if the LTM cell switch is triggered from lower layers (e.g. by receiving the LTM triggering MAC CE from SCG in MAC entity of SCG or LTM cell switch execution in SCG) or if the target LTM candidate cell configuration for SCG is applied due to a LTM candidate cell execution, UE generates the second RRCReconfigurationComplete message. And then, if the RRCReconfiguration message (or LTM candidate configuration for SCG) was received via SRB3 (UE in NR-DC) and if the RRCReconfiguration message (or LTM candidate configuration for SCG) was not received within DLInformationTransferMRDC, UE submits the second RRCReconfigurationComplete message via SRB3 to lower layers for transmission using the new configuration because the configuration corresponds to SCG, which need to be sent to SCG via SRB3. In another embodiment, the second RRCReconfiguration- Complete message can be generated when the LTM cell switch (LTM execution) is successfully completed.

If a UE is configured with LTM candidate cell configuration for SCG or if the LTM cell switch is triggered from lower layers (e.g. by receiving the LTM triggering MAC CE from SCG in MAC entity of SCG or LTM cell switch execution in SCG) or if the target LTM candidate cell configuration for SCG is applied due to a LTM candidate cell execution, UE generates the second RRCReconfigurationComplete message. And then, if RRCReconfiguration (or LTM candidate configuration for SCG) was received via SRB1, UE submits the RRCReconfigurationComplete message via SRB1 to lower layers for transmission using the new configuration. In another embodiment, the second RRCReconfigurationComplete message can be generated when the LTM cell switch (LTM execution) is successfully completed.

To implement the proposals described above, specifically, the UE shall perform the following actions upon reception of the RRCReconfiguration, or upon execution of the conditional reconfiguration (CHO, CPA or CPC) or upon execution of LTM procedure (or LTM cell switch):

1> if the LTM cell switch is triggered from lower layers (e.g. by receiving the LTM triggering MAC CE in MAC entity or LTM cell switch execution) or if the target LTM candidate cell configuration is applied due to a LTM candidate cell execution:

2> set the content of the second RRCReconfigurationComplete message as follows:

3> include the LTM candidate cell configuration/information (e.g. cell identity or UE identity or configuration index or configuration identity) for the target cell indicated from lower layers (e.g. as indicated by LTM triggering MAC CE)

3> if the RRCReconfiguration message includes the mrdc-SecondaryCellGroupConfig with mrdc-SecondaryCellGroup set to nr-SCG:

4> include in the nr-SCG-Response the SCG RRCReconfigurationComplete message;

4> if the RRCReconfiguration message is applied due to conditional reconfiguration execution and the RRCReconfiguration message does not include the reconfigurationWithSync in the masterCellGroup:

5> include in the selectedCondRRCReconfig the condReconfigId for the selected cell of conditional reconfiguration execution;

4> if the RRCReconfiguration (or target LTM candidate configuration) is applied due to a LTM candidate cell execution for LTM cell switch (e.g. triggered by the reception of the first MAC CE) which can be configured via LTM candidate cell configuration contained in nr-SCG within mrdc-SecondaryCellGroup:

5> include in the selected LTM candidate configuration the configuration ID (Identity) for the selected LTM candidate cell of LTM execution. The configuration ID can be indicated by the first MAC CE;

To ease the network implementation for handling of the second RRCReconfigurationComplete messages, we also propose that the second RRCReconfigurationComplete is submitted as follows:

1> if the UE is configured with E-UTRA nr-SecondaryCellGroupConfig (UE in (NG)EN-DC):

2> submit the second RRCReconfigurationComplete via E-UTRA;

1> else if the RRCReconfiguration message (or target LTM candidate configuration) was received via SRB1 within the nr-SCG within mrdc-SecondaryCellGroup (UE in NR-DC, mrdc-SecondaryCellGroup was received in RRCReconfiguration or RRCResume via SRB1):

2> if the RRCReconfiguration is applied due to a conditional reconfiguration execution for CPC which is configured via conditionalReconfiguration contained in nr-SCG within mrdc-SecondaryCellGroup; or 2> if the RRCReconfiguration (or target LTM candidate configuration) is applied due to a LTM candidate cell execution for LTM cell switch (e.g. triggered by the reception of the first MAC CE) which can be configured via LTM candidate cell configuration contained in nr-SCG within mrdc-SecondaryCellGroup:

3> submit the second RRCReconfigurationComplete message (e.g. to SCG or MCG via SRB1 (or via split SRB1)) via the NR MCG embedded in NR RRC message ULInformationTransferMRDC, e.g. The UE shall set the contents of the ULInformationTransferMRDC message as follows: if there is a need to transfer MR-DC dedicated information related to NR, UE sets the ul-DCCH-MessageNR to include the NR MR-DC dedicated information to be transferred (e.g., NR RRC MeasurementReport, UEAssistanceInformation, FailureInformation, RRCReconfigurationComplete, MCGFailureInformation, or IABOtherInformation message.

1> else if the RRCReconfiguration message (or target LTM candidate configuration) was received via SRB3 (UE in NR-DC):

2> if the RRCReconfiguration message (or target LTM candidate configuration) was received within DLInformationTransferMRDC:

3> if the RRCReconfiguration message was received within the nr-SCG within mrdc-SecondaryCellGroup (NR SCG RRC Reconfiguration):

4> perform SCG reconfiguration accordingly:

3> else (e.g. target LTM candidate configuration was received within master cell group configuration (NR MCG RRCReconfiguration):

4> submit the second RRCReconfigurationComplete message via SRB1 to lower layers for transmission using the new configuration;

2> else:

3> submit the second RRCReconfigurationComplete message via SRB3 to lower layers for transmission using the new configuration;

1> else (RRCReconfiguration (or target LTM candidate configuration) was received via SRB1):

2> submit the second RRCReconfigurationComplete message via SRB1 to lower layers for transmission using the new configuration;

The DLInformationTransferMRDC message is used for the downlink transfer of RRC messages during fast MCG link recovery via SRB3 while the ULInformationTransferMRDC message is used for the uplink transfer of MR-DC dedicated information via SRB1 or SRB3 (e.g. for transferring the NR or E-UTRA RRC MeasurementReport message, the FailureInformation message, the UEAssistanceInformation message, the RRCReconfigurationComplete message, the IABOtherInformation message or the NR or E-UTRA RRC MCGFailureInformation message).

In another embodiment, the UE configured with dual connectivity (i.e. MCG and SCG) can be configured with LTM candidate cell configurations (e.g. for MCG or SCG) by the reception of a first RRCReconfiguration message via SRB1 (or split SRB1) or SRB3. a first RRCReconfigurationComplete message corresponding to the first RRCReconfiguration can be generated and sent to the source serving cell.

For each case of dual connectivity, we propose how to submit the second RRCReconfigurationComplete as follows:

If a UE is configured with LTM candidate cell configuration for MCG or if the LTM cell switch is triggered from lower layers (e.g. by receiving the LTM triggering MAC CE from MCG in MAC entity of MCG or LTM cell switch execution in MCG) or if the target LTM candidate cell configuration for MCG is applied due to a LTM candidate cell execution, UE generates the second RRCReconfigurationComplete message. And then, if RRCReconfiguration (or LTM candidate configuration for MCG) was received via SRB1, UE submits the RRCReconfigurationComplete message via SRB1 to lower layers for transmission using the new configuration. In another embodiment, the second RRCReconfigurationComplete message can be generated when the LTM cell switch (LTM execution) is successfully completed.

If a UE is configured with LTM candidate cell configuration for SCG or if the LTM cell switch is triggered from lower layers (e.g. by receiving the LTM triggering MAC CE from SCG in MAC entity of SCG or LTM cell switch execution in SCG) or if the target LTM candidate cell configuration for SCG is applied due to a LTM candidate cell execution, UE generates the second RRCReconfigurationComplete message. And then, if the RRCReconfiguration message (or LTM candidate configuration for SCG) was received via SRB1 within the nr-SCG within mrdc-SecondaryCellGroup (UE in NR-DC, mrdc-SecondaryCellGroup was received in RRCReconfiguration or RRCResume via SRB1), UE submits the second RRCReconfigurationComplete message (e.g. to SCG or MCG via SRB1 (or via split SRB1)) via the NR MCG embedded in NR RRC message ULInformationTransferMRDC. In another embodiment, the second RRCReconfigurationComplete message can be generated when the LTM cell switch (LTM execution) is successfully completed.

In case that a UE is configured with LTM candidate cell configuration for SCG or in case that the LTM cell switch is triggered from lower layers (e.g. by receiving the LTM triggering MAC CE from SCG in MAC entity of SCG or LTM cell switch execution in SCG) or if the target LTM candidate cell configuration for SCG is applied due to a LTM candidate cell execution, UE generates the second RRCReconfigurationComplete message. And then, if the RRCReconfiguration message (or LTM candidate configuration for SCG) was received via SRB3 (UE in NR-DC) and if the RRCReconfiguration message (or LTM candidate configuration for SCG) was not received within DLInformationTransferMRDC, UE submits the second RRCReconfigurationComplete message via SRB3 to lower layers for transmission using the new configuration because the configuration corresponds to SCG, which need to be sent to SCG via SRB3 and the DLInformationTransferMRDC message is used for the downlink transfer of RRC messages during fast MCG link recovery. In another embodiment, the second RRCReconfigurationComplete message can be generated when the LTM cell switch (LTM execution) is successfully completed.

If a UE is configured with LTM candidate cell configuration for SCG or if the LTM cell switch is triggered from lower layers (e.g. by receiving the LTM triggering MAC CE from SCG in MAC entity of SCG or LTM cell switch execution in SCG) or if the target LTM candidate cell configuration for SCG is applied due to a LTM candidate cell execution, UE generates the second RRCReconfigurationComplete message. And then, if RRCReconfiguration (or LTM candidate configuration for SCG) was received via SRB1, UE submits the RRCReconfigurationComplete message via SRB1 to lower layers for transmission using the new configuration. In another embodiment, the second RRCReconfigurationComplete message can be generated when the LTM cell switch (LTM execution) is successfully completed.

In another embodiment, the UE configured with dual connectivity (i.e. MCG and SCG) can be configured with LTM candidate cell configurations (e.g. for MCG or SCG) by the reception of a first RRCReconfiguration message via SRB1 (or split SRB1) or SRB3. a first RRCReconfigurationComplete message corresponding to the first RRCReconfiguration can be generated and sent to the source serving cell.

For each case of dual connectivity, we propose how to submit the second RRCReconfigurationComplete as follows:

If a UE is configured with LTM candidate cell configuration for MCG (or SCG) or if the LTM cell switch is triggered from lower layers (e.g. by receiving the LTM triggering MAC CE from MCG (or SCG) in MAC entity of MCG (or SCG) or LTM cell switch execution in MCG (or SCG)) or if the target LTM candidate cell configuration for MCG (or SCG) is applied due to a LTM candidate cell execution, UE generates the second RRCReconfigurationComplete message.

And then, UE submits the second RRCReconfigurationComplete as follows: (In another embodiment, the second RRCReconfigurationComplete message can be generated when the LTM cell switch (LTM execution) is successfully completed).

1> if the UE is in (NG)EN-DC:
  2> if SRB3 is configured or the SCG is not deactivated:
    3> submit the second RRCReconfigurationComplete via SRB3 to lower layers for transmission, upon which the procedure ends;
  2> else:
    3> submit the second RRCReconfigurationComplete via E-UTRA embedded in E-UTRA RRC message ULInformationTransferMRDC.
1> else if the UE is in NR-DC:
  2> if the LTM candidate cell configuration is associated with the SCG:
    3> if SRB3 is configured or the SCG is not deactivated:
      4> submit the second RRCReconfigurationComplete via SRB3 to lower layers for transmission, upon which the procedure ends;
    3> else:
      4> submit the second RRCReconfigurationComplete via SRB1 embedded in NR RRC message ULInformationTransferMRDC;
  2> else:
    3> submit the second RRCReconfigurationComplete via SRB1 to lower layers for transmission, upon which the procedure ends;
1> else (i.e. UE configured with single connectivity):
  2> submit the second RRCReconfigurationComplete to lower layers for transmission, upon which the procedure ends.

In this disclosure, LTM execution procedure for SCG can be performed if (or when) the SCG is not deactivated or if (or when) the SCG is activated.

LTM Configuration and Execution

In this embodiment, the LTM configuration for candidate cells can indicate the reference configuration for LTM candidate cells or the complete configuration for LTM candidate cells. The reference configuration can be the complete configuration or the reference configuration and a LTM candidate-cell specific configuration can be the complete configuration for the LTM candidate cell.

Upon LTM execution, UE can suspend all radio bearers except SRBs (e.g. SRB0, SRB1, SRB2, SRB3, SRB4 or SRB5), in order to avoid the data processing or data transmission (or reception) to the source cell or to avoid the data transmission in the random access procedure to the target cell. After the successful completion of LTM execution (or LTM cell switch to the target cell), UE can resume all suspended radio bearers except the SRBs to start the data transmission or reception.

The UE shall perform the following actions based on a received LTM-CandidateConfig IE:

1> store the received ltm-ReferenceConfiguration in VarLTM-Config, if present;

1> if the LTM-CandidateConfig includes the ltm-CandidateToReleaseList:

2> perform the LTM candidate cell release;

1> if the LTM-CandidateConfig includes the ltm-CandidateToAddModList:

2> perform the LTM candidate cell addition or reconfiguration;

1> perform the actions to generate a complete LTM configuration;

NOTE: It is up to the UE implementation to postpone the generation of a complete LTM configuration until the executing of an LTM cell switch.

LTM Candidate Cell Release

The UE shall:

1> for each ltm-CandidateId in the ltm-CandidateToReleaseList:

2> if the current VarLTM-Config includes an ltm-Candidate with the given ltm-CandidateId:

3> release the ltm-Candidate from VarLTM-Config;

The LTM candidate cell configuration can be automatically released by UE in the following cases (or it can be released by the explicit indicator of the received RRC messages):

Upon the successful completion of LTM execution (or LTM cell switch)

Upon the reception of RRCRelease message (because LTM execution is available only in RRC CONNECTED state)

if the RRCSetup is received in response to an RRCReestablishmentRequest (because this means that UE failed to RRC Reestablishment procedure when UE sent an RRCReestablishmentRequest to recover the RRC connection with the network), where The RRCSetup message is used to establish SRB1 and transmitted (or received) via SRB0.

In another embodiment, UE can release the LTM candidate cell configuration upon the reception of RRCRelease message indicating the transition to RRC IDLE mode while UE can store or keep it upon reception of RRCRelease message indicating the transition to RRC INACTIVE mode and it can be re-configured or used to resume RRC connection with RRCResume message. For example, RRCRelease message indicating the state transition to RRC INACTIVE can also indicate UE whether to keep or release the LTM candidate cell configuration. When UE performs RRC Resume procedure, the network can send RRCResume message including an indicator whether to whether to restore or release the LTM candidate cell configuration.

LTM Candidate Cell Addition/Modification

The UE shall:

1> for each ltm-CandidateId in the ltm-CandidateToAddModList:

2> if the current VarLTM-Config includes an ltm-Candidate with the given ltm-CandidateId:

3> modify the ltm-Candidate within VarLTM-Config in accordance with the received ltm-Candidate;

2> else:

3> add the received ltm-Candidate to VarLTM-Config.

Generation of UE LTM Configuration

The purpose of this procedure is for the UE to generate a complete LTM candidate cell configuration (or LTM candidate cell configuration) for each LTM candidate cell to be stored and the LTM candidate cell configuration for the target cell indicated by lower layers (i.e. as indicated by LTM triggering MAC CE) is applied only when an indication of an LTM cell switch is received by lower layers. During the generation of a complete LTM candidate cell configuration, the current UE configuration shall not be modified.

The UE shall:

1> for each ltm-Candidate in ltm-CandidateConfigList within VarLTM-Config;

2> store the ltm-CandidateId included in ltm-Candidate within VarLTM-UE-Config;

2> if ltm-Candidate includes ltm-ConfigComplete;

3> generate a complete LTM candidate cell configuration for the received ltm-Candidate according to the actions and store it in ue-LTM-Config within VarLTM-UE-Config.

2> else:

3> generate a complete LTM candidate cell configuration by applying ltm-Candidate on top of referenceConfiguration according to the actions and store it in ue-LTM-Config within VarLTM-UE-Config.

LTM Cell Switch Execution

Upon the indication by lower layers that an LTM cell switch procedure is triggered, the UE shall:

1> release/clear all current dedicated radio configuration except for the following:

the SRB1/SRB2 configurations and DRB configurations as configured by radioBearerConfig or radioBearerConfig2;

the UE variables VarLTM-Config and VarLTM-UE-Config.

1> release/clear all current common radio configuration associated with the cell group for which the LTM cell switch procedure is triggered;

1> use the default values specified for timers T310, T311 and constants N310, N311 associated with the cell group for which the LTM cell switch procedure is triggered;

1> apply the default L1 parameter values as specified in corresponding physical layer specifications except for the following:

parameters for which values are provided in SIB1 (i.e. system information);

1> apply the value of the newUE-Identity as the C-RNTI for this cell group according to the LTM candidate cell configuration related to the LTM candidate cell configuration identity as received by lower layers;

1> configure lower layers in accordance with the received spCellConfigCommon according to the LTM candidate cell configuration indicated by lower layers;

1> configure lower layers in accordance with the received rach-ConfigDedicated according to the LTM candidate cell configuration indicated by lower layers.

1> configure the PDCP entity for LTM candidate cell configuration indicated by lower layers with state variables continuation for SRBs, and with the same security configuration as the PDCP entity for the source cell group;

1> stop timer T310 for the corresponding SpCell, if running;

1> if this procedure is executed for the MCG:

2> if timer T316 is running;

3> stop timer T316;

1> stop timer T312 for the corresponding SpCell, if running;

1> start timer a supervisor timer (i.e. T3xx) for this cell group with the timer value set to the configured value in RRCReconfiguration, as included within the field ltm-Timers;

1> reset the MAC entity of this cell group;

1> apply the specified BCCH configuration for the target LTM candidate cell configuration;

1> acquire the MIB of the target SpCell as indicated in the LTM candidate cell configuration indicated by lower layers, if applicable;

1> apply the LTM configuration in UE-LTM-Config within VarLTM-UE-Config related to the LTM candidate cell configuration identity as received by lower layers.

1> submit the RRCReconfigurationComplete message to lower layers for transmission using the new configuration.

The LTM cell switch execution procedure above can be extended to cover the dual connectivity case. When UE is configured with dual connectivity (i.e. MCG and SCG). The LTM execution procedure can be initiated in either MCG or SCG. However, we need to note that this procedure would have some impact on MCG failure recovery procedure. The MCG failure recovery is mainly managed by a timer (i.e. T316). The purpose of MCG failure recovery is to inform the network about an MCG failure the UE has experienced i.e. MCG radio link failure, which reports it to MCG via SCG (i.e. via split SRB1 or SRB3) by sending a RRC message (i.e. MCG failure information message). A UE in RRC_CONNECTED, for which AS security has been activated with SRB2 and at least one DRB or multicast MRB setup or, for IAB, SRB2, may initiate the fast MCG link recovery procedure in order to continue the RRC connection without re-establishment. A UE configured with split SRB1 or SRB3 can initiate this procedure to report MCG failures when neither MCG nor SCG transmission is suspended, the SCG is not deactivated, T316 is configured and upon detecting radio link failure of the MCG while T316 is not running. When the MCG failure is informed to MCG, the MCG can send RRC Release message, RRC Reconfiguration message with reconfigurationwithSync (i.e. handover indication) for the PCell, or MobilityFromNRCommand message via SCG (i.e. via split SRB1 or SRB3) to release or recover the RRC connection.

The timer (i.e. T316) can be configured only if the UE is configured with split SRB1 or SRB3. UE starts the timer T316 when UE transmits the RRC message (i.e. MCG Failure Information message). UE submits the MCG Failure Information message to lower layers for transmission via SRB1 if SRB1 is configured as split SRB. Otherwise (i.e. SRB3 configured), UE submits the MCG Failure Information message to lower layers for transmission embedded in NR RRC message ULInformationTransferMRDC via SRB3. UE stops the timer T316 upon receiving RRC Release message, RRC Reconfiguration message with reconfigurationwithSync (i.e. handover indication) for the PCell, MobilityFromNRCommand message, or upon initiating the RRC re-establishment procedure. Upon the expiry of the timer T316, UE initiates the RRC re-establishment procedure.

Considering the MCG failure recovery procedure as proposed above, if T316 is running, it means that the MCG failure already happened. Therefore, we need to carefully consider the case that LTM cell switch execution is initiated when T316 is running. To handle this case efficiently, we propose the following options. One of options can be implemented to proceed LTM execution.

Option 1: In this option, if UE receives the first MAC CE and is going to initiate the LTM cell switch procedure when T316 is running, then UE can stop T316 and perform the LTM cell switch procedure as the LTM cell switch procedure can recover the MCG radio link by cell switching, which may expedite the MCG failure recovery. The corresponding procedure is as follows:

Upon the indication by lower layers that an LTM cell switch procedure is triggered, the UE shall:

1> release/clear all current dedicated radio configuration except for the following:

the SRB1/SRB2 configurations and DRB configurations as configured by radioBearerConfig or radioBearerConfig2;

the UE variables VarLTM-Config and VarLTM-UE-Config.

1> release/clear all current common radio configuration;

1> use the default values specified for timers T310, T311 and constants N310, N311;

1> apply the default L1 parameter values as specified in corresponding physical layer specifications except for the following:

parameters for which values are provided in SIB1;

1> apply the value of the newUE-Identity as the C-RNTI for this cell group according to the LTM candidate cell configuration related to the LTM candidate cell configuration identity as received by lower layers;

1> configure lower layers in accordance with the received spCellConfigCommon according to the LTM candidate cell configuration indicated by lower layers;

1> configure lower layers in accordance with the received rach-ConfigDedicated according to the LTM candidate cell configuration indicated by lower layers.

1> configure the PDCP entity for LTM candidate cell configuration indicated by lower layers with state variables continuation for SRBs, and with the same security configuration as the PDCP entity for the source cell group;

1> stop timer T310 for the corresponding SpCell, if running;

1> if this LTM cell switch procedure (i.e. LTM execution) is executed for the MCG:

2> if timer T316 is running;

3> stop timer T316;

1> stop timer T312 for the corresponding SpCell, if running;

1> apply the specified BCCH configuration defined for the target LTM candidate cell configuration;

1> acquire the MIB of the target SpCell as indicated in the LTM candidate cell configuration indicated by lower layers, if applicable;

1> apply the LTM configuration in UE-LTM-Config within VarLTM-UE-Config related to the LTM candidate cell configuration identity as received by lower layers.

2> submit the RRCReconfigurationComplete message to lower layers for transmission using the new configuration.

Option 2: In this option, if UE receives the first MAC CE and is going to initiate the LTM cell switch procedure when T316 is running, then UE does not perform the LTM cell switch procedure as the LTM cell switch procedure may be difficult to be controlled by the CU of the MCG. The LTM cell switch can be triggered by DU of the MCG, which may cause mis-alignment between CU and DU. We need to note that LTM cell switch can be performed within a cell group. As the running of T316 indicates MCG (Master cell group) radio link failure, UE can wait the response from MCG in the MCG failure recovery procedure, rather than performing LTM cell candidate procedure. The corresponding procedure is as follows.

Upon the indication by lower layers that an LTM cell switch procedure is triggered, if T316 is not running (while T316 is not running), the UE shall:

1> release/clear all current dedicated radio configuration except for the following:

the SRB1/SRB2 configurations and DRB configurations as configured by radioBearerConfig or radioBearerConfig2;

the UE variables VarLTM-Config and VarLTM-UE-Config.

1> release/clear all current common radio configuration;

1> use the default values specified for timers T310, T311 and constants N310, N311;

1> apply the default L1 parameter values as specified in corresponding physical layer specifications except for the following:

parameters for which values are provided in SIB1;

1> apply the value of the newUE-Identity as the C-RNTI for this cell group according to the LTM candidate cell configuration related to the LTM candidate cell configuration identity as received by lower layers;

1> configure lower layers in accordance with the received spCellConfigCommon according to the LTM candidate cell configuration indicated by lower layers;

1> configure lower layers in accordance with the received rach-ConfigDedicated according to the LTM candidate cell configuration indicated by lower layers.

1> configure the PDCP entity for LTM candidate cell configuration indicated by lower layers with state variables continuation for SRBs, and with the same security configuration as the PDCP entity for the source cell group;

1> stop timer T310 for the corresponding SpCell, if running;

1> stop timer T312 for the corresponding SpCell, if running;

1> apply the specified BCCH configuration defined for the target LTM candidate cell configuration;

1> acquire the MIB of the target SpCell as indicated in the LTM candidate cell configuration indicated by lower layers, if applicable;

1> apply the LTM configuration in UE-LTM-Config within VarLTM-UE-Config related to the LTM candidate cell configuration identity as received by lower layers.

3> submit the RRCReconfigurationComplete message to lower layers for transmission using the new configuration.

For the above options, UE can stop T310 and T312 when LTM execution is initiated as these timers are used to monitor radio link. For example, UE starts T310 upon detecting physical layer problems for the SpCell i.e. upon receiving pre-configured number of consecutive out-of-sync indications from lower layers, stops it upon receiving several consecutive in-sync indications from lower layers for the SpCell, upon receiving RRCReconfiguration with reconfigurationWithSync for that cell group, upon reception of MobilityFromNRCommand, upon the reconfiguration of rlf-TimersAndConstant, upon initiating the connection re-establishment procedure, upon conditional reconfiguration execution i.e. when applying a stored RRCReconfiguration message including reconfigurationWithSync for that cell group, upon initiating the MCG failure information procedure, and upon LTM cell switch execution. For example, UE starts T312 if T312 is configured in MCG, upon triggering a measurement report for a measurement identity for which T312 has been configured and use T312 value has been set to true, while T310 in PCell is running and UE stops T312 upon receiving pre-configured number of consecutive in-sync indications from lower layers for the SpCell, receiving RRCReconfiguration with reconfigurationWithSync for that cell group, upon reception of MobilityFromNRCommand, upon initiating the RRC re-establishment procedure, upon the reconfiguration of rlf-TimersAndConstant, upon initiating the MCG failure information procedure, upon conditional reconfiguration execution i.e. when applying a stored RRCReconfiguration message including reconfigurationWithSync for that cell group, upon the expiry of T310 in corresponding SpCell, upon SCG release, if the T312 is kept in SCG, if T312 is configured in SCG and use T312 has been set to true, upon triggering a measurement report for a measurement identity for which T312 has been configured, or and upon LTM cell switch execution or while T310 in PSCell is running.

The following relates to RRC messages. In RRCReconfiguration message, each LTM candidate cell configuration (e.g. in CellGroupConfig IE) can include one of the following information a indicator to indicate whether to perform DL synchronization to candidate/target cell before receiving the cell switch command (MAC CE).

LTM cell switch indicator (or Cell identity), which can indicate UE to perform LTM cell switch to the target cell (the candidate cell indicated by this indicator) upon the reception of RRCReconfiguration message. This can trigger LTM cell switch earlier than MAC CE based LTM Cell switch, i.e. it does not require the network to send MAC CE to UE in order to trigger LTM cell switch.

LTM candidate cell configuration index (or identity) or Cell identity

TCI state (s) or beam information (e.g. beam index, SSB index, etc.)

After LTM cell switch, UE can keep the LTM candidate cell configuration, which allows subsequent LTM cell switch by MAC CE.

When the network triggers a L3-triggered handover (i.e. handover by RRCReconfiguration including reconfigurationWithSync) to UE, UE can release LTM candidate cell configurations automatically (or by RRCReconfiguration) if the handover or random access procedure to the target cell is successfully completed. As the PCell is changed after the handover and the LTM candidate cell configuration becomes not valid anymore, they should be released and can be updated.

LTM Candidate Cell Configuration: A configuration associated with an LTM candidate cell. An LTM candidate cell configuration can be a complete LTM candidate cell configuration or a delta (difference) configuration with respect to an LTM reference configuration.

LTM Reference Configuration: A configuration provided by the network to the UE that is common to all the configured LTM candidate cells. It is used by the UE to generate a complete LTM candidate cell configuration (i.e., by applying an LTM candidate cell configuration on top of an LTM reference configuration).

LTM-CandidateConfig

The IE LTM-CandidateConfig is used to provide LTM candidate cell configuration.

The following show details of LTM-CandidateConfig information element:

```
-- ASN1START
-- TAG-LTM-CANDIDATECONFIG-START
LTM-CandidateConfig-r18 ::=                              SEQUENCE {
  lte-ReferenceConfiguration-r18                             OCTET STRING (CONTAINING
RRCReconfiguration),                                       OPTIONAL,   -- Cond FirstLTM-
Candidate
  ltm-CandidateToReleaseList-r18                             LTM-CandidateToReleaseList-r18
OPTIONAL,   -- Need N
  ltm-CandidateToAddModList-r18                              LTM-CandidateToAddModList-r18
OPTIONAL,   -- Need N
  ltm-CandidateResetL2-List-r18                              SetupRelease { LTM-
CandidateResetL2-List-r18 }                                OPTIONAL   -- Need M
  ...
}
LTM-CandidateToReleaseList-r18 ::= SEQUENCE (SIZE
(1..maxNrofCellsLTM-r18)) OF LTM-CandidateId-r18              OPTIONAL   --
Need N
LTM-CandidateToAddModList-r18 ::= SEQUENCE (SIZE
(1..maxNrofCellsLTM-r18)) OF LTM-Candidate-r18
LTM-Candidate-r18 ::=                                    SEQUENCE {
  ltm-CandidateId-r18                                        LTM-CandidateId-r18,
  ltm-Config-r18                                           OCTET STRING (CONTAINING
RRCReconfiguration),
  ltm-ConfigComplete-r18                                     ENUMERATED {true}
OPTIONAL   -- Need R
  ...
}
LTM-CandidateResetL2-List-r18 ::= SEQUENCE (SIZE
(1..maxNrofCellsLTM-r18)) OF LTM-CandidateId-r18
-- TAG-LTM-CANDIDATECONFIG-STOP
-- ASN1STOP
```

| LTM-CandidateConfig field descriptions |
|---|
| ltm-Config<br>This field includes an RRCReconfiguration message used to configure an LTM candidate cell. This field shall include the CellGroupConfig IE, and it may also include the RadioBearerConfig IE, and MeasConfig IE. |
| ltm-ConfigComplete<br>This field indicates whether the LTM candidate cell configuration within ltm-Config is a complete configuration and thus the UE shall not use the LTM reference configuration within the field lte-ReferenceConfiguration. |
| ltm-CandidateNoResetL2-List<br>This field includes a list of LTM candidate cell identifiers for which the full L2 reset is needed upon an LTM cell switch. |
| ltm-ReferenceConfiguration<br>This field includes an RRCReconfiguration message used to configure a reference configuration for LTM. |

| Conditional Presence | Explanation |
|---|---|
| FirstLTM-Candidate | This field is mandatory present upon the first configuration of LTM-CandidateConfig. Otherwise, the field is optionally present, Need M. |

The following relates to Timer handling (i.e., Txxx or supervisor timer). A supervisor timer, can be used to detect failure of LTM cell switch procedure, wherein LTM procedure fails if the LTM supervisor timer expires. When LTM execution attempt fails or RLF occurs, if network configured the UE to try LTM after LTM failure, the UE performs cell selection and if the selected cell is an LTM candidate cell, the UE attempts RACH-based LTM execution once to that cell; Otherwise RRC re-establishment is performed.

The behavior for the supervisor timer is as follows:

The LTM supervisor timer (e.g. Txx timer or T304 timer) can be managed for each cell group (e.g. MCG or SCG) in RRC layer. T304 timer can be reused for the LTM supervision timer.

The UE starts the LTM supervisor timer, upon reception of the LTM cell switch MAC CE. The UE can restart the LTM supervisor timer upon reception of the LTM cell switch MAC CE indicating subsequent LTM. For example, the UE can start or restart the LTM supervisor timer, upon reception of the LTM cell switch MAC CE.

The UE stops the LTM supervisor timer, upon successful completion of LTM cell switch (or when MAC of an NR cell group successfully completes a Random Access procedure triggered for LTM cell switch) or upon the detection of beam failure (i.e. if BFI_COUNTER>=beamFailureInstanceMaxCount for the target/indicated LTM candidate cell (or PTAG or the serving cell or the target cell)) or upon the reception of RRCReconfiguration including reconfigurationWithSync.

For MCG, a supervisor timer can be used to detect failure of LTM cell switch procedure, wherein LTM procedure fails if the LTM supervisor timer expires, upon which the UE initiates RRC connection re-establishment procedure to recover RRC connection (i.e. MCG connection or link).

For SCG, a supervisor timer can be used to detect failure of LTM cell switch procedure, wherein LTM procedure fails if the LTM supervisor timer expires, upon which the UE initiates SCG failure information procedure to report SCG failure to the network.

While the UE has stored LTM candidate cell configurations the UE can also execute any L3 handover command sent by the network. It is up to the network to avoid any issue due to a collision between LTM execution and L3 handover execution, e.g. avoiding sending LTM cell switch command and L3 handover command simultaneously.

The following relates to LTM execution failure handling. When the LTM execution failure is detected (i.e. LTM execution is failed) by the expiry of supervisor timer or RLF (Radio link failure) or BFD (Beam failure detection), UE can report the LTM execution failure in RRC message to the source serving cell (Pcell) or a target serving cell (after completion of LTM execution to the new target serving cell later on, e.g. for the purpose of SON (Self Organizing Network) or MDT (Minimization of Drive Tests)). In another embodiment, the UE can report the LTM execution failure via SCell (or the source cell) if the SCell is configured with different TAG from PCell or if TAT for the SCell is running (or the TA of the cell is valid) or have both UL (Uplink) and DL (Downlink) or is configured with PUCCH or is activated or have SSB in its activated BWP. In another embodiment, when the LTM execution failure is detected by the expiry of supervisor timer or RLF (Radio link failure) or BFD (Beam failure detection), the UE can perform (or re-initiate or attempt) LTM execution to a cell of the candidate LTM cells (or SCells) if the cell is configured with different TAG from PCell or have both UL (Uplink) and DL (Downlink) or is configured with PUCCH or is activated or have SSB in its activated BWP or if TAT for the cell is running (or the TA of the cell is valid) or if the attempt (or the second LTM execution after the first LTM execution fails) to a new target LTM cell is configured in RRC configuration, which can be performed by UE automatically doing cell re-selection or can be performed based on configured RRC configuration including a new target LTM candidate cell identity (e.g. configuration identity) to be used for a LTM execution failure case or can be indicated by MAC CE including a new target LTM candidate cell identity (e.g. configuration identity). when the LTM execution failure is detected (i.e. LTM execution is failed) by the expiry of supervisor timer or RLF (Radio link failure) or BFD (Beam failure detection), the UE can initiate RRC connection re-establishment procedure (e.g. including cell (re-) selection) to recover RRC connection if TAT for any LTM candidate cells is not running or if TA for any LTM candidate cells is not valid or if the attempt (or the second LTM execution after the first LTM execution fails) to a new target LTM cell is not configured in RRC configuration. Based on this, the behavior for the supervisor timer can be extended as follows:

The LTM supervisor timer (e.g., Txx timer) can be managed for each cell group (e.g. MCG or SCG) in RRC layer.

The UE starts the LTM supervisor timer, upon reception of the LTM cell switch MAC CE. The UE can restart the LTM supervisor timer upon reception of the LTM cell switch MAC CE indicating subsequent LTM. For example, the UE can start or restart the LTM supervisor timer, upon reception of the LTM cell switch MAC CE.

The UE stops the LTM supervisor timer, upon successful completion of LTM cell switch or upon the detection of beam failure (i.e. if BFI_COUNTER>=beamFailureInstanceMaxCount for the target/indicated LTM candidate cell (or PTAG or the serving cell or the target cell)) or upon the reception of RRCReconfiguration including reconfigurationWithSync or the detection of RLF.

For MCG, a supervisor timer can be used to detect failure of LTM cell switch procedure, wherein LTM procedure fails if the LTM supervisor timer expires. When the LTM execution failure is detected (i.e. LTM execution is failed) by the expiry of supervisor timer or RLF (Radio link failure) or BFD (Beam failure detection), UE initiates RRC connection re-establishment procedure (e.g. including cell (re-)selection) to recover RRC connection (i.e. MCG connection or link) if TAT for any LTM candidate cells is not running or if TA for any LTM candidate cells is not valid or if the attempt (or the second LTM execution after the first LTM execution fails) to a new target LTM cell is not configured in RRC configuration.

For SCG, a supervisor timer can be used to detect failure of LTM cell switch procedure, wherein LTM procedure fails if the LTM supervisor timer expires, upon which the UE initiates SCG failure information procedure to report SCG failure to the network.

In another embodiment, for SCG, a supervisor timer can be used to detect failure of LTM cell switch procedure, wherein LTM procedure fails if the LTM supervisor timer expires. When the LTM execution failure is detected (i.e. LTM execution is failed) by the expiry of supervisor timer or RLF (Radio link failure) or BFD (Beam failure detection), the UE initiates SCG failure information procedure to report SCG failure to the network if TAT for any LTM candidate cells is not running or if TA for any LTM candidate cells is not valid or if the attempt (or the second LTM execution after the first LTM execution fails) to a new target LTM cell is not configured in RRC configuration.

In another embodiment, when the LTM execution failure is detected by the expiry of supervisor timer or RLF (Radio link failure) or BFD (Beam failure detection), the UE can perform (or re-initiate or attempt) LTM execution with RACH-less solution to a cell of the candidate LTM cells (or SCells) if the cell is configured with different TAG from PCell or have both UL (Uplink) and DL (Downlink) or is configured with PUCCH or is activated or have SSB in its activated BWP or if TAT for the cell is running (or the TA of the cell is valid) or if the attempt (or the second LTM execution after the first LTM execution fails) to a new target LTM cell is configured in RRC configuration, which can be performed by UE automatically doing cell re-selection or can be performed based on configured RRC configuration including a new target LTM candidate cell identity (e.g. configuration identity) to be used for a LTM execution failure case or can be indicated by MAC CE including a new target LTM candidate cell identity (e.g. configuration identity). when the LTM execution failure is detected by the expiry of supervisor timer or RLF (Radio link failure) or BFD (Beam failure detection), the UE can perform (or re-initiate or attempt) LTM execution with Random Access procedure to a cell of the candidate LTM cells (or SCells) if the cell is configured with different TAG from PCell or have both UL (Uplink) and DL (Downlink) or is configured with PUCCH or is activated or have SSB in its activated BWP or if TAT for the cell is not running (or the TA of the cell is not valid) or if the attempt (or the second LTM execution after the first LTM execution fails) to a new target LTM cell is configured in RRC configuration, which can be performed by UE automatically doing cell re-selection or can be performed based on configured RRC configuration including a new target LTM candidate cell identity (e.g. configuration identity) to be used for a LTM execution failure case or can be indicated by MAC CE including a new target LTM candidate cell identity (e.g. configuration identity). This can be applied to MCG or SCG.

In addition to this, when the LTM execution failure is detected (i.e. LTM execution is failed) by the expiry of supervisor timer or RLF (Radio link failure) or BFD (Beam failure detection), the UE can initiate RRC connection re-establishment procedure (e.g. including cell (re-)selection) to recover RRC connection if TAT for any LTM candidate cells is not running or if TA for any LTM candidate cells is not valid or if the attempt (or the second LTM execution after the first LTM execution fails) to a new target LTM cell is not configured in RRC configuration. Based on this, the proposed behavior for the supervisor timer can be extended as follows:

- For MCG, a supervisor timer can be used to detect failure of LTM cell switch procedure, wherein LTM procedure fails if the LTM supervisor timer expires. When the LTM execution failure is detected (i.e. LTM execution is failed) by the expiry of supervisor timer or RLF (Radio link failure) or BFD (Beam failure detection), UE initiates RRC connection re-establishment procedure (e.g. including cell (re-)selection) to recover RRC connection (i.e. MCG connection or link) if TAT for any LTM candidate cells is not running or if TA for any LTM candidate cells is not valid or if the attempt (or the second LTM execution after the first LTM execution fails) to a new target LTM cell is not configured in RRC configuration.
- For SCG, a supervisor timer can be used to detect failure of LTM cell switch procedure, wherein LTM procedure fails if the LTM supervisor timer expires, upon which the UE initiates SCG failure information procedure to report SCG failure to the network.
- In another embodiment, for SCG, a supervisor timer can be used to detect failure of LTM cell switch procedure, wherein LTM procedure fails if the LTM supervisor timer expires. When the LTM execution failure is detected (i.e. LTM execution is failed) by the expiry of supervisor timer or RLF (Radio link failure) or BFD (Beam failure detection), the UE initiates SCG failure information procedure to report SCG failure to the network if TAT for any LTM candidate cells is not running or if TA for any LTM candidate cells is not valid or if the attempt (or the second LTM execution after the first LTM execution fails) to a new target LTM cell is not configured in RRC configuration.

To avoid unnecessary confusion to the network, the LTM execution failure case should be handled carefully as the RRC message for the failed target LTM candidate cell may be transmitted to the new target candidate cell again. Specifically, upon the reception of the first MAC CE or when the LTM execution procedure is initiated, UE generates a Message 3 (e.g., RRCReconfigurationComplete message) and sends it to the target LTM candidate cell via SRB1 during LTM execution procedure. When the LTM execution procedure fails (e.g. Random access problem or the expiry of the supervisor timer or Beam failure detection or Radio link failure), the RRC message for the target LTM candidate cell can remain in RLC or PDCP entity of SRB1 and may be retransmitted to the new target LTM candidate cell later on if subsequent LTM cell switch is triggered, which causes problems because the RRC message was generated to the previous target LTM candidate cell. To resolve this problem, we propose to make UE perform PDCP SDU discard procedure for SRB1 or re-establish the RLC entity for SRB1 to avoid unnecessary retransmission of the RRC message to the unintended target cell if the LTM execution fails, which can be triggered by RRC layer or the expiry of the supervisor timer or the reception of the first MAC CE (e.g. including the configuration ID of the new target LTM candidate cell) or when the LTM execution procedure is initiated (e.g. to the new target cell). The PDCP SDU discard is a SDU discard procedure that the PDCP entity shall discard all stored PDCP SDUs and PDCP PDUs or the transmitting PDCP entity shall discard the PDCP SDU along with the corresponding PDCP Data PDU, which can also include the discard of RRC message segments. If the corresponding PDCP Data PDU has already been submitted to lower layers, the discard is indicated to lower layers. (e.g. when upper layers request a PDCP SDU discard). In another embodiment, when LTM execution fails or upon the expiry of the supervisor timer or the reception of the first MAC CE (e.g. including the configuration ID of the new target LTM candidate cell) or when the LTM execution procedure is initiated (e.g. to the new target cell), the PDCP entity (i.e. the PDCP entity of SRBs (e.g. SRB1) of UE) shall discard all stored PDCP SDUs and PDCP PDUs or re-establish the RLC entity (i.e. the RLC entity of the SRBs (e.g. SRB1) of UE). The re-establishment of RLC entity includes the following actions, discarding all RLC SDUs, RLC SDU segments, and RLC PDUs, if any, stopping and resetting all timers, and resetting all state variables to their initial values.

The following relates to Security issue handling for LTM execution failure case. The LTM execution failure can be handled as described above. However, if we allow subsequent LTM execution procedures to recover the failure quickly when LTM execution procedure fails, we may encounter a security issue (e.g. key stream reuse issue), which violates the security principle (i.e. different data should not be sent with the same security key over the air). We need to note that the security key (or the security configuration or masterKeyUpdate) is not configured (or not updated) in LTM candidate cell configuration.

For example, UE can transmit RRCReconfigurationComplete message to the target LTM candidate cell via SRB1 in the LTM execution procedure (e.g. upon the reception of the first MAC CE) as proposed in Section 3.3. If UE fails to successfully transmit it to the target LTM candidate cell via SRB1, UE may perform another LTM execution procedure to a new target LTM candidate cell by the reception of another first MAC CE. In this case, another RRCReconfigurationComplete message with the same security key (or the same COUNT value) may be sent to the new target LTM candidate cell as UE reverts back to the UE configuration used in the source PCell (or the serving cell). The message with the same security key means that the message is integrity protected or ciphered with the same security key (or the same security algorithm). For example, UE can transmit RRCReconfigurationComplete message with the security key (or the COUNT value=3) to the target LTM candidate cell via SRB1. After UE fails to send it to the target candidate cell, UE reverts back to the UE configuration used in the source PCell (e.g. the COUNT value is set to 2). When the LTM execution is triggered again to the new target LTM candidate cell, UE may transmit another RRCReconfigurationComplete message with the same security key (or the same COUNT value=3) to the target LTM candidate cell via SRB1, which violates the security principle and can be exposed to the hacker. To resolve this security issue, we propose several options in the followings. One of the options can be implemented to handle the security issue (which can be applied to SRBs).

Option 1. In this option, UE can use one SRB, i.e. one SRB (e.g. the first SRB1) is for either the source cell (i.e. serving cell) or the target cell. The first SRB1 can be used for the transmission and reception of RRC message to/from the source cell. Upon the reception of the first MAC CE or when the LTM execution procedure is initiated, UE re-establishes the RLC entity of the first SRB1 or trigger the PDCP entity of the first SRB1 to perform SDU discard procedure. In the LTM execution procedure, UE can send RRCReconfigurationComplete message to the target LTM candidate cell via the first SRB1. When UE fails the LTM cell switch to the target LTM candidate cell (or the expiry of the supervisor timer) or upon the reception of the first MAC CE or when another LTM execution is initiated, UE re-establishes the RLC entity of the first SRB1 or trigger the PDCP entity of the first SRB1 to perform SDU discard procedure in order to avoid unnecessary retransmission and confusion to the network with unintended RRC messages. In the LTM execution procedure, UE can send RRCReconfigurationComplete message to the new target LTM candidate cell via the first SRB1. In this option, the network can handle the gap between PDCP sequence numbers (or the COUNT values in order to avoid unnecessary delay (e.g. perform out-of-order delivery but in the ascending of order). When UE fails the LTM cell switch to the target LTM candidate cell (or the expiry of the supervisor timer), UE may revert back to the UE configuration used in the source PCell. In another embodiment, when UE fails the LTM cell switch to the target LTM candidate cell (or the expiry of the supervisor timer), UE may revert back to the UE configuration except SRB configuration (e.g. SRBs or SRB1) used in the source PCell.

Option 2. In this option, UE can use two SRBs, i.e. one (e.g. the first SRB1) is for the source cell (i.e. serving cell) and the other (e.g. the second SRB1) is for the target cell. The first SRB1 can be used for the transmission and reception of RRC message to/from the source cell. Upon the reception of the first MAC CE or when the LTM execution procedure is initiated, UE suspends the first SRB1 or establishes the second SRB1 (i.e. Logical channel identity or RLC entity or PDCP entity) with the same configurations as for the source cell or configures the PDCP entity of the second SRB1 for the target LTM candidate cell with state variables continuation and with the same security configuration as the PDCP entity for the source cell. For the second SRB1 configured with state variables continuation, the initial value is the value stored in PDCP entity for the corresponding first SRB1. In the LTM execution procedure, UE can send RRCReconfigurationComplete message to the target LTM candidate cell via the second SRB1. When UE fails the LTM cell switch to the target LTM candidate cell (or the expiry of the supervisor timer), UE configures the PDCP entity of the first SRB1 for the source PCell with state variables continuation. For the first SRB1 configured with state variables continuation, the initial value is the value stored in PDCP entity for the corresponding second SRB1. UE releases the PDCP entity for the target PCell or release the RLC entity and the associated logical channel for the target LTM candidate cell, or trigger the PDCP entity of the first SRB1 for the source cell (e.g. PCell) to perform SDU discard procedure or re-establish the RLC entity of the first SRB1 for the source cell (e.g. PCell). UE resume suspended the first SRB1 in the source cell. UE may report the failure of LTM execution failure to the network by sending RRC message or MAC CE indicating it. And then the network instructs subsequent LTM cell switch procedure to UE. When UE fails the LTM cell switch to the target LTM candidate cell (or the expiry of the supervisor timer), UE may revert back to the UE configuration used in the source PCell. In another embodiment, when UE fails the LTM cell switch to the target LTM candidate cell (or the expiry of the supervisor timer), UE may revert back to the UE configuration except SRB configuration (e.g. SRBs or SRB1) used in the source PCell.

Option 3. In this option, UE can use two SRBs, i.e. one (e.g. the first SRB1) is for the source cell (i.e. serving cell) and the other (e.g. the second SRB1 or the third SRB1) is for the target cell. The first SRB1 can be used for the transmission and reception of RRC message to/from the source cell. Upon the reception of the first MAC CE or when the LTM execution procedure is initiated, UE suspends the first SRB1 or establishes the second SRB1 (i.e. Logical channel identity or RLC entity or PDCP entity) with the same configurations as for the source cell or configures the PDCP entity of the second SRB1 for the target LTM candidate cell with state variables continuation and with the same security configuration as the PDCP entity for the source cell. For the second SRB1 configured with state variables continuation, the initial value is the value stored in PDCP entity for the corresponding first SRB1. In the LTM execution procedure, UE can send RRCReconfigurationComplete message to the target LTM candidate cell via the second SRB1. When UE fails the LTM cell switch to the target LTM candidate cell (or the expiry of the supervisor timer) or upon the reception of the first MAC CE or when another LTM execution is initiated, UE establishes the third SRB1 for the new target LTM candidate cell or configures the PDCP entity of the third SRB1 for the new target LTM candidate cell (e.g. PCell) with state variables continuation. For the third SRB1 configured with state variables continuation, the initial value is the value stored in PDCP entity for the corresponding second SRB1. UE releases the PDCP entity for the old target PCell or release the RLC entity and the associated logical channel for the old target LTM candidate cell. In the LTM execution procedure, UE can send RRCReconfigurationComplete message to the new target LTM candidate cell via the third SRB1. When UE fails the LTM cell switch to the target LTM candidate cell (or the expiry of the supervisor timer), UE may revert back to the UE configuration used in the source PCell. In another embodiment, when UE fails the LTM cell switch to the target LTM candidate cell (or the expiry of the supervisor timer), UE may revert back to the UE configuration except SRB configuration (e.g. SRBs or SRB1) used in the source PCell.

The following relates to Data loss handling for LTM execution failure case. In the LTM execution procedure, UE may perform a random access procedure to send RRCReconfigurationComplete message to the target candidate cell. The random access procedure includes two types of random access procedure.

Figure 11:
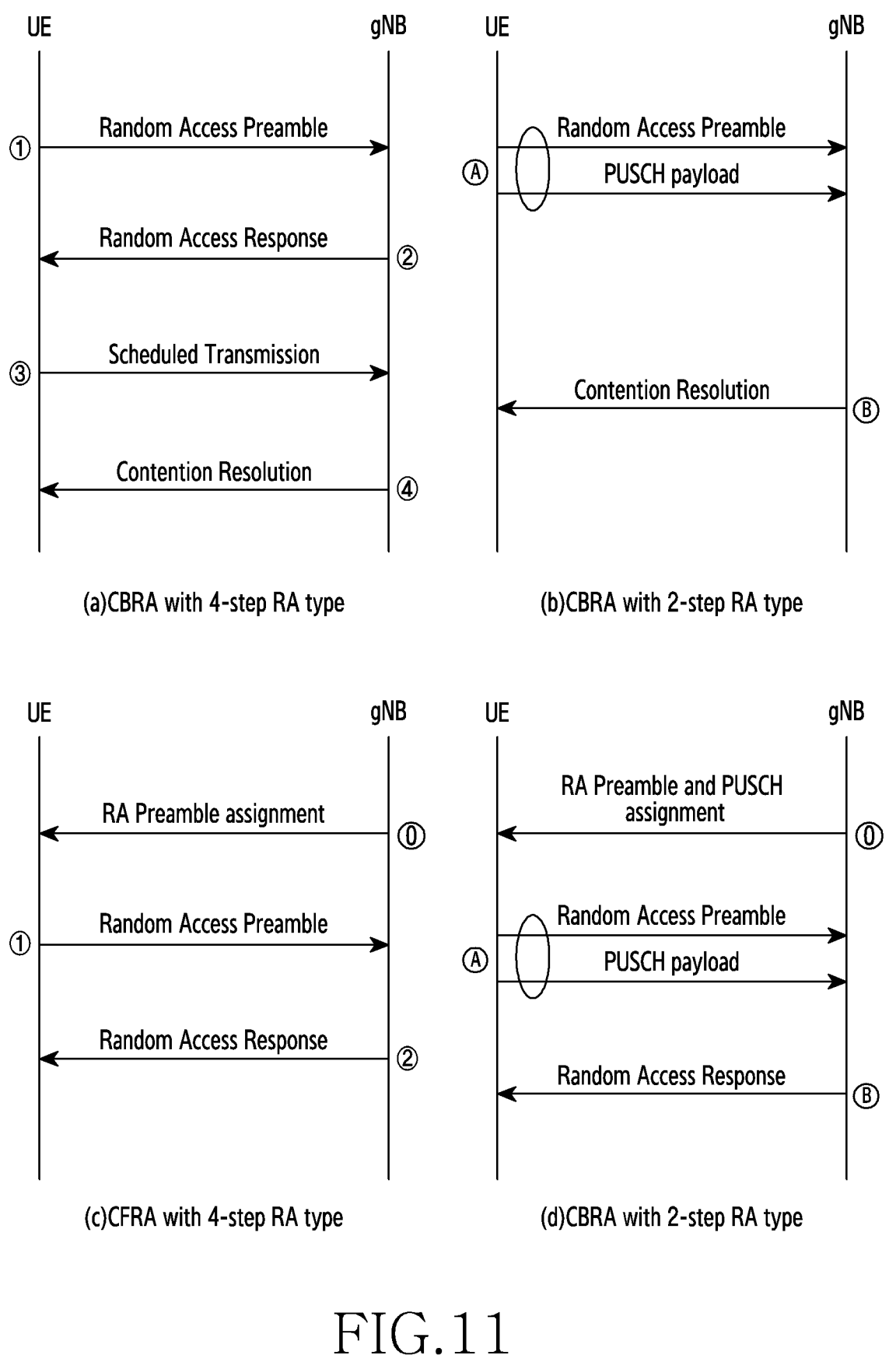

FIG. 11 illustrates various Random Access Procedures according to an embodiment of the disclosure.

Two types of random access procedure are supported: 4-step RA type with MSG1 and 2-step RA type with MSGA. Both types of RA procedure support contention-based random access (CBRA) and contention-free random access (CFRA) as shown on FIG. 11.

The UE selects the type of random access at initiation of the random access procedure based on network configuration:

- when CFRA resources are not configured, an RSRP threshold is used by the UE to select between 2-step RA type and 4-step RA type;
- when CFRA resources for 4-step RA type are configured, UE performs random access with 4-step RA type;
- when CFRA resources for 2-step RA type are configured, UE performs random access with 2-step RA type.

The network does not configure CFRA resources for 4-step and 2-step RA types at the same time for a Bandwidth Part (BWP). CFRA with 2-step RA type is only supported for handover.

The MSG1 of the 4-step RA type consists of a preamble on PRACH. After MSG1 transmission, the UE monitors for a response from the network within a configured window. For CFRA, dedicated preamble for MSG1 transmission is assigned by the network and upon receiving random access response from the network, the UE ends the random access procedure as shown in part (c) of FIG. 11. For CBRA, upon reception of the random access response, the UE sends MSG3 using the UL grant scheduled in the response and monitors contention resolution as shown in part (a) of FIG. 11. If contention resolution is not successful after MSG3 (re)transmission(s), the UE goes back to MSG1 transmission.

Figure 12:
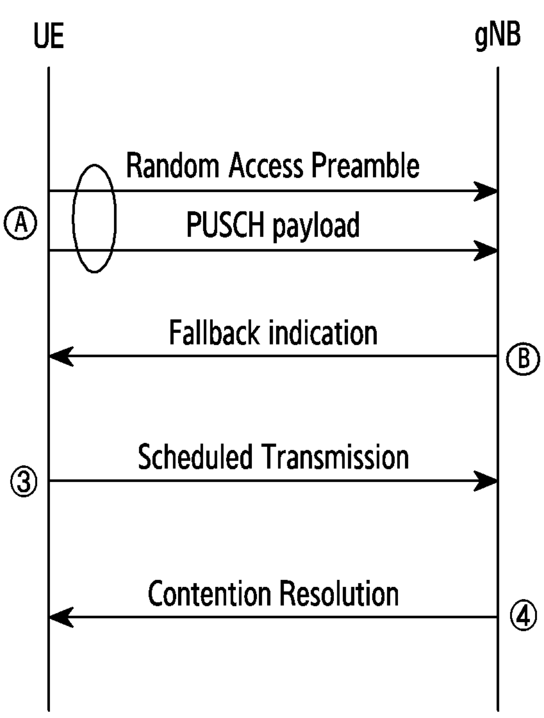
FIG. 12 illustrates Fallback for contention based random access (CBRA) with 2-step RA type according to an embodiment of the disclosure.

FIG. 12 illustrates Fallback for CBRA with 2-step RA type according to an embodiment of the disclosure.

The MSGA of the 2-step RA type includes a preamble on PRACH and a payload on PUSCH. After MSGA transmission, the UE monitors for a response from the network within a configured window. For CFRA, dedicated preamble and PUSCH resource are configured for MSGA transmission and upon receiving the network response, the UE ends the random access procedure as shown in part (d) of FIG. 11. For CBRA, if contention resolution is successful upon receiving the network response, the UE ends the random access procedure as shown in part (b) of FIG. 11; while if fallback indication is received in MSGB, the UE performs MSG3 transmission using the UL grant scheduled in the fallback indication and monitors contention resolution as shown in FIG. 12. If contention resolution is not successful after MSG3 (re)transmission(s), the UE goes back to MSGA transmission.

If the random access procedure with 2-step RA type is not completed after a number of MSGA transmissions, the UE can be configured to switch to CBRA with 4-step RA type.

In this random access procedure, user plane data (data from DRBs) can be transmitted (e.g. in MSG 3 or MSG A). This means that the data loss can happen if the random access procedure fails in the LTM execution procedure. Given that subsequent LTM executions are possible, the data loss may occur several times. To avoid the possible data loss in LTM execution procedure, we propose several options in the followings. One of options can be implemented to resolve this issue.

Option 1: The CFRA does not include user plane data before completion of random access procedure as MSG 1 is confirmed first by the network before data transmission. Therefore, in this option, UE performs CFRA if a random access procedure is needed in the LTM execution procedure, i.e. UE is not allowed to perform CBRA in the LTM execution procedure.

Option 2: The CFRA does not include user plane data before completion of random access procedure as MSG 1 is confirmed first by the network before data transmission. Therefore, in this option, UE is not allowed to include or transmit user plane data when UE performs CBRA in the LTM execution procedure. For example, for allocation of resources of LCP (Logical Channel Prioritization) procedure, before the successful completion of the Random Access procedure initiated for LTM cell switch (or LTM execution), the MAC entity shall not select the logical channel(s) corresponding to DRB(s) for the uplink grant received in a Random Access Response or the uplink grant for the transmission of the MSGA payload. This means that UE can submit only RRC messages (e.g. RRCReconfigurationComplete message) in the random access procedure during LTM execution procedure. This also implies that the user plane data is not included in MSG 3 or MSG A (i.e. MAC PDU) in the random access procedure. In another embodiment, UE can suspend all radio bearers (i.e. DRBs) except SRBs (e.g. SRB0, SRB1, SRB2, SRB3, SRB4 or SRB5), in order to avoid the data processing or data transmission (or reception) to the source cell or to avoid the data transmission in the random access procedure to the target cell. After the successful completion of LTM execution (or LTM cell switch to the target cell), UE can resume all suspended radio bearers except the SRBs to start the data transmission or reception.

The following relates to MAC protocol.

MAC Control Elements (MAC CE)

The first MAC CE is LTM triggering MAC CE that triggers cell switch to the target cell (i.e. one of LTM candidate cells configured by RRCReconfiguration message)

The contents of LTM triggering MAC CE (or LTM command MAC CE or LTM MAC CE) can includes one of the following information:

- CFRA resources
- LTM candidate cell configuration index (or identity) or Cell identity
- Cell identity
- TCI state (s) or beam information (e.g. beam index, SSB index, etc.)
- Timing Advance value (TA value or Timing Advance Command)

Specifically, the first MAC CE (i.e. LTM Command MAC CE) is identified by MAC subheader with eLCID. It has a variable size with one or more of the following fields:

- R: Reserved bit, set to 0;
- Target Configuration ID (identity) (or Target LTM candidate cell identity (i.e. LTM target cell) or Serving cell identity): This field indicates the index (or identity) of target LTM candidate cell configuration (in RRC configuration) to apply for LTM cell switch, This field can be replaced by a bitmap we proposed in PDCCH DCI format of this disclosure (in Section 4.2) to indicate the target LTM candidate cell;

Timing Advance Command: To make UE implementation efficient or save the radio resource, we propose several options for this field. One of the options can be implemented.

Option 1: In this option, the Timing Advance Command field (or value) is optional in the first MAC CE (LTM Command MAC CE), which saves the radio resource. This field indicates a value used to control the amount of timing adjustment that the MAC entity has to apply (or it can indicate to use the same TA value of the current serving cell). The UE can skip the Random Access procedure for this LTM cell switch if this field indicates a value (i.e. this field is present or included) or if TAT (timeAlignmentTimer) for the target/indicated LTM candidate cell (or PTAG) is running (i.e. TA value is valid) or if Beam failure is not detected for the target LTM candidate cell (i.e. if BFI_COUNTER<beamFailureInstanceMaxCount for the target/indicated LTM candidate cell (the number of Beam failure Indication is smaller than the maximum number for beam failure detection). UE can indicate to upper layers that a Random Access Procedure is needed for this LTM cell switch or the target LTM candidate cell (or the indicated LTM candidate cell) if Timing Advance Command value is absent (or not included or not present) or if TAT (timeAlignmentTimer) for the target/indicated LTM candidate cell (or PTAG) is not running (i.e. TA value is not valid) or if Beam failure is detected for the target/indicated LTM candidate cell (i.e. if BFI_COUNTER>=beamFailureInstanceMaxCount for the target/indicated LTM candidate cell (or PTAG) (the number of Beam failure Indication is larger than or equal to the maximum number for beam failure detection).

Option 2: In this option, the Timing Advance Command field (or value) is always present in the first MAC CE (LTM Command MAC CE), which eases UE implementation. This field indicates whether the TA is valid for the LTM target cell (i.e. the LTM candidate cell corresponding to the LTM candidate cell configuration (RRC configuration) indicated by Target Configuration ID field) (or whether to use the same TA value of the current serving cell). If the value of this field is set to a special value (e.g. all 0's or all 1's), this field indicates that no valid timing adjustment is available for the PTAG of the LTM target cell. UE shall perform Random Access to the LTM target cell if the value of this field is set to a special value (e.g. all 0's or all 1's); Otherwise, this field indicates a value used to control the amount of timing adjustment that the MAC entity has to apply. The UE can skip the Random Access procedure for this LTM cell switch if this field indicates a value (i.e. this field does not indicate the special value) or if TAT (timeAlignmentTimer) for the target/indicated LTM candidate cell (or PTAG) is running (i.e. TA value is valid) or if Beam failure is not detected for the target LTM candidate cell (i.e. if BFI_COUNTER<beamFailureInstanceMaxCount for the target/indicated LTM candidate cell (the number of Beam failure Indication is smaller than the maximum number for beam failure detection).

TCI state ID: This field indicates or activates the TCI state for the LTM target cell (i.e. the cell (i.e. SpCell) of the target LTM candidate configuration indicated by the Target Configuration ID field). The TCI state is identified by TCI-StateId configured in the target LTM candidate configuration. If this field is absent (or not present or not included), the default TCI state (or the TCI state) configured in the target LTM candidate configuration is used or activated. This field can be replaced or absent by using the fourth MAC CE, i.e., in another embodiment, this field can be indicated/included in the fourth MAC CE.

UL TCI state ID: This field indicates and activates the uplink TCI state for the LTM target cell (i.e. the cell (i.e. SpCell) of the target LTM candidate configuration indicated by the Target Configuration ID field). If this field is absent (or not present or not included), the default TCI state (or the TCI state) configured in the target LTM candidate configuration is used or activated. This field can be replaced or absent by using the fourth MAC CE, i.e., in another embodiment, this field can be indicated/included in the fourth MAC CE.

DL BWP ID: This field indicates the DL BWP that UE uses for the target LTM cell. If this field is present (or included), the MAC entity (or UE) activates the DL BWP indicated by this field for LTM execution or LTM cell switch. If this field is absent (not present or not included), the MAC entity (or UE) activates the DL BWP indicated by RRC configuration (i.e. firstActiveDownlinkBWP-Id in target LTM candidate configuration indicated by the Target Configuration ID) for LTM execution or LTM cell switch. In another embodiment, one common BWP ID (or the same BWP ID) can indicate both DL BWP ID and UL BWP ID or the BWP ID can be indicated/included in the fourth MAC CE.

UL BWP ID: This field indicates the UL BWP that UE uses for the target LTM cell. If this field is present (or included), the MAC entity (or UE) activates the UL BWP indicated by this field for LTM execution or LTM cell switch. If this field is absent (not present or not included), the MAC entity (or UE) activates the UL BWP indicated by RRC configuration (i.e. firstActiveUplinkBWP-Id in target LTM candidate configuration indicated by the Target Configuration ID) for LTM execution or LTM cell switch. In another embodiment, one common BWP ID (or the same BWP ID) can indicate both DL BWP ID and UL BWP ID or the BWP ID can be indicated/included in the fourth MAC CE.

The fields other than Target Configuration ID in this first MAC CE refers to the (target LTM candidate configuration) RRC configuration indicated by the Target Configuration ID field, i.e. The fields are considered (or processed) after the UE has applied the complete (or reference) LTM candidate configuration indicated by Target Configuration ID in the first MAC CE. It does not refer to the RRC configuration in use before/upon reception of this MAC CE.

For the selection of BWP (Bandwidth Part) in LTM cell switch procedure, UE needs to identify the UL BWP of LTM candidate cell for Random Access preamble transmission (on PRACH or RACH). As LTM candidate cell is a non serving cell and there is no active UL or DL BWP for non-serving cell. UE needs to identify which UL BWP is used by UE for Random Access preamble transmission. With this reason, the UE uses

- UL BWP indicated by BWP ID field in the first MAC CE that UE received if the first MAC CE includes BWP ID (e.g. UL BWP ID). The BWP ID is not configured with the same ID as dormant BWP (i.e., dormantBWP-Id).
- UL BWP indicated by firstActiveUplinkBWP field in configuration of indicated target LTM candidate cell if the first MAC CE does not include BWP ID (e.g. UL BWP ID). The BWP ID is not configured with the same ID as dormant BWP (i.e., dormantBWP-Id) or the LTM candidate cell configuration does not include dormant BWP configuration (i.e., dormantBWP-Config). In another embodiment, initialUplinkBWP field can be used instead of firstActiveUplinkBWP field.

DL BWP indicated by BWP ID field in the first MAC CE that UE received if the first MAC CE includes BWP ID (e.g. DL BWP ID). The BWP ID is not configured with the same ID as dormant BWP (i.e., dormantBWP-Id).

DL BWP indicated by firstActiveDownlinkBWP field in configuration of indicated target LTM candidate cell if the first MAC CE does not include BWP ID (e.g. DL BWP ID). The BWP ID is not configured with the same ID as dormant BWP (i.e., dormantBWP-Id) or the LTM candidate cell configuration does not include dormant BWP configuration (i.e. dormantBWP-Config). In another embodiment, initialDownlinkBWP field can be used instead of firstActiveUplinkBWP field.

Dormant BWP should not be configured for LTM candidate cell(s) as the PDCCH monitoring is required for LTM procedure, e.g. Random Access procedure and LTM Cell switch.

The first MAC CE (i.e. LTM Command MAC CE) may include a field indicating the information about 2-step RA type and, 4-step RA type contention-free Random Access Resources used for LTM cell switch execution. This field can be present if Timing Advance Command value is absent (or not included) or if keeping the Timing Advance or using the TA of the source cell (or Serving cell) is not indicated (i.e. the LTM candidate cell indicated by Target Configuration ID (or Serving cell ID) in the first MAC CE, does not belong to PTAG) or if Timing Advance Command value is set as a special value (e.g. 000 . . . 0 or 111 . . . 1) (e.g. the value indicates RACH-based LTM candidate cell switch) or if the Random access procedure is needed.

If the fields included in the first MAC CE (e.g. Target configuration ID or BWP ID or TCI state ID or Timing Advance) are introduced as bitmap-type indication (e.g. 8 bit bitmap), the bitmap (i.e. each bit or (k)-th bit) can indicate the field k (or Target configuration ID k or BWP ID k or TCI state ID k or Timing Advance k) where k is ascending order (or descending order) of the field values (or IDs) associated with this MAC entity (or this cell group) where the first MAC CE is received, which can save bits in the air interface.

In another embodiment, if the fields included in the first MAC CE (e.g. Target configuration ID or BWP ID or TCI state ID or Timing Advance) are introduced as bitmap-type indication (e.g. 8 bit bitmap), the bitmap (i.e. each bit or (k)-th bit) can indicate the field k (or Target configuration ID k or BWP ID k or TCI state ID k or Timing Advance k) where k is ascending order (or descending order) of the field values (or IDs) in the order of MCG and SCG (i.e. the fields of the MCG first and then those of SCG), which can save bits in the air interface, i.e. the first MAC CE can indicate Target configuration ID, BWP ID, TCI state ID or Timing Advance of either MCG or SCG. For example, the first MAC CE received from MCG (i.e. associated with MCG MAC entity) can indicate the fields corresponding to SCG or the first MAC CE received from SCG (i.e. associated with SCG MAC entity) can indicate the fields corresponding to MCG.

Figure 13:
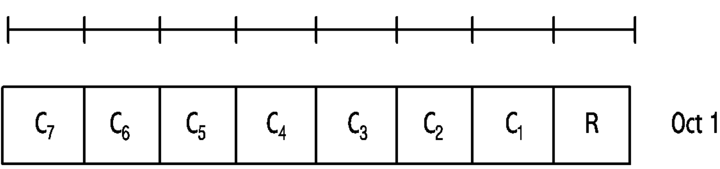
FIG. 13 illustrates SCell Activation/Deactivation medium access control (MAC) control element (CE) of one octet according to an embodiment of the disclosure.

FIG. 13 illustrates SCell Activation/Deactivation MAC CE of one octet according to an embodiment of the disclosure.

The second MAC CE is SCell Activation/Deactivation MAC CE.

The SCell Activation/Deactivation MAC CE of one octet is identified by a MAC subheader with LCID. It has a fixed size and consists of a single octet containing seven C-fields and one R-field. The SCell Activation/Deactivation MAC CE with one octet is defined as follows (FIG. 13).

Figure 14:
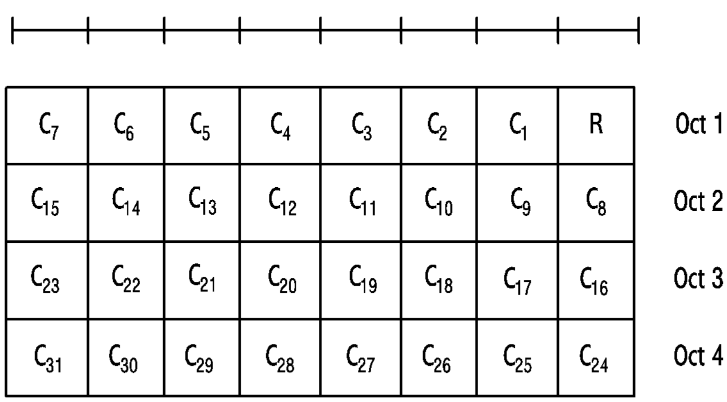
FIG. 14 illustrates SCell Activation/Deactivation MAC CE of four octets according to an embodiment of the disclosure.

FIG. 14 illustrates SCell Activation/Deactivation MAC CE of four octets according to an embodiment of the disclosure.

The SCell Activation/Deactivation MAC CE of four octets is identified by a MAC subheader with LCID. It has a fixed size and consists of four octets containing 31 C-fields and one R-field. The SCell Activation/Deactivation MAC CE of four octets is defined as follows (FIG. 14).

Ci: If there is an SCell configured for the MAC entity with SCellIndex i as configured in RRC message, this field indicates the activation/deactivation status of the SCell with SCellIndex i, else the MAC entity shall ignore the Ci field. The Ci field is set to 1 to indicate that the SCell with SCellIndex i shall be activated. The Ci field is set to 0 to indicate that the SCell with SCellIndex i shall be deactivated;

R: Reserved bit, set to 0.

NOTE: If UE receives the SCell Activation/Deactivation MAC CE for an SCell configured with TRS for fast activation of the SCell, such TRS is not used for the corresponding SCell.

The third MAC CE is Enhanced SCell Activation/Deactivation MAC CE.

The Enhanced SCell Activation/Deactivation MAC CE with one octet Ci field is identified by a MAC subheader with eLCID. It has a variable size and consists of seven C-fields, one R-field and zero or more TRS IDj fields in ascending order based on the ScellIndex for SCells indicated by the Ci field(s) to be activated. The Enhanced SCell Activation/Deactivation MAC CE of with one octet Ci field is defined as follows (FIG. 14).

Figure 15:
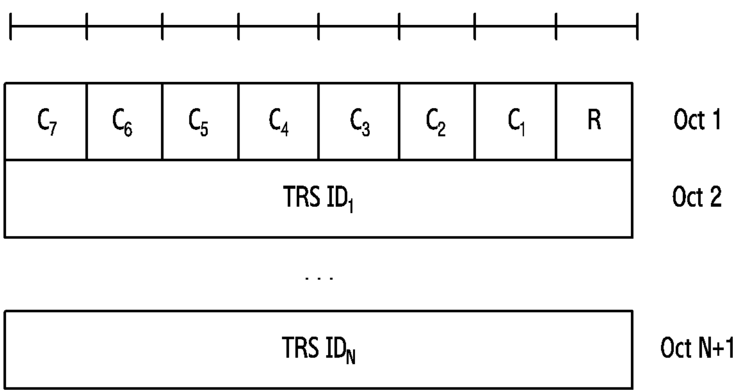
FIG. 15 illustrates Enhanced SCell Activation/Deactivation MAC CE with one octet Ci field according to an embodiment of the disclosure.
Figure 16:
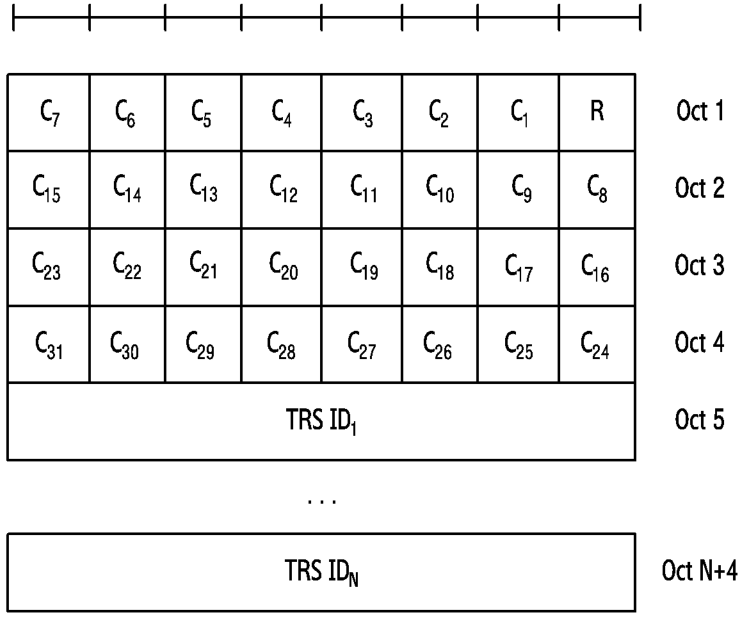
FIG. 16 illustrates Enhanced SCell Activation/Deactivation MAC CE with four octet Ci field according to an embodiment of the disclosure.

FIG. 15 illustrates Enhanced SCell Activation/Deactivation MAC CE with one octet Ci field according to an embodiment of the disclosure.

The Enhanced SCell Activation/Deactivation MAC CE with four octet Ci field is identified by a MAC subheader with eLCID. It has a variable size and consists of 31 C-fields, one R-field and zero or more TRS IDj fields in ascending order based on the ScellIndex for SCells indicated by the Ci field(s) to be activated. The Enhanced SCell Activation/Deactivation MAC CE with four octet Ci field is defined as follows (FIG. 15).

Ci: If there is an SCell configured for the MAC entity with SCellIndex i as configured in RRC message, this field indicates the activation/deactivation status of the SCell with SCellIndex i, else the MAC entity shall ignore the Ci field. The Ci field is set to 1 to indicate that the SCell with SCellIndex i shall be activated and that a TRS IDj field is included for the SCell. The Ci field is set to 0 to indicate that the SCell with SCellIndex i shall be deactivated and that no TRS ID field is included for this SCell;

TRS IDj: If TRS IDj is set to a non-zero value, it indicates the corresponding TRS address by scellActivationRS-Id as configured in RRC message is activated. If TRS IDj is set to zero, it indicates that no TRS is used for the corresponding SCell;

R: Reserved bit, set to 0.

For the first, second, and third MAC CEs, it is desirable that the rules and restrictions to make UE behavior for LTM cell switch procedure are simple and efficient. As described above, LTM supports both intra-gNB-DU and intra-gNB-CU inter-gNB-DU mobility. LTM also supports inter-frequency mobility, including mobility to inter-frequency cell that is not a current serving cell. The following scenarios are supported:

PCell change in non-CA scenario,

PCell change without SCell change in CA scenario,

PCell change with SCell change(s) in CA scenario, including the following cases:

a) The target PCell/target SCell(s) is not a current serving cell (CA-to-CA scenario with PCell change)

b) The target PCell is a current SCell c) The target SCell is the current PCell.

To support these scenarios efficiently, some rules and restrictions for the MAC CEs may need to be defined because some scenarios cause complexity in UE implementation. For example, the current PCell can be indicated LTM cell switch to one of the current SCells and be indicated SCell activation/deactivation, which would be a sort of race conditions.

Option 1. In this option, the network should not send the first MAC CE together with the second MAC CE (or the third MAC CE) to UE. In other words, the network should not include the first MAC CE and the second MAC CE (or the third MAC CE) in the same MAC PDU. By having this restriction, the network can send the commands stage by stage. For example, Operation 1: The network can configure LTM candidate cell configuration to UE by RRC message. The network can activate or deactivate or configure (add/modify) or release SCells by RRC message or the second MAC CE or the third MAC CE to get SCells ready for LTM cell switch by activating/deactivating SCells, which may be done with LTM candidate cell configuration at the same time, i.e. by RRC message or MAC CE.

Operation 2: The network can send the first MAC CE to UE in order to trigger LTM cell switch to the target cell.

Operation 3: The network can send the second MAC CE or the third MAC CE to UE to activate or deactivate SCells (e.g. after the successful completion of LTM cell switch or when the condition is met as proposed in Section 2.1)

Option 2. In this option, the network can send the first MAC CE together with the second MAC CE (or the third MAC CE) to UE. In other words, the network can include the first MAC CE and the second MAC CE (or the third MAC CE) in the same MAC PDU. By allowing this, the network can send the commands (LTM cell switch and SCell activation/deactivation) altogether, which can reduce the delay. For example, Operation 1: The network can configure LTM candidate cell configuration to UE by RRC message. The network may activate or deactivate or configure (add/modify) or release SCells by RRC message or the second MAC CE or the third MAC CE to get SCells ready for LTM cell switch by activating/deactivating SCells, which may be done with LTM candidate cell configuration at the same time, i.e. by RRC message or MAC CE. It can be also done by including the first MAC CE and the second MAC CE (or the third MAC CE) in the same MAC PDU in Operation 2.

Operation 2: The network can send the first MAC CE to UE in order to trigger LTM cell switch to the target cell. Or the network can send the first MAC CE and the second MAC CE (or the third MAC CE) together to UE in the same MAC PDU to trigger LTM cell switch and SCell activation/deactivation.

To ease UE implementation, UE can automatically deactivate or de-configure SCells upon the reception of the first MAC CE (or upon LTM execution) or upon the reception of RRC Reconfiguration including LTM candidate configurations or upon/after the application of the target LTM candidate configuration. In another embodiment, UE can activate or deactivate or de-configure or configure SCells according to the target LTM candidate configuration (or by the second (or the third) MAC CE) for LTM execution procedure, i.e. the network can decide the state of SCells by RRC message or MAC CE. In another embodiment, UE can automatically deactivate or de-configure SCells belonging to the PTAG (i.e. the SCells with the same TA value as SpCell (Serving Cell)) upon the reception of the first MAC CE (or upon LTM execution) or upon the reception of RRC Reconfiguration including LTM candidate configurations or upon/after the application of the target LTM candidate configuration. In another embodiment, UE can deactivate or de-configure SCells belonging to the PTAG (i.e. the SCells with the same TA value as SpCell (Serving Cell)) according to the target LTM candidate configuration (or by the second (or the third) MAC CE) for LTM execution procedure, i.e. the network can decide the state of SCells by RRC message or MAC CE. In another embodiment, UE can activate or deactivate or de-configure or configure SCells according to the target LTM candidate configuration for LTM execution procedure upon the reception of the first MAC CE or upon the successful completion of LTM execution (or LTM cell switch) or upon/after the application of the target LTM candidate configuration, i.e. the network can decide the state of SCells by RRC message.

For Option 2, the network can construct MAC PDU for downlink as follows:

A MAC PDU consists of one or more MAC subPDUs. Each MAC subPDU consists of one of the following:

A MAC subheader only (including padding);

A MAC subheader and a MAC SDU;

A MAC subheader and a MAC CE;

A MAC subheader and padding.

The MAC SDUs are of variable sizes.

Each MAC subheader corresponds to either a MAC SDU, a MAC CE, or padding.

A MAC subheader except for fixed sized MAC CE, padding, and a MAC SDU containing UL CCCH consists of the header fields R/F/LCID/(eLCID)/L. A MAC subheader for fixed sized MAC CE, padding, and a MAC SDU containing UL CCCH consists of the two header fields R/LCID/(eLCID).

Figure 17:
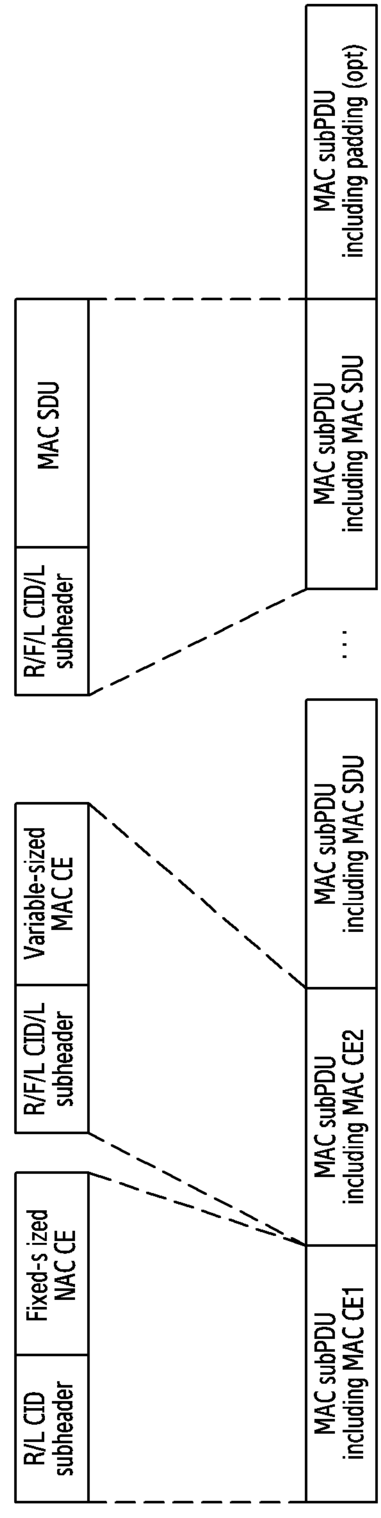
FIG. 17 illustrates an example of a Downlink (DL) MAC protocol data unit (PDU) according to an embodiment of the disclosure.

FIG. 17 illustrates an example of a DL MAC PDU according to an embodiment of the disclosure.

MAC CEs are placed together. DL MAC subPDU(s) with MAC CE(s) is placed before any MAC subPDU with MAC SDU and MAC subPDU with padding as depicted in FIG. 17.

Upon the reception of the second MAC CE (or the third MAC CE) and the first MAC CE, UE should first process (or read) the second MAC CE (or the third MAC CE) to get SCells ready for LTM cell switch by activating/deactivating SCells. And then, UE can process (or read) the first MAC CE to trigger LTM cell switch. To make UE processing easier, the order of MAC CEs is defined as the second MAC CE (or the third MAC CE) is placed before the first MAC CE.

In another embodiment, upon the reception of the first MAC CE and the second MAC CE (or the third MAC CE), UE should first process (or read) the first MAC CE to trigger LTM cell switch. And then, UE can process (or read) the second MAC CE (or third MAC CE) to activate/deactivate SCells (e.g. after the successfully completing LTM cell switch according to the above conditions). To make UE processing easier, the order of MAC CEs is defined as the first MAC CE is placed before the second MAC CE (or the third MAC CE). The second MAC CE (or the third MAC CE) may be processed upon/after the successful completion of LTM cell switch (when the above condition is met).

Figure 18:
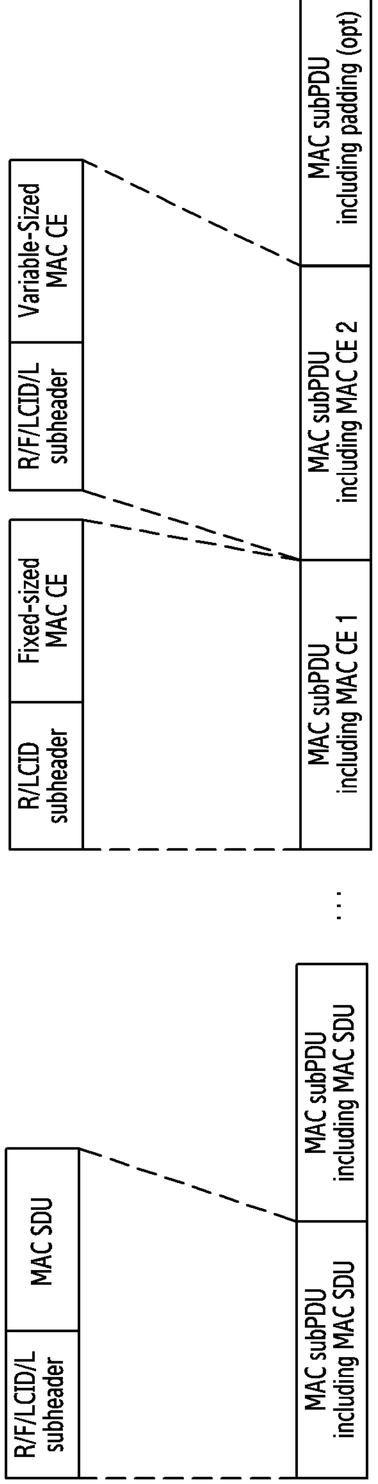
FIG. 18 illustrates an example of a UL MAC PDU according to an embodiment of the disclosure.

FIG. 18 illustrates an example of a UL MAC PDU according to an embodiment of the disclosure.

UL MAC subPDU(s) with MAC CE(s) is placed after all the MAC subPDU(s) with MAC SDU and before the MAC subPDU with padding in the MAC PDU as depicted in FIG. 18. The size of padding can be zero.

A maximum of one MAC PDU can be transmitted per TB per MAC entity.

With Option 1 or Option 2, LTM supports both intra-gNB-DU and intra-gNB-CU inter-gNB-DU mobility. LTM also supports inter-frequency mobility, including mobility to inter-frequency cell that is not a current serving cell. The following scenarios are supported:

PCell change in non-CA scenario,

PCell change without SCell change in CA scenario,

PCell change with SCell change(s) in CA scenario, including the following cases:

a) The target PCell/target SCell(s) is not a current serving cell (CA-to-CA scenario with PCell change)

b) The target PCell is a current SCell c) The target SCell is the current PCell.

The fourth MAC CE is LTM Candidate Cell TCI States Activation/Deactivation MAC CE.

The Candidate Cell TCI States Activation/Deactivation MAC CE is identified by a MAC subheader with eLCID as specified in Table 6.2.1-1b. It has a variable size consisting of one or more of following fields:

LTM candidate Configuration ID or Candidate Cell ID: This field indicates the identity of an LTM candidate Cell or LTM candidate Configuration identity for which the MAC CE applies, corresponding to the LTM candidate configuration in RRC reconfiguration. In another embodiment, this field can be replaced (or absent) by Target Configuration ID in the first MAC CE. For example, the fields in the fourth MAC CE can be applied or processed when the first MAC CE is received and the Target Configuration ID is received.

Pi: This field indicates whether each TCI codepoint has multiple TCI states or a single TCI state. If the Pi field is set to 1, the ith TCI codepoint includes the DL TCI state and the UL TCI state. If the Pi field is set to 0, the ith TCI codepoint includes only the DL/joint TCI state or the UL TCI state. The codepoint to which a TCI state is mapped is determined by its ordinal position among all the TCI state ID fields;

D/U: This field indicates whether the TCI state ID in the same octet is for a joint/downlink or an uplink TCI state. If this field is set to 1, the TCI state ID in the same octet is for joint/downlink. If this field is set to 0, the TCI state ID in the same octet is for uplink;

TCI state ID: This field indicates the TCI state identified by TCI-StateId or TCI-UL-StateId in target LTM candidate configuration. If D/U is set to 1, 7-bits length TCI state ID i.e. TCI-StateId configured in target LTM candidate configuration is used. If D/U is set to 0, the most significant bit of TCI state ID is considered as the reserved bit and remaining 6 bits indicate the TCI-UL-StateId configured in target LTM candidate configuration.

DL BWP ID: This field indicates the DL BWP that UE uses for the target LTM cell. If this field is present (or included), the MAC entity (or UE) activates the DL BWP indicated by this field for LTM execution or LTM cell switch. If this field is absent (not present or not included), the MAC entity (or UE) activates the DL BWP indicated by RRC configuration (i.e. firstActiveDownlinkBWP-Id in target LTM candidate configuration indicated by the Target Configuration ID) for LTM execution or LTM cell switch. In another embodiment, one common BWP ID (or the same BWP ID) can indicate both DL BWP ID and UL BWP ID.

UL BWP ID: This field indicates the UL BWP that UE uses for the target LTM cell. If this field is present (or included), the MAC entity (or UE) activates the DL BWP indicated by this field for LTM execution or LTM cell switch. If this field is absent (not present or not included), the MAC entity (or UE) activates the DL BWP indicated by RRC configuration (i.e. firstActiveUplinkBWP-Id in target LTM candidate configuration indicated by the Target Configuration ID) for LTM execution or LTM cell switch. In another embodiment, one common BWP ID (or the same BWP ID) can indicate both DL BWP ID and UL BWP ID.

R: Reserved bit, set to 0.

The fields in this fourth MAC CE refers to the (target LTM candidate configuration) RRC configuration indicated by the Target Configuration ID field in the first MAC CE, i.e. The fields are considered (or processed) after the UE has applied the complete (or reference) LTM candidate configuration indicated by Target Configuration ID in the first MAC CE. It does not refer to the RRC configuration in use before/upon reception of this MAC CE.

The fourth MAC CE can be placed before the first MAC CE when the MAC CEs are included in the same MAC PDU, which enables early TCI state processing. In another embodiment, the fourth MAC CE can be placed after the first MAC CE when the MAC CEs are included in the same MAC PDU, which enables fast application of the indicated LTM candidate cell configuration.

Random Access Procedure

When a Random Access procedure is initiated, UE selects a set of Random Access resources and initializes the following parameters for the Random Access procedure according to the values configured by RRC for the selected set of Random Access resources:

preambleReceivedTargetPower: initial Random Access Preamble power for 4-step RA type;

powerRampingStep: the power-ramping factor;

msgA-PreamblePowerRampingStep: the power ramping factor for MSGA preamble;

ra-PreambleIndex: Random Access Preamble;

ra-PreambleStartIndex: the starting index of Random Access Preamble(s) for on-demand SI request;

startPreambleForThisPartition: the first preamble associated with the set of Random Access Resources applicable to the Random Access procedure;

preambleTransMax: the maximum number of Random Access Preamble transmission, the Random Access procedure for TA acquisition of LTM candidate cell(s) (i.e. the Random Access procedure initiated by the PDCCH order for an LTM candidate cell) may not consider this variable. In another embodiment, this variable can be set to the minimum value, e.g. 1, in order to avoid autonomous preamble retransmission. For example, the variable (i.e. preambleTransMax) can be set to 1 when the Random Access procedure for TA acquisition of LTM candidate cell(s) is indicated or triggered or initiated (e.g. if the Random Access procedure is initiated by the PDCCH order for an LTM candidate cell). In another embodiment, the Random Access procedure for TA acquisition of LTM candidate cell(s) may consider (or set) this variable as infinity value (or zero value) in order to invalidate the variable. For example, the variable (i.e. preambleTransMax) can be set to infinity or zero value when the Random Access procedure for TA acquisition of LTM candidate cell(s) is indicated or triggered or initiated (e.g. if the Random Access procedure is initiated by the PDCCH order for an LTM candidate cell).

The following UE variables are used for the Random Access procedure:

PREAMBLE_INDEX;
PREAMBLE_TRANSMISSION_COUNTER;
PREAMBLE_TRANSMISSION_COUNTER_LTM;
PREAMBLE_POWER_RAMPING_COUNTER;
PREAMBLE_POWER_RAMPING_COUNTER_LTM;
PREAMBLE_POWER_RAMPING_STEP;
PREAMBLE_RECEIVED_TARGET_POWER;
POWER_OFFSET_2STEP_RA;
MSGA_PREAMBLE_POWER_RAMPING_STEP.

The contents of PDCCH order are as follows:

| Field (Item) | Bits | Reference |
|---|---|---|
| Identifier for DCI formats | 1 | Always set to 1, meaning this is for DL |
| Frequency domain resource assignment | Variable | All ones |
| Random access preamble index | 6 | 6 bits according to ra-PreambleIndex |
| UL/SUL indicator | 1 | For CFRA, to indicate which UL carrier in the cell to transmit the PRACH |
| SS/PBCH index | 6 | For CFRA, the field indicates the SSB that shall be used to determine the RACH occasion for the PRACH transmission |
| PRACH Mask index | 4 | For CFRA, the field indicates the RACH PDCCH order occasion associated with the SSB indicated by SS/PBCH index for the PRACH transmission |
| Indicators for Random access procedure for TA acquisition | 1 or 2 | The field indicates whether to perform preamble transmission or re-transmission for Random access procedure for TA acquisition. In another embodiment, the field indicates to perform preamble transmission of Random access procedure for TA acquisition (or Random access procedure for TA acquisition). In another embodiment, the fields indicate how many retransmission has been performed so far. For example, it can indicate the first transmission, the second retransmission, the third retransmission, or the fourth retransmission, etc. |

In this embodiment, RACH-less solution is supported (i.e. LTM cell switch without Random Access procedure) when UE performs LTM procedure (e.g. LTM execution) by the first MAC CE (i.e. LTM triggering MAC CE described earlier). In RACH-less procedure, the UE needs a valid TA to send the first UL message during LTM execution procedure (i.e. LTM cell switch). To provide the TA with early RACH procedure (i.e. PDCCH-ordered Random Access procedure before the first MAC CE), we propose PDCCH-ordered Random Access procedure without RAR (Random Access Response).

When the Random Access procedure for TA acquisition of LTM candidate cell(s) is triggered/indicated by PDCCH order (e.g. by a indication), UE performs Random Access procedure, i.e. UE transmits the preamble to PRACH (Physical Random Access Channel) resource of the indicated LTM candidate cell(s) and complete the Random Access procedure, i.e. the preamble transmission during this Random Access procedure for TA acquisition (i.e. early RACH) can be considered as this Random Access procedure is successfully completed. The preamble or the PRACH resources can be indicated by PDCCH order or (pre-) configured by RRC message (e.g. RRCReconfiguration message). To reduce the processing complexity, UE does not calculate RA-RNTI (RNTI (Radio Network Temporary Identifier) for Random Access Response) before/when the preamble is transmitted, unlike normal Random Access procedure (RACH).

In addition to this, to count the number of preamble transmission for TA acquisition of LTM candidate cell and perform a power ramping procedure based on the number, UE needs to maintain a variable called PREAMBLE_POWER_RAMPING_COUNTER. By this power ramping procedure, the more the UE sends preamble, the more power the UE transmits. However, this principle should be applied to the case when UE transmits the preamble on the same cell and the same SSB as the previous preamble, i.e. UE should increase the variable by 1 only when the preamble transmission is performed for the same preamble transmission (i.e. the same LTM candidate cell and the same SSB (Synchronization Signal Block), e.g. frequency and time domain resources considering beam) previously.

Specifically, UE should first check the target cell (e.g. whether it is for Serving cell or LTM candidate cell) and the type of preamble transmission (whether it is initial transmission or retransmission) and the selected SSB (whether it is the same SSB as the last preamble transmission or different SSB from the last preamble transmission). After this identification procedure, UE determines how to manage the variable. For example, UE set (or initialize) the PREAMBLE_POWER_RAMPING_COUNTER to 1 if the Random Access procedure is initiated by the PDCCH order to an LTM candidate cell and the PDCCH order indicates preamble initial transmission or if the Random Access procedure is initiated by the PDCCH order to an LTM candidate cell, which is different from the last Random Access Preamble transmission and the PDCCH order indicates preamble re-transmission. However, UE increments PREAMBLE_POWER_RAMPING_COUNTER by 1 if the Random Access procedure is initiated by the PDCCH order for an LTM candidate cell as preamble re-transmission and if the PDCCH order indicates the same LTM candidate cell and same SSB as the last Random Access Preamble transmission. After deciding the value of the variable, UE set the preamble transmission power (i.e. PREAMBLE_RECEIVED_TARGET_POWER) to the calculated value (i.e. preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA) by calculation based on the value of PREAMBLE_POWER_RAMPING_COUNTER−1.

After/Upon the transmission of this Random Access preamble, the UE considers this Random Access procedure completed if the Random Access Procedure is triggered by a PDCCH order for a LTM candidate cell. In the prior art, UE normally discards the configured resource for random access preamble transmission. However, the Random Access resources for early uplink synchronization (early TA acquisition procedure) may be reused for preamble retransmission indicated by PDCCH order. So, the UE should maintain it rather than discarding it. In other words, upon completion of the Random Access procedure, the UE discards the configured resource for random access preamble transmission except the Random Access Resources for the Random Access procedure (preamble (re)transmission) triggered by a PDCCH order for an LTM candidate. Specifically, upon completion of the Random Access procedure, the UE (or the MAC entity) shall discard any explicitly signaled contention-free Random Access Resources for 2-step RA type and, 4-step RA type except the 4-step RA type contention-free Random Access Resources for the Random Access Procedure triggered by a PDCCH order for an LTM candidate cell, if any. UE discards the explicitly signaled contention-free Random Access Resources for 4-step RA (Random Access) type (or 2-step RA type) for LTM candidate cell, if any, when MAC is reset. Specifically, if a reset of the MAC entity is requested by upper layers (i.e. UE performs MAC reset) or if the MAC entity receives an LTM Cell Switch Command MAC CE on a Serving Cell (i.e. UE performs MAC reset), UE discards the explicitly signaled contention-free Random Access Resources for 4-step RA (Random Access) type (or 2-step RA type) for LTM candidate cell, if any.

To enable this functionality, one of the following options can be implemented:

Option 1: In this option, the network can avoid another Random access procedure during the Random Access procedures for TA acquisition (i.e. before the successful completion of TA acquisition). The first preamble transmission for TA acquisition may not be successful and the network can request preamble retransmission for TA acquisition. In this case, the UE increments the first variable (PREAMBLE_POWER_RAMPING_COUNTER), calculates the preamble received target power, and retransmit the preamble with the higher power than the first preamble. For example, if the Random Access procedure is not initiated by the PDCCH order for an LTM candidate cell as preamble re-transmission (or if the normal Random Access procedure is initiated or if the Random Access procedure is initiated for LTM execution (i.e. LTM cell switch)), UE sets the first variable to 1. In other words, if the Random Access procedure is initiated by the PDCCH order for an LTM candidate cell as preamble transmission, i.e. first transmission (or if the normal Random Access procedure is initiated or if the Random Access procedure is initiated for LTM execution (i.e. LTM cell switch)), UE sets the first variable to 1. If the Random Access procedure is initiated by the PDCCH order for an LTM candidate cell as preamble re-transmission, UE does not set the first variable to 1. If the Random Access procedure is initiated by the PDCCH order for an LTM candidate cell as preamble re-transmission, UE increments the first variable by 1. Based on this, UE can calculate the preamble received target power, and retransmit the preamble with the higher power than the first preamble. To achieve this, the following procedure can be implemented (the same principle can be applied to other variable (e.g. PREAMBLE_TRANSMISSION_COUNTER):

(1) Random Access Procedure Initialization

When the Random Access procedure is initiated on a Serving Cell or to an LTM candidate cell (or if the Random Access procedure is initiated for LTM execution (i.e. LTM cell switch) or if the Random Access procedure is initiated for TA acquisition for an LTM candidate cell), the MAC entity shall:

1> flush the Msg3 buffer;

1> flush the MSGA buffer;

1> set the PREAMBLE_TRANSMISSION_COUNTER to 1;

1> if the Random Access procedure is initiated on a Serving Cell; or

1> if the Random Access procedure is initiated by the PDCCH order to an LTM candidate cell and the PDCCH order indicates preamble initial transmission; or 1> if the Random Access procedure is initiated by the PDCCH order to an LTM candidate cell, which is different from the last Random Access Preamble transmission, and the PDCCH order indicates preamble re-transmission:

2> set the PREAMBLE_POWER_RAMPING_COUNTER to 1;

1> if the Random Access procedure is initiated by the PDCCH order for an LTM candidate cell as preamble re-transmission; and 1> if the PDCCH order indicates the same LTM candidate cell and same SSB as the last Random Access Preamble transmission:

2> increment PREAMBLE_POWER_RAMPING_COUNTER by 1.

1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA;

(2) Random Access Preamble Transmission

The MAC entity shall, for each Random Access Preamble:

1> if PREAMBLE_TRANSMISSION_COUNTER is greater than one; and

1> if the notification of suspending power ramping counter has not been received from lower layers; and 1> if LBT failure indication was not received from lower layers for the last Random Access Preamble transmission; and 1> if SSB or CSI-RS selected is not changed from the selection in the last Random Access Preamble transmission:

2> increment PREAMBLE_POWER_RAMPING_COUNTER by 1.

1> if the Random Access procedure is initiated by the PDCCH order for an LTM candidate cell (i.e. for TA acquisition of the cell) as preamble re-transmission:

2> increment PREAMBLE_POWER_RAMPING_COUNTER by 1.

1> select the value of DELTA_PREAMBLE;

1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA;

1> except for contention-free Random Access Preamble for beam failure recovery request and Random Access Preamble for an LTM candidate cell by the PDCCH-ordered Random Access procedure (i.e. for TA acquisition of the cell), compute the RA-RNTI associated with the PRACH occasion in which the Random Access Preamble is transmitted; (UE doesn't have to compute the RA-RNTI associated with the PRACH occasion in which the Random Access Preamble is transmitted if Random Access Preamble is transmitted by PDCCH order for TA acquisition of the LTM candidate cell because the reception of RAR is not expected. However, UE computes the RA-RNTI associated with the PRACH occasion in which the Random Access Preamble is transmitted, for normal Random Access procedure or Random Access procedure for LTM execution (i.e. LTM cell switch).

1> instruct the physical layer to transmit the Random Access Preamble using the selected PRACH occasion, corresponding RA-RNTI (if available), PREAMBLE_INDEX, and PREAMBLE_RECEIVED_TARGET_POWER.

1> if the Random Access Procedure is triggered by a PDCCH order for a LTM candidate cell (i.e. for TA acquisition of the cell): (The preamble transmission during this Random Access procedure for TA acquisition (i.e. early RACH) can be considered as this Random Access procedure is successfully completed)

2> consider this Random Access procedure successfully completed (or consider this Random Access Response reception successful);

Option 2: In this option, the network can allow another Random Access procedure during the Random Access procedures for TA acquisition (i.e. before the successful completion of TA acquisition) by introducing the second variable (PREAMBLE_POWER_RAMPING_COUNTER_LTM). It can be also extended to support TA acquisition for multiple LTM candidates by having the second variable per LTM candidate cell. The first preamble transmission for TA acquisition may not be successful and the network can request preamble retransmission for TA acquisition. In this case, the UE increments the second variable, calculates the preamble received target power, and retransmit the preamble with the higher power than the first preamble. For example, if the Random Access procedure is not initiated by the PDCCH order for an LTM candidate cell as preamble re-transmission, UE sets the second variable to 1. In other words, if the Random Access procedure is initiated by the PDCCH order for an LTM candidate cell as preamble transmission, UE sets the second variable to 1. If the Random Access procedure is initiated by the PDCCH order for an LTM candidate cell as preamble re-transmission, UE does not set the second variable to 1. If the Random Access procedure is initiated by the PDCCH order for an LTM candidate cell as preamble re-transmission, UE increments the second variable by 1. Based on this, UE can calculate the preamble received target power, and retransmit the preamble with the higher power than the first preamble. However, if the normal Random Access procedure is initiated or if the Random Access procedure is initiated for LTM execution (i.e. LTM cell switch), UE sets the first variable to 1. In other words, if the normal Random Access procedure is initiated or if the Random Access procedure is initiated for LTM execution (i.e. LTM cell switch), UE sets the first variable to 1. If the Random Access procedure is initiated by the PDCCH order for an LTM candidate cell as preamble re-transmission, UE does not set the first variable to 1. if PREAMBLE_TRANSMISSION_COUNTER is greater than one; and if the notification of suspending power ramping counter has not been received from lower layers; and if LBT failure indication was not received from lower layers for the last Random Access Preamble transmission and if SSB or CSI-RS selected is not changed from the selection in the last Random Access Preamble transmission, UE increments the first variable by 1. Based on this, UE can calculate the preamble received target power, and retransmit the preamble with the higher power than the first preamble. To achieve this, the following procedure can be implemented (the same principle can be applied to other variables (e.g. PREAMBLE_TRANSMISSION_COUNTER):

(1) Random Access Procedure Initialization

When the Random Access procedure is initiated on a Serving Cell (or when the Random Access procedure is initiated for LTM execution (i.e. LTM cell switch) (and if the Random Access procedure is not initiated on a Serving Cell towards an LTM candidate cell (for TA acquisition of the LTM candidate cell by a PDCCH order including indications), the MAC entity shall:

1> flush the Msg3 buffer;

1> flush the MSGA buffer;

1> set the PREAMBLE_TRANSMISSION_COUNTER to 1;

1> set the PREAMBLE_POWER_RAMPING_COUNTER to 1;

1> set the PREAMBLE_BACKOFF to 0 ms;

When the Random Access procedure is initiated on a Serving Cell towards an LTM candidate cell (for TA acquisition of the LTM candidate cell by a PDCCH order including indications, e.g. LTM candidate cell identity, TA acquisition, preamble, PRACH resource, etc.), the MAC entity shall:

1> flush the Msg3 buffer;

1> flush the MSGA buffer;

1> set the PREAMBLE_TRANSMISSION_COUNTER_LTM to 1;

1> if the Random Access procedure is initiated on a Serving Cell; or

1> if the Random Access procedure is initiated by the PDCCH order to an LTM candidate cell and the PDCCH order indicates preamble initial transmission; or 1> if the Random Access procedure is initiated by the PDCCH order to an LTM candidate cell, which is different from the last Random Access Preamble transmission, and the PDCCH order indicates preamble re-transmission:

2> set the PREAMBLE_POWER_RAMPING_COUNTER to 1;

1> if the Random Access procedure is initiated by the PDCCH order for an LTM candidate cell as preamble re-transmission; and 1> if the PDCCH order indicates the same LTM candidate cell and same SSB as the last Random Access Preamble transmission:

2> increment PREAMBLE_POWER_RAMPING_COUNTER by 1.

1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA;

(2) Random Access Preamble Transmission

The MAC entity shall, for each Random Access Preamble:

1> if PREAMBLE_TRANSMISSION_COUNTER is greater than one; and

1> if the notification of suspending power ramping counter has not been received from lower layers; and 1> if LBT failure indication was not received from lower layers for the last Random Access Preamble transmission; and 1> if SSB or CSI-RS selected is not changed from the selection in the last Random Access Preamble transmission:

2> increment PREAMBLE_POWER_RAMPING_COUNTER by 1.

1> if the Random Access procedure is initiated by the PDCCH order for an LTM candidate cell (i.e. for TA acquisition of the cell) as preamble re-transmission:

2> increment PREAMBLE_POWER_RAMPING_COUNTER_LTM by 1 (or increment PREAMBLE_POWER_RAMPING_COUNTER_LTM for the LTM candidate cell by 1.

1> select the value of DELTA_PREAMBLE;

1> set PREAMBLE_RECEIVED_TARGET_POWER to preambleReceivedTargetPower+DELTA_PREAMBLE+(PREAMBLE_POWER_RAMPING_COUNTER_LTM−1)×PREAMBLE_POWER_RAMPING_STEP+POWER_OFFSET_2STEP_RA, if the Random Access procedure is initiated by the PDCCH order for an LTM candidate cell (i.e. for TA acquisition of the cell);

1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA if the Random Access procedure is not initiated by the PDCCH order for an LTM candidate cell (i.e. for TA acquisition of the cell);

1> except for contention-free Random Access Preamble for beam failure recovery request and Random Access Preamble for an LTM candidate cell by the PDCCH-ordered Random Access procedure (i.e. for TA acquisition of the cell), compute the RA-RNTI associated with the PRACH occasion in which the Random Access Preamble is transmitted; (UE doesn't have to compute the RA-RNTI associated with the PRACH occasion in which the Random Access Preamble is transmitted if Random Access Preamble is transmitted by PDCCH order for TA acquisition of the LTM candidate cell because the reception of RAR is not expected. However, UE computes the RA-RNTI associated with the PRACH occasion in which the Random Access Preamble is transmitted, for normal Random Access procedure or Random Access procedure for LTM execution (i.e. LTM cell switch).

1> instruct the physical layer to transmit the Random Access Preamble using the selected PRACH occasion, corresponding RA-RNTI (if available), PREAMBLE_INDEX, and PREAMBLE_RECEIVED_TARGET_POWER.

1> if the Random Access Procedure is triggered by a PDCCH order for a LTM candidate cell (i.e. for TA acquisition of the cell): (The preamble transmission during this Random Access procedure for TA acquisition (i.e. early RACH) can be considered as this Random Access procedure is successfully completed)

2> consider this Random Access procedure successfully completed (or consider this Random Access Response reception successful);

Option 3: In this option, multiple bits are introduced in PDCCH order to explicitly indicate the number of preamble (re-)transmission to UE. Specifically, when UE receives PDCCH order indicating Random Access procedure for TA acquisition of LTM candidate cell(s), the multiple bits explicitly indicate a certain value (e.g. the number of preamble (re-)transmission. In this way, the UE can determine the COUNT values of variables for Random Access procedure (e.g. PREAMBLE_POWER_RAMPING_COUNTER or PREAMBLE_TRANSMISSION_COUNTER) from the multiple bits. For example, if the PDCCH has 2 bits for this way, 00 may indicate the first preamble retransmission (i.e. the COUNT value=2), 10 may indicate the third preamble transmission (i.e. the COUNT value=4), 11 may indicate the fourth preamble transmission (i.e. the COUNT value=5). If the PDDCH doesn't include these 2 bits, then it may indicate the first preamble transmission (i.e. not retransmission). It can be extended to the cases with more bits. Such COUNT value can be determined and set to the values of variables for Random Access procedure (e.g. PREAMBLE_POWER_RAMPING_COUNTER or PREAMBLE_TRANSMISSION_COUNTER).

The contents of the PDCCH order triggering/indicating the Random Access procedure for TA acquisition of LTM candidate cell(s) (i.e. a PRACH transmission on a LTM candidate cell) can be proposed in details, e.g. how to use the bits in PDCCH DCI format to indicate the LTM candidate cell. The PDCCH order from the source cell contains the indication of candidate cell. The reserved bit(s) in DCI (Downlink Control Information) format 1_0 for PDCCH order can be used for indication of cell identity. Specifically, for a PRACH transmission by a UE triggered by a PDCCH order, the PRACH mask index field, if the value of the random access preamble index field is not zero, indicates the PRACH occasion for the PRACH transmission where the PRACH occasions are associated with the SS/PBCH block index indicated by the SS/PBCH block index field of the PDCCH order and, if any, a cell indicator field indicates a cell for the PRACH transmission. The PDCCH DCI format also includes a 1-bit field in PDCCH order explicitly indicating initial transmission or retransmission of PRACH.

Several options are possible for a cell indicator and follow one of the options to trigger a Random Access procedure on a LTM candidate cell by PDCCH order, which indicates one of LTM candidate cells configured to UE.

Option 1: In this option, the bits in PDCCH (i.e. in DCI format) indicates Cell identity or Configuration Identity configured for a LTM candidate cell in RRC configuration. It makes UE implementation very simple.

Option 2: In this option, we propose a mapping scheme between the bits in PDCCH and the Cell identity (or Configuration Identity) in RRC configuration (i.e. bitmap) to save bits in PDCCH.

For Option 2, the following bitmap structure in DCI format is provided.

A UE configured with (complete or reference) LTM configuration on the PCell or on the SpCell, the contents in PDCCH DCI format include:

a bit indicating preamble transmission or retransmission, a field indicating the Random Access procedure for TA acquisition of LTM candidate cell(s) (i.e. a PRACH transmission (or retransmission) on a LTM candidate cell) is a bitmap with size equal to a number of configured LTM candidate cells (or configurations) by RRC configuration, each bit of the bitmap corresponds to a configured LTM candidate cell (or configuration) from the number of configured LTM candidate cells (or configurations) in an ascending (or descending) order of the cell identity (or configuration identity). This mapping can be done from LSB (Least Significant Bit) or MSB (Most Significant Bit).

a bitmap, when the UE is provided a number of configured LTM candidate cells (or configurations) by RRC configuration, where the bitmap location is immediately after the bit location already used for their own purposes.

the bitmap size is equal to the number of configured LTM candidate cells (or configurations) where each bit of the bitmap corresponds to a configured LTM candidate cell (or configuration) from the number of configured LTM candidate cells (or configurations)

a '1' value (or '0' value) for a bit of the bitmap indicates a preamble transmission or re-transmission on the corresponding configured LTM candidate cell.

a '0' value (or '1' value) for a bit of the bitmap indicates no preamble transmission or re-transmission on the corresponding configured LTM candidate cell. UE can ignore this bit.

When UE detects a '1' value for a bit of the bitmap, UE is not required to detect the later bits to reduce the UE processing burden as they have '0' values, i.e. only one bit can have '1' value in the bitmap.

For preamble transmission or retransmission, the UE sets the active BWP (e.g. UL BWP) to the indicated active BWP (e.g. UL BWP) in PDCCH or the indicated active BWP (e.g. UL BWP) in RRC configuration (e.g. firstActiveBWP or firstActiveUplinkBWP or defaultBWP or defaultUplinkBWP or initialBWP or initialUplinkBWP)

A UE can be provided RRC configurations for PRACH transmission parameters, e.g. by LTM-CFRA-ToAddModList for LTM candidate cells. The UE can be triggered a PRACH transmission on a cell by a PDCCH order that the UE receives on a serving cell and includes an indication of the cell for the PRACH transmission. The UE transmits the PRACH on the cell. A UE can be provided by a MAC CE in a PDSCH reception on the serving cell, e.g. a TCI-State of uplink or downlink or both (i.e. joint UL/DL, a unified TCI state for applicable receptions or transmissions on a cell from the number of cells). The UE applies the TCI-State and/or TCI-UL-State and/or TCI-DL-State, if indicated by the MAC CE, from a first slot after the last symbol of a PUCCH or PUSCH with HARQ-ACK information for the PDSCH providing the MAC CE.

In this embodiment, the LTM procedures (e.g. LTM execution, Random Access procedure for TA acquisition of LTM candidate cell(s) (i.e. a PRACH transmission on a LTM candidate cell), etc.) is not applied (or not indicated or not performed) on dormant BWP, in order to ease UE implementation. The dormant BWP is one of downlink BWPs configured by the network via dedicated RRC signaling. In the dormant BWP, the UE stops monitoring PDCCH on/for the SCell, but continues performing CSI measurements, Automatic Gain Control (AGC) and beam management, if configured. For each serving cell other than the SpCell or PUCCH SCell or LTM candidate cells, the network may configure one BWP as a dormant BWP. For example, the network does not configure one BWP (e.g. firstActiveDownlinkBWP or initialBWP or defaultBWP) as a dormant BWP for LTM candidate cells. For example, the dormant BWP is one of the UE's dedicated BWPs configured by network via dedicated RRC signaling. The SpCell, PUCCH SCell, and LTM candidate cell cannot be configured with a dormant BWP.

During the above random access procedure for early TA acquisition (early Uplink synchronization) or LTM cell switch, if UE initiate another random access procedure, the initialization of the variables would be performed and unintended values would cause errors and wrong UE behavior. Therefore, UE should not trigger another random access procedure if there is on-going LTM cell switch. For example, for the scheduling request (SR) case, UE (the MAC entity) initiates a Random Access procedure on the SpCell and cancel the pending scheduling request only if there is no ongoing LTM cell switch (or early TA acquisition) and if the MAC entity has no valid PUCCH resource configured for the pending scheduling request.

Specifically, as long as at least one SR is pending, the MAC entity shall for each pending SR:

1> if the MAC entity has no valid PUCCH resource configured for the pending SR, and 1> if there is no ongoing LTM cell switch or no ongoing early uplink synchronization (or early TA acquisition procedure):

2> initiate a Random Access procedure on the SpCell and cancel the pending SR.

Completion of Random Access Procedure

It would be beneficial to have cross-layer interaction between MAC layer and RRC layer to make RRC layer perform RRC-specific behaviors (e.g. stop the supervisor timer for LTM execution procedure). In this reason, we propose the following behaviors:

Upon completion of the Random Access procedure, the MAC entity shall:

1> discard any explicitly signaled contention-free Random Access Resources for 2-step RA type, 4-step RA type except the 4-step RA type contention-free Random Access Resources for beam failure recovery request and the Random Access Procedure triggered by a PDCCH order for an LTM candidate cell, if any;

1> flush the HARQ buffer used for transmission of the MAC PDU in the Msg3 buffer and the MSGA buffer.

Upon successful completion of the Random Access procedure initiated for DAPS handover, the target MAC entity shall:

1> indicate the successful completion of the Random Access procedure to the upper layers.

Upon successful completion of the Random Access procedure initiated for LTM execution (or LTM cell switch or LTM execution procedure or by the reception of the first MAC CE), the MAC entity shall:

1> indicate the successful completion of the Random Access procedure (or the LTM execution procedure) to the upper layers.

Upon successful completion of the LTM execution procedure initiated for LTM execution (or LTM cell switch or by the reception of the first MAC CE), the MAC entity shall:

1> indicate the successful completion of the LTM execution procedure to the upper layers.

For RACH-based LTM execution procedure (i.e. LTM execution procedure with Random Access procedure), the UE considers that LTM execution procedure is successfully completed when the RACH is successfully completed.

For RACH-less LTM execution procedure (i.e. LTM execution procedure without Random Access procedure), the UE considers that LTM execution procedure is successfully completed when the UE determines that the network has successfully received its first UL data (e.g. by checking HARQ ACK or RLC ACK for the first UL data or the reception of C-RNTI addressed PDCCH or upon the reception of UE Contention Resolution identify MAC CE)

LTM Execution Procedure (or LTM Command)

In this embodiment, TA acquisition of candidate cell(s) before LTM cell switch command is supported as described earlier. By this, as the source cell/DU gets to know the value and the validity of candidate cell TA, it can determine whether it can initiate a RACH-less solution for LTM cell switch and then determine whether it needs to include a beam indication (e.g. TCI state) and TA information in the first MAC CE (i.e. LTM Command MAC CE) as described in Section 4.1. Therefore, the network can indicate a valid TA to the UE or indicate whether a TA is still valid in the first MAC CE. Upon the reception of the TA information indicated in LTM MAC CE, the UE can apply the TA value and start the TA timer for the target LTM candidate cell upon LTM execution (i.e. LTM cell switch) and UE can perform LTM cell switch without Random access procedure (i.e. with RACH-less solution) if TAT for the target LTM candidate cell is running (i.e. TA value is valid) or if Beam failure is not detected for the target LTM candidate cell, which means that UE can monitor PDCCH from the target LTM candidate cell or UE can use configured grants the first UL data transmission to the target cell for RACH-less LTM execution (LTM cell switch). Otherwise, UE can perform LTM execution procedure with Random Access procedure.

In this embodiment, the first MAC CE to be sent to UE can be generated by the source cell (or gNB), i.e. the MAC entity of the source cell (or gNB) generates the first MAC CE including the contents (e.g. TA value or BWP ID, Configuration Identity, etc., as described earlier) and sends it to the UE in order to trigger LTM cell switch procedure.

In another embodiment, the first MAC CE to be sent to UE can be generated by the target cell (or gNB or CU (Central Unit)), i.e. the MAC entity of the target cell (or gNB or CU (Central Unit)) generates the first MAC CE including the contents (e.g. TA value or BWP ID, Configuration Identity, etc., as described in Section 4.1) and forwards it to the source cell (or DU (Distributed Unit)) (e.g. in Xn message via Xn interface or in RRC message or in F1-AP message), and the source cell (or DU) sends it to the UE in order to trigger LTM cell switch procedure.

To maintain Uplink time alignment efficiently, one of the following proposed options for the behaviors of the MAC entity can be implemented:

RRC configures the following parameters for the maintenance of UL time alignment:

timeAlignmentTimer (per TAG) which controls how long the MAC entity considers the Serving Cells belonging to the associated TAG to be uplink time aligned;

Option 1: In this option, the Timing Advance Command value (or field) is optional (i.e. can be either present or absent) in the first MAC CE (LTM Command MAC CE). Upon the reception of the first MAC CE (LTM Command MAC CE), the corresponding MAC behavior is as follows:

The MAC entity shall:

1> if the MAC entity receives an LTM Command MAC CE on a Serving Cell:

2> indicate to upper layers that the LTM Command MAC CE is received (triggering the LTM cell switch procedure);

2> perform MAC reset;

2> indicate to upper layers the Target Configuration ID (i.e. identifier for target LTM candidate cell) included in the MAC CE;

2> if Timing Advance Command value is present (or included) or if Timing Advance Command indicates that the Timing Advance value needs to be updated or is not valid anymore or if keeping the Timing Advance or using the TA of the source cell (or Serving cell) is indicated (i.e. the LTM candidate cell indicated by Target Configuration ID (or Serving cell ID) in the first MAC CE, belongs to PTAG) or if Timing Advance Command value is not set as a special value (e.g. 000 . . . 0 or 111 . . . 1) (e.g. the value indicates RACH-less LTM candidate cell switch) of if RRC parameter indicating RACH-less LTM execution (or indicating the same value as the serving cell) is configured:

3> process the received Timing Advance Command. In another embodiment, UE can process the received Timing Advance Command if Timing Advance Command indicates that the Timing Advance value needs to be updated or is not valid anymore or if keeping the Timing Advance or using the TA of the source cell (or Serving cell) is not indicated, in order to avoid unnecessary processing;

3> when an LTM Command MAC CE including a Timing Advance Command is received (or if Timing Advance Command indicates that the Timing Advance value needs to be updated or is not valid anymore or if keeping the Timing Advance or using the TA of the source cell (or Serving cell) is not indicated):

4> apply the Timing Advance Command for the PTAG or the target LTM candidate cell (or the indicated LTM candidate cell) (i.e. UE can apply and store the Timing Advance value for the PTAG or the target LTM candidate cell);

4> start or restart the timeAlignmentTimer associated with the PTAG or the target LTM candidate cell (or the indicated LTM candidate cell); In another embodiment, UE can start or restart the timeAlignmentTimer associated with the PTAG or the target LTM candidate cell (or the indicated LTM candidate cell) only if the timeAlignmentTimer associated with PTAG or the target LTM candidate cell (or the indicated LTM candidate cell) is not running, in order to avoid unnecessary update procedure.

3> indicate to upper layers to skip the Random Access procedure for this LTM cell switch or the target LTM candidate cell (or the indicated LTM candidate cell). In another embodiment, UE can indicate to upper layers to skip the Random Access procedure for this LTM cell switch or the target LTM candidate cell (or the indicated LTM candidate cell) if TAT (timeAlignmentTimer) for the target/indicated LTM candidate cell (or PTAG) is running (i.e. TA value is valid) or if Beam failure is not detected for the target LTM candidate cell (i.e. if BFI_COUNTER<beamFailureInstanceMaxCount for the target/indicated LTM candidate cell (the number of Beam failure Indication is smaller than the maximum number for beam failure detection).

2> else (if Timing Advance Command value is absent (or not included) or if keeping the Timing Advance or using the TA of the source cell (or Serving cell) is not indicated (i.e. the LTM candidate cell indicated by Target Configuration ID (or Serving cell ID) in the first MAC CE, does not belong to PTAG) or if Timing Advance Command value is set as a special value (e.g. 000 . . . 0 or 111 . . . 1) (e.g. the value indicates RACH-based LTM candidate cell switch) or of if RRC parameter indicating RACH-less LTM execution (or indicating the same value as the serving cell) is not configured:

3> indicate to upper layers that a Random Access Procedure is needed for this LTM cell switch or the target LTM candidate cell (or the indicated LTM candidate cell) or indicate to upper layers to trigger the Random Access procedure for this LTM cell switch or the target LTM candidate cell (or the indicated LTM candidate cell); In another embodiment, UE can indicate to upper layers that a Random Access Procedure is needed for this LTM cell switch or the target LTM candidate cell (or the indicated LTM candidate cell) if TAT (timeAlignmentTimer) for the target/indicated LTM candidate cell (or PTAG) is not running (i.e. TA value is not valid) or if Beam failure is detected for the target/indicated LTM candidate cell (i.e. if BFI_COUNTER>=beamFailureInstanceMaxCount for the target/indicated LTM candidate cell (or PTAG) (the number of Beam failure Indication is larger than or equal to the maximum number for beam failure detection).

3> UE can ignore the received Timing Advance Command in order to avoid unnecessary update procedure.

2> if TCI state information is included:

3> consider the SSB corresponding to the indicated TCI state as the selected SSB for the initial uplink transmission towards the candidate cell;

3> indicate to lower layers the information regarding the TCI state information included in the LTM Command MAC CE.

Option 2: In this option, the Timing Advance Command value (or field) is always present in the first MAC CE (LTM Command MAC CE). Upon the reception of the first MAC CE (LTM Command MAC CE), the corresponding MAC behavior is as follows:

The MAC entity shall:

1> if the MAC entity receives an LTM Command MAC CE on a Serving Cell:

2> indicate to upper layers that the LTM Command MAC CE is received (triggering the LTM cell switch procedure);

2> perform MAC reset; 2> indicate to upper layers the Target Configuration ID (i.e. identifier for target LTM candidate cell) included in the MAC CE;

2> if Timing Advance Command value is not set as a special value (e.g. 000 . . . 0 or 111 . . . 1) or if Timing Advance Command indicates that the Timing Advance value needs to be updated or is not valid anymore of if RRC parameter indicating RACH-less LTM execution (or indicating the same value as the serving cell) is configured:

3> process the received Timing Advance Command;

3> when an LTM Command MAC CE including a Timing Advance Command is received:

4> apply the Timing Advance Command for the PTAG or the target LTM candidate cell (or the indicated LTM candidate cell) (i.e. UE can apply and store the Timing Advance value for the PTAG or the target LTM candidate cell);

4> start or restart the timeAlignmentTimer associated with the PTAG or the target LTM candidate cell (or the indicated LTM candidate cell); In another embodiment, UE can start or restart the timeAlignmentTimer associated with the PTAG or the target LTM candidate cell (or the indicated LTM candidate cell) only if the timeAlignmentTimer associated with PTAG or the target LTM candidate cell (or the indicated LTM candidate cell) is not running, in order to avoid unnecessary update procedure.

3> indicate to upper layers to skip the Random Access procedure for this LTM cell switch or the target LTM candidate cell (or the indicated LTM candidate cell). In another embodiment, UE can indicate to upper layers to skip the Random Access procedure for this LTM cell switch or the target LTM candidate cell (or the indicated LTM candidate cell) if TAT (timeAlignmentTimer) for the target/indicated LTM candidate cell (or PTAG) is running (i.e. TA value is valid) or if Beam failure is not detected for the target LTM candidate cell (i.e. if BFI_COUNTER<beamFailureInstanceMaxCount for the target/indicated LTM candidate cell (the number of Beam failure Indication is smaller than the maximum number for beam failure detection).

2> else (if Timing Advance Command value is set as a special value (e.g. 000 . . . 0 or 111 . . . 1)) of if RRC parameter indicating RACH-less LTM execution (or indicating the same value as the serving cell) is not configured:

3> indicate to upper layers that a Random Access Procedure is needed for this LTM cell switch or the target LTM candidate cell (or the indicated LTM candidate cell) or indicate to upper layers to trigger the Random Access procedure for this LTM cell switch or the target LTM candidate cell (or the indicated LTM candidate cell); In another embodiment, UE can indicate to upper layers that a Random Access Procedure is needed for this LTM cell switch or the target LTM candidate cell (or the indicated LTM candidate cell) if TAT (timeAlignmentTimer) for the target/indicated LTM candidate cell (or PTAG) is not running (i.e. TA value is not valid) or if Beam failure is detected for the target/indicated LTM candidate cell (i.e. if BFI_COUNTER>=beamFailureInstanceMaxCount for the target/indicated LTM candidate cell (or PTAG) (the number of Beam failure Indication is larger than or equal to the maximum number for beam failure detection).

3> UE can ignore the received Timing Advance Command in order to avoid unnecessary update procedure.

2> if TCI state information is included:

3> consider the SSB corresponding to the indicated TCI state as the selected SSB for the initial uplink transmission towards the candidate cell;

3> indicate to lower layers the information regarding the TCI state information included in the LTM Command MAC CE.

In this disclosure, alternatively, the TA value (e.g. Timing Advance Command) can be configured in each LTM candidate cell configuration in RRCReconfiguration message, and can be applied to UE or the maintenance of TAT timers.

The network may activate and deactivate the TCI states of LTM candidate cell(s) configured in RRC configuration by sending the fourth MAC CE (i.e. LTM Candidate Cell TCI States Activation/Deactivation MAC CE described in Section 4.1) To enable this, we propose several options to activate and deactivate the TCI states upon LTM execution and one of the options can be implemented:

Option 1: In this option, we can restrict the transmission for the fourth MAC CE to the transmission together with the first MAC CE (LTM Command MAC CE described in Section 4.1). For example, the network can send the fourth MAC CE together with the first MAC CE (i.e. both MAC CEs can be included in the same MAC PDU) to activate and deactivate the TCI states for LTM cell switch. If the MAC entity receives a Candidate Cell TCI States Activation/Deactivation MAC CE on a Serving Cell, it indicates to lower layers (i.e. PHY layer (Physical layer)) the information regarding the Candidate Cell TCI States Activation/Deactivation MAC CE for the indicated LTM candidate cell from the first MAC CE. If the fourth MAC CE is not received (e.g. with the first MAC CE), the MAC entity indicates to the lower layers the usage of the indicated (or configured) TCI by RRCReconfiguration for the indicated LTM candidate cell from the first MAC CE, or the lower layers uses the indicated (or configured) TCI by RRCReconfiguration for the indicated LTM candidate cell from the first MAC CE.

Option 2: In this option, we do not restrict the transmission for the fourth MAC CE, i.e. the network can send the fourth MAC CE before the transmission of the first MAC CE or regardless of the transmission of the first MAC CE (LTM Command MAC CE described in Section 4.1), in order to activate and deactivate the TCI states for LTM cell switch. However, even if the MAC entity receives a Candidate Cell TCI States Activation/Deactivation MAC CE on a Serving Cell, it indicates to lower layers (i.e. PHY layer (Physical layer)) the information regarding the Candidate Cell TCI States Activation/Deactivation MAC CE for the indicated LTM candidate cell from the first MAC CE upon the reception of the first MAC CE or upon LTM execution. If the fourth MAC CE was not received, the MAC entity indicates to the lower layers the usage of the indicated (or configured) TCI by RRCReconfiguration for the indicated LTM candidate cell from the first MAC CE or the lower layers uses the indicated (or configured) TCI by RRCReconfiguration for the indicated LTM candidate cell from the first MAC CE upon the reception of the first MAC CE or upon LTM execution.

Activation/Deactivation of SCG

RRC configures the following parameters in the beamFailureRecoveryConfig, beamFailureRecoverySpCellConfig, beamFailureRecoverySCellConfig and the radioLinkMonitoringConfig for the Beam Failure Detection and Recovery procedure:

beamFailureInstanceMaxCount for the beam failure detection (per Serving Cell or per BFD-RS set of Serving Cell configured with two BFD-RS sets);

beamFailureDetectionTimer for the beam failure detection (per Serving Cell or per BFD-RS set of Serving Cell configured with two BFD-RS sets);

beamFailureRecoveryTimer for the beam failure recovery procedure for SpCell;

The following UE variables are used for the beam failure detection procedure:

BFI_COUNTER (per Serving Cell or per BFD-RS set of Serving Cell configured with two BFD-RS sets): counter for beam failure instance indication which is initially set to 0.

The network may activate and deactivate the configured SCG.

The MAC entity shall for the configured SCG:

1> if upper layers indicate that SCG is activated:

2> if BFI_COUNTER>=beamFailureInstanceMaxCount for the PSCell or the timeAlignmentTimer associated with PTAG is not running:

3> indicate to upper layers that a Random Access Procedure is needed for SCG activation.

2> activate the SCG according to the timing.

2> (re-)initialize any suspended configured uplink grants of configured grant Type 1 associated with this PSCell according to the stored configuration, if any, and to start in the symbol according to rules;

2> apply normal SCG operation including:

3> SRS transmissions on the PSCell;

3> CSI reporting for the PSCell;

3> PDCCH monitoring on the PSCell;

3> PUCCH transmissions on the PSCell;

3> transmit on RACH on the PSCell;

3> initialize Bj for each logical channel to zero.

1> else if upper layers indicate that the SCG is deactivated:

2> deactivate all the SCells of the SCG;

2> deactivate SCG according to the timing;

2> clear any configured downlink assignment and any configured uplink grant Type 2 associated with the PSCell respectively;

2> suspend any configured uplink grant Type 1 associated with the PSCell;

2> reset MAC according to Section 4.7.

1> if the SCG is deactivated:

2> not transmit SRS on the PSCell;

2> not report CSI for the PSCell;

2> not transmit on UL-SCH on the PSCell;

2> not transmit PUCCH on the PSCell;

2> not transmit on RACH on the PSCell;

2> not monitor the PDCCH on the PSCell.

The network may activate and deactivate the configured SCG when UE is configured with dual connectivity.

Reconfiguration with Sync

The UE shall perform the following actions to execute a reconfiguration with sync.

1> if the AS security is not activated, perform the actions upon going to RRC_IDLE as specified in 5.3.11 with the release cause 'other' upon which the procedure ends;

1> stop timer T430 if running;

1> start timer T430 with the timer value set to ntn-UlSyncValidityDuration from the subframe indicated by epochTime, according to the target cell NTN-config;

1> if no DAPS bearer is configured:

2> stop timer T310 for the corresponding SpCell, if running;

1> if this procedure is executed for the MCG:

2> if timer T316 is running;

3> stop timer T316;

3> clear the information included in VarRLF-Report, if any;

2> resume MCG transmission, if suspended.

1> stop timer T312 for the corresponding SpCell, if running;

1> if sl-PathSwitchConfig is included:

2> consider the target L2 U2N Relay UE to be the one indicated by the targetRelayUE-Identity in the sl-PathSwitchConfig;

2> start timer T420 for the corresponding target L2 U2N Relay UE with the timer value set to T420, as included in the sl-PathSwitchConfig;

2> apply the value of the newUE-Identity as the C-RNTI;

2> indicate to upper layer (to trigger the PC5 unicast link establishment) with the target L2 U2N Relay UE indicated by the targetRelayUE-Identity;

2> apply the default configuration of SL-RLC1 as defined in 9.2.4 for SRB1;

1> else (sl-PathSwitchConfig is not included):

2> if this procedure is executed for the MCG or if this procedure is executed for an SCG not indicated as deactivated in the E-UTRA or NR RRC message in which the RRCReconfiguration message is embedded:

3> start timer T304 for the corresponding SpCell with the timer value set to t304, as included in the reconfigurationWithSync;

2> if the frequencyInfoDL is included:

3> consider the target SpCell to be one on the SSB frequency indicated by the frequencyInfoDL with a physical cell identity indicated by the physCellId;

2> else:

3> consider the target SpCell to be one on the SSB frequency of the source SpCell with a physical cell identity indicated by the physCellId;

2> start synchronising to the DL of the target SpCell;

2> apply the specified BCCH configuration defined in 9.1.1.1 for the target SpCell;

2> acquire the MIB of the target SpCell, which is scheduled as specified in TS 38.213 [13];

T304 expiry (Reconfiguration with sync Failure) or T420 expiry (Path switch failure)

The UE shall:

1> if T304 of the MCG expires; or

1> if T420 expires; or,

1> if the target L2 U2N Relay UE (i.e., the UE indicated by targetRelayUE-Identity in the received RRCReconfiguration message containing reconfigurationWithSync indicating path switch as specified in 5.3.5.5.2) changes its serving PCell before path switch:

2> release dedicated preambles provided in rach-ConfigDedicated if configured;

2> release dedicated msgA PUSCH resources provided in rach-ConfigDedicated if configured;

2> if any DAPS bearer is configured, and radio link failure is not detected in the source PCell, according to clause 5.3.10.3:

3> reset MAC for the target PCell and release the MAC configuration for the target PCell;

3> for each DAPS bearer:

4> release the RLC entity or entities as specified in TS 38.322 [4], clause 5.1.3, and the associated logical channel for the target PCell;

4> reconfigure the PDCP entity to release DAPS as specified in TS 38.323 [5];

3> for each SRB:

4> if the masterKeyUpdate was not received:

5> configure the PDCP entity for the source PCell with state variables continuation as specified in TS 38.323 [5];

4> release the PDCP entity for the target PCell;

4> release the RLC entity as specified in TS 38.322 [4], clause 5.1.3, and the associated logical channel for the target PCell;

4> trigger the PDCP entity for the source PCell to perform SDU discard as specified in TS 38.323 [5];

4> re-establish the RLC entity for the source PCell;

3> release the physical channel configuration for the target PCell;

3> discard the keys used in target PCell (the KgNB key, the KRRCenc key, the KRRCint key, the KUPint key and the KUPenc key), if any;

3> resume suspended SRBs in the source PCell;

3> for each non-DAPS bearer:

4> revert back to the UE configuration used for the DRB or multicast MRB in the source PCell, includes PDCP, RLC states variables, the security configuration and the data stored in transmission and reception buffers in PDCP and RLC entities;

3> revert back to the UE measurement configuration used in the source PCell;

3> store the handover failure information in VarRLF-Report as described in the clause 5.3.10.5;

3> initiate the failure information procedure as specified in clause 5.7.5 to report DAPS handover failure.

2> else:

3> revert back to the UE configuration used in the source PCell;

3> if the associated T304 was not initiated upon cell selection performed while timer T311 was running, as defined in clause 5.3.7.3:

4> store the handover failure information in VarRLF-Report as described in the clause 5.3.10.5;

3> initiate the connection re-establishment procedure as specified in clause 5.3.7.

NOTE 1: In the context above, "the UE configuration" includes state variables and parameters of each radio bearer.

1> else if T304 of a secondary cell group expires:

2> if MCG transmission is not suspended:

3> release dedicated preambles provided in rach-ConfigDedicated, if configured;

3> release dedicated msgA PUSCH resources provided in rach-ConfigDedicated, if configured;

3> initiate the SCG failure information procedure as specified in clause 5.7.3 to report SCG reconfiguration with sync failure, upon which the RRC reconfiguration procedure ends;

2> else:

3> if the UE is in NR-DC:

4> initiate the connection re-establishment procedure as specified in clause 5.3.7;

3> else (the UE is in (NG) EN-DC):

4> initiate the connection re-establishment procedure as specified in TS 36.331 [10], clause 5.3.7;

1> else if T304 expires when RRCReconfiguration is received via other RAT (HO to NR failure):

2> reset MAC;

2> perform the actions defined for this failure case as defined in the specifications applicable for the other RAT.

NOTE 2: In this clause, the term 'handover failure' has been used to refer to 'reconfiguration with sync failure'.

Maintenance of Uplink Time Alignment for MCG or SCG

The section can be applied to either MCG MAC entity or SCG MAC entity. In this disclosure, we propose timeAlignmentTimer(s) for LTM candidate cells (or a new TAG (Timing Advance Group, i.e. TAG which the LTM candidate cell (or the target LTM candidate cell) belong to) for LTM candidate cells) and its behaviors as follows:

In this embodiment, alternatively, the TA value (e.g. Timing Advance Command) can be configured in each LTM candidate cell configuration in RRCReconfiguration message, and can be applied to UE or the maintenance of TAT timers. The TA value (e.g. Timing Advance Command) can be received or configured by the first MAC CE.

RRC configures the following parameters for the maintenance of UL time alignment:

TAT (timeAlignmentTimer) (per TAG) which controls how long the MAC entity considers the Serving Cells belonging to the associated TAG to be uplink time aligned;

inactivePosSRS-TimeAlignmentTimer which controls how long the MAC entity considers the Positioning SRS transmission in RRC_INACTIVE in clause 5.26 to be uplink time aligned;

cg-SDT-TimeAlignmentTimer which controls how long the MAC entity considers the uplink transmission for CG-SDT to be uplink time aligned.

The MAC entity shall:

1> when a Timing Advance Command MAC CE is received, and if an NTA (Timing Advance value) has been maintained with the indicated TAG; or 1> when the first MAC CE is received or if an NTA (Timing Advance value) has been maintained with the indicated TAG (or indicated target LTM cell or TAG which the indicated target LTM cell belong to);

2> apply the Timing Advance Command for the indicated TAG;

2> if there is ongoing Positioning SRS Transmission in RRC_INACTIVE:

3> start or restart the inactivePosSRS-TimeAlignmentTimer associated with the indicated TAG.

2> if CG-SDT procedure triggered is ongoing:

3> start or restart the cg-SDT-TimeAlignmentTimer associated with the indicated TAG.

2> else:

3> start or restart the timeAlignmentTimer associated with the indicated TAG (or indicated target LTM cell or TAG which the indicated target LTM cell belong to).

In another embodiment, the MAC entity shall:

1> when the first MAC CE is received or if an NTA (Timing Advance value) has been maintained with the indicated TAG (or indicated target LTM cell or TAG which the indicated target LTM cell belong to);

2> apply the Timing Advance Command for the indicated TAG (or indicated target LTM cell or TAG which the indicated target LTM cell belong to);

2> start or restart the timeAlignmentTimer associated with the indicated TAG (or indicated target LTM cell or TAG which the indicated target LTM cell belong to).

1> when a Timing Advance Command MAC CE is received, and if an NTA has been maintained with the indicated TAG; or 2> apply the Timing Advance Command for the indicated TAG;

2> if there is ongoing Positioning SRS Transmission in RRC_INACTIVE:

3> start or restart the inactivePosSRS-TimeAlignmentTimer associated with the indicated TAG.

2> if CG-SDT procedure triggered is ongoing:

3> start or restart the cg-SDT-TimeAlignmentTimer associated with the indicated TAG.

2> else:

3> start or restart the timeAlignmentTimer associated with the indicated TAG.

For LTM cell switch procedure, the expiry of timeAlignmentTimer associated with the PTAG should be carefully handled. As the expiry of timeAlignmentTimer associated with the PTAG makes UE to consider all running timeAlignmentTimers as expired, the network would be difficult to indicate subsequent LTM cell switch due to the invalidity of TA of LTM candidate cells. To maintain the validity of TA of LTM candidate cells, the UE can maintain the timeAlignmentTimer(s) for LTM candidate cells (or a new TAG (Timing Advance Group, i.e. TAG which the LTM candidate cell (or the target LTM candidate cell) belong to) for LTM candidate cells) or keep them running. How to handle the expiry of timeAlignmentTimer can be proposed as follows (which can be applied to MCG MAC entity or SCG MAC entity):

1> when a timeAlignmentTimer expires:

2> if the timeAlignmentTimer is associated with the PTAG:

3> flush all HARQ buffers for all Serving Cells;

3> notify RRC to release PUCCH for all Serving Cells, if configured;

3> notify RRC to release SRS for all Serving Cells, if configured;

3> clear any configured downlink assignments and configured uplink grants;

3> clear any PUSCH resource for semi-persistent CSI reporting;

3> consider all running timeAlignmentTimers except timeAlignmentTimer(s) for LTM candidate cells (or a new TAG (Timing Advance Group, i.e. TAG which the LTM candidate cells (or the target LTM candidate cell) belong to) for LTM candidate cells) (or if LTM candidate cell configuration is configured) as expired;

3> maintain NTA (Timing Advance value) of all TAGs.

2> else if the timeAlignmentTimer is associated with an STAG, then for all Serving Cells belonging to this TAG:

3> flush all HARQ buffers;

3> notify RRC to release PUCCH, if configured;

3> notify RRC to release SRS, if configured;

3> clear any configured downlink assignments and configured uplink grants;

3> clear any PUSCH resource for semi-persistent CSI reporting;

3> maintain NTA (Timing Advance value) of this TAG.

The following relates to MAC reset.

As described above, the MAC reset can be requested or indicated by upper layer (e.g. RRC layer) upon the LTM execution or the reception of the first MAC CE or when the proposed condition for successful completion of LTM cell switch (LTM execution) is met. If the MAC reset is requested before the successful completion of LTM cell switch, the subsequent LTM cell switch or LTM execution failure (i.e. LTM cell switch failure) would be difficult to be handled because the beam failure detection or maintenance of uplink time alignment (i.e. TAT or TA value) for the PCell or LTM candidate cells or the source serving cell would be stopped by stopping all timers at MAC reset. To resolve this issue, UE can stop (if running) all timers except beamFailureDetectionTimer associated with PCell (or the source cell or serving cell or LTM candidate cells) or timeAlignmentTimers or (e.g. timeAlignmentTimer(s) for LTM candidate cell(s) or PCell or the source cell or serving cell or LTM candidate cells) in the MAC reset procedures as described below:

If a reset of the MAC entity is requested by upper layers or the reset of the MAC entity is triggered due to SCG deactivation as described in Section 4.5, the MAC entity shall:

1> if the MAC reset is not due to SCG deactivation:

2> initialize Bj for each logical channel to zero;

1> initialize SBj for each logical channel to zero if Sidelink resource allocation mode 1 is configured by RRC;

1> if upper layers indicate SCG deactivation and bfd-and-RLM with value true is configured for the deactivated SCG:

2> stop (if running) all timers except beamFailureDetectionTimer associated with PSCell and timeAlignmentTimers.

1> else if LTM execution has been triggered or LTM execution has been successfully completed or MAC rest is triggered due to LTM execution (or LTM cell switch) or LTM candidate cell configuration is configured:

2> stop (if running) all timers except beamFailureDetectionTimer associated with PCell (or SpCell or the source cell or serving cell or LTM candidate cells) or timeAlignmentTimers or (e.g. timeAlignmentTimer(s) for LTM candidate cell(s) or PCell or SpCell or the source cell or serving cell or LTM candidate cells).

1> else:

2> stop (if running) all timers, except MBS broadcast DRX timers;

2> consider all timeAlignmentTimers, inactivePosSRS-TimeAlignmentTimer, and cg-SDT-TimeAlignmentTimer, if configured, as expired and perform the corresponding actions;

1> set the NDIs for all uplink HARQ processes to the value 0;

1> sets the NDIs for all HARQ process IDs to the value 0 for monitoring PDCCH in Sidelink resource allocation mode 1;

1> stop, if any, ongoing Random Access procedure;

1> discard explicitly signaled contention-free Random Access Resources for 4-step RA type and 2-step RA type, if any;

1> flush Msg3 buffer;

1> flush MSGA buffer;

1> cancel, if any, triggered Scheduling Request procedure;

1> cancel, if any, triggered Buffer Status Reporting procedure;

1> cancel, if any, triggered Power Headroom Reporting procedure;

1> cancel, if any, triggered consistent LBT failure;

1> cancel, if any, triggered BFR;

1> cancel, if any, triggered Sidelink Buffer Status Reporting procedure;

1> cancel, if any, triggered Pre-emptive Buffer Status Reporting procedure;

1> cancel, if any, triggered Timing Advance Reporting procedure;

1> cancel, if any, triggered Recommended bit rate query procedure;

1> cancel, if any, triggered Configured uplink grant confirmation;

1> cancel, if any, triggered configured sidelink grant confirmation;

1> cancel, if any, triggered Desired Guard Symbol query;

1> cancel, if any, triggered Positioning Measurement Gap Activation/Deactivation Request procedure;

1> cancel, if any, triggered SDT procedure;

1> flush the soft buffers for all DL HARQ processes, except for the DL HARQ process being used for MBS broadcast;

1> for each DL HARQ process, except for the DL HARQ process being used for MBS broadcast, consider the next received transmission for a TB as the very first transmission;

1> release, if any, Temporary C-RNTI;

1> if upper layers indicate SCG deactivation and bfd-and-RLM with value true is not configured; or 1> if the MAC reset is not due to SCG deactivation:

2> reset all BFI_COUNTERs;

1> reset all LBT_COUNTERs.

In another embodiment, the following procedures are provided to implement that UE can stop (if running) all timers except beamFailureDetectionTimer associated with PCell (or SpCell or the source cell or serving cell or LTM candidate cells) or timeAlignmentTimers or (e.g. timeAlignmentTimer(s) for LTM candidate cell(s) or SpCell or PCell or the source cell or serving cell or LTM candidate cells) in the MAC reset procedures.

If a reset of the MAC entity is requested by upper layers or the reset of the MAC entity is triggered due to SCG deactivation as defined in Section 4.5, the MAC entity shall:

1> if the MAC reset is not due to SCG deactivation:

2> initialize Bj for each logical channel to zero;

1> initialize SBj for each logical channel to zero if Sidelink resource allocation mode 1 is configured by RRC;

1> if upper layers indicate SCG deactivation and bfd-and-RLM with value true is configured for the deactivated SCG:

2> stop (if running) all timers except beamFailureDetectionTimer associated with PSCell and timeAlignmentTimers.

1> else:

2> stop (if running) all timers, except MBS broadcast DRX timers or beamFailureDetectionTimer associated with PCell (or SpCell or the source cell or serving cell or LTM candidate cells) or timeAlignmentTimers or (e.g. timeAlignmentTimer(s) for LTM candidate cell(s) or PCell or SpCell or the source cell or serving cell or LTM candidate cells);

2> consider all timeAlignmentTimers, inactivePosSRS-TimeAlignmentTimer, and cg-SDT-TimeAlignmentTimer, if configured, as expired and perform the corresponding actions;

1> set the NDIs for all uplink HARQ processes to the value 0;

1> sets the NDIs for all HARQ process IDs to the value 0 for monitoring PDCCH in Sidelink resource allocation mode 1;

1> stop, if any, ongoing Random Access procedure;

1> discard explicitly signaled contention-free Random Access Resources for 4-step RA type and 2-step RA type, if any;

1> flush Msg3 buffer;

1> flush MSGA buffer;

1> cancel, if any, triggered Scheduling Request procedure;

1> cancel, if any, triggered Buffer Status Reporting procedure;

1> cancel, if any, triggered Power Headroom Reporting procedure;

1> cancel, if any, triggered consistent LBT failure;

1> cancel, if any, triggered BFR;

1> cancel, if any, triggered Sidelink Buffer Status Reporting procedure;

1> cancel, if any, triggered Pre-emptive Buffer Status Reporting procedure;

1> cancel, if any, triggered Timing Advance Reporting procedure;

1> cancel, if any, triggered Recommended bit rate query procedure;

1> cancel, if any, triggered Configured uplink grant confirmation;

1> cancel, if any, triggered configured sidelink grant confirmation;

1> cancel, if any, triggered Desired Guard Symbol query;

1> cancel, if any, triggered Positioning Measurement Gap Activation/Deactivation Request procedure;

1> cancel, if any, triggered SDT procedure;

1> flush the soft buffers for all DL HARQ processes, except for the DL HARQ process being used for MBS broadcast;

1> for each DL HARQ process, except for the DL HARQ process being used for MBS broadcast, consider the next received transmission for a TB as the very first transmission;

1> release, if any, Temporary C-RNTI;

1> if upper layers indicate SCG deactivation and bfd-and-RLM with value true is not configured; or 1> if the MAC reset is not due to SCG deactivation:

2> reset all BFI_COUNTERs;

1> reset all LBT_COUNTERs.

This procedures can be extended to the UE configured with dual connectivity (i.e. MCG and SCG) in order to ease subsequent LTM execution in SCG. For example, if the MAC reset is requested by upper layers (i.e. RRC layer) due to the successful completion of handover for SCG (e.g. if reconfigurationWithSync was included in spCellConfig of an SCG and when MAC of an NR cell group successfully completes a Random Access procedure triggered or the successful completion of SCG activation) or LTM execution for SCG or the successful completion of LTM execution for SCG, UE stop (if running) all timers, except MBS broadcast DRX timers or beamFailureDetectionTimer associated with PCell (or SpCell or the source cell or serving cell or LTM candidate cells) or timeAlignmentTimers or (e.g. timeAlignmentTimer(s) for LTM candidate cell(s) or PCell or SpCell or the source cell or serving cell or LTM candidate cells). However, if the MAC reset is requested by upper layers (i.e. RRC layer) due to SCG deactivation, UE stops (if running) all timers except beamFailureDetectionTimer associated with PSCell and timeAlignmentTimers, in order to monitor Radio link for the PSCell. The detailed procedures are as follows:

If a reset of the MAC entity is requested by upper layers or the reset of the MAC entity is triggered due to SCG deactivation as defined in Section 4.5, the MAC entity shall:

1> if the MAC reset is not due to SCG deactivation:

2> initialize Bj for each logical channel to zero;

1> initialize SBj for each logical channel to zero if Sidelink resource allocation mode 1 is configured by RRC;

1> if upper layers indicate SCG deactivation and bfd-and-RLM (indicator to maintain Beam failure detection (BFD) and audio link monitoring (RLM)) with value true is configured for the deactivated SCG:

2> stop (if running) all timers except beamFailureDetectionTimer associated with PSCell and timeAlignmentTimers.

1> else (e.g. if reconfigurationWithSync was included in spCellConfig of an SCG and when MAC of an NR cell group successfully completes a Random Access procedure triggered or the successful completion of SCG activation) or LTM execution for SCG or the successful completion of LTM execution for SCG):

2> stop (if running) all timers, except MBS broadcast DRX timers or beamFailureDetectionTimer associated with PCell (or SpCell or the source cell or serving cell or LTM candidate cells) or timeAlignmentTimers or (e.g. timeAlignmentTimer(s) for LTM candidate cell(s) or PCell or SpCell or the source cell or serving cell or LTM candidate cells);

2> consider all timeAlignmentTimers, inactivePosSRS-TimeAlignmentTimer, and cg-SDT-TimeAlignment-Timer, if configured, as expired and perform the corresponding actions;

1> set the NDIs for all uplink HARQ processes to the value 0;

1> sets the NDIs for all HARQ process IDs to the value 0 for monitoring PDCCH in Sidelink resource allocation mode 1;

1> stop, if any, ongoing Random Access procedure;

1> discard explicitly signaled contention-free Random Access Resources for 4-step RA type and 2-step RA type, if any;

1> flush Msg3 buffer;

1> flush MSGA buffer;

1> cancel, if any, triggered Scheduling Request procedure;

1> cancel, if any, triggered Buffer Status Reporting procedure;

1> cancel, if any, triggered Power Headroom Reporting procedure;

1> cancel, if any, triggered consistent LBT failure;

1> cancel, if any, triggered BFR;

1> cancel, if any, triggered Sidelink Buffer Status Reporting procedure;

1> cancel, if any, triggered Pre-emptive Buffer Status Reporting procedure;

1> cancel, if any, triggered Timing Advance Reporting procedure;

1> cancel, if any, triggered Recommended bit rate query procedure;

1> cancel, if any, triggered Configured uplink grant confirmation;

1> cancel, if any, triggered configured sidelink grant confirmation;

1> cancel, if any, triggered Desired Guard Symbol query;

1> cancel, if any, triggered Positioning Measurement Gap Activation/Deactivation Request procedure;

1> cancel, if any, triggered SDT procedure;

1> flush the soft buffers for all DL HARQ processes, except for the DL HARQ process being used for MBS broadcast;

1> for each DL HARQ process, except for the DL HARQ process being used for MBS broadcast, consider the next received transmission for a TB as the very first transmission;

1> release, if any, Temporary C-RNTI;

1> if upper layers indicate SCG deactivation and bfd-and-RLM with value true is not configured; or 1> if the MAC reset is not due to SCG deactivation:

2> reset all BFI_COUNTERs;

1> reset all LBT_COUNTERs.

Figure 19:
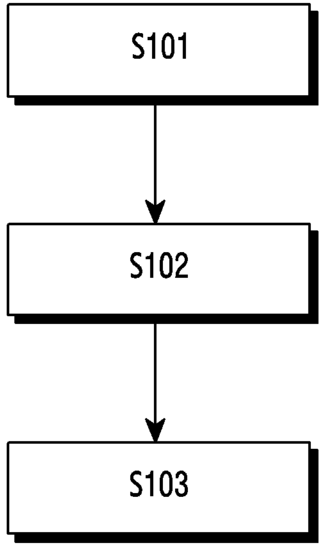
FIG. 19 illustrates a flowchart illustrating an embodiment of the disclosure.

FIG. 19 illustrates a flowchart illustrating an embodiment of the disclosure.

For completeness, FIG. 19 illustrates a flowchart illustrating an embodiment of the disclosure. At operation S101, a User Equipment, UE, performs a random access for early synchronization procedure in a telecommunication network, wherein the random access procedure is initiated on an LTM candidate cell by a PDCCH order. At operation S102, a determination is made if the PDCCH order indicates preamble initial transmission. If so, then at operation S103, the UE is prohibited from performing a certain action in connection with BWP behavior.

The certain action includes one or more of: transmitting on UL-SCH on the BWP; or monitoring PDCCH on the BWP; or monitoring the PDCCH for the BWP; or transmitting PUCCH on the BWP; or reporting CSI on the BWP; or transmitting SRS on the BWP; or receiving DL-SCH on the BWP.

A method of a User Equipment (UE) performing a random access for early synchronization procedure in a telecommunication network is provided. The random access procedure is initiated on an LTM candidate cell by a PDCCH order and if the PDCCH order indicates preamble initial transmission, then the UE is prohibited from performing a certain action in connection with BWP behavior.

The certain action is one or more of transmitting on UL-SCH on the BWP; or monitoring PDCCH on the BWP; or monitoring the PDCCH for the BWP; or transmitting PUCCH on the BWP; or reporting CSI on the BWP; or transmitting SRS on the BWP; or receiving DL-SCH on the BWP.

A power ramping variable is increased.

Apparatus arranged to perform the above method is provided.

Disclosed is a method of a User Equipment, UE, performing a random access for early synchronization procedure in a telecommunication network, wherein the random access procedure is initiated on an LTM candidate cell by a PDCCH order and if the PDCCH order indicates preamble initial transmission, then the UE is prohibited from performing certain actions in connection with BWP behavior.

Figure 20:
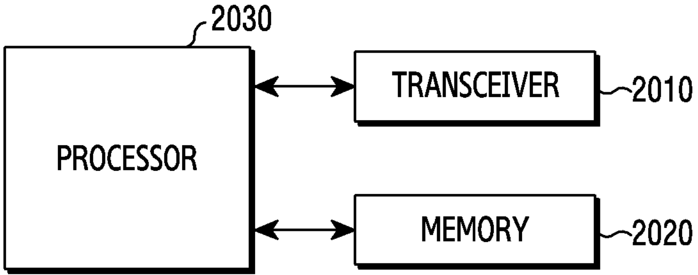
FIG. 20 illustrates a structure of a UE according to an embodiment of the disclosure.

FIG. 20 illustrates a structure of a UE according to an embodiment of the disclosure.

Referring to FIG. 20, the UE according to an embodiment may include a transceiver 2010, memory 2020, and a processor 2030. The transceiver 2010, the memory 2020, and the processor 2030 of the UE may operate according to a communication method of the UE described above. However, the components of the UE are not limited thereto. For example, the UE may include more or fewer components than those described above. In addition, the processor 2030, the transceiver 2010, and the memory 2020 may be implemented as a single chip. Also, the processor 2030 may include at least one processor. Furthermore, the UE of FIG. 20 corresponds to the UE of FIGS. 1 to 19.

The transceiver 2010 collectively refers to a UE receiver and a UE transmitter, and may transmit/receive a signal to/from a base station or a network entity. The signal transmitted or received to or from the base station or a network entity may include control information and data. The transceiver 2010 may include a RF transmitter for up-converting and amplifying a frequency of a transmitted signal, and a RF receiver for amplifying low-noise and down-converting a frequency of a received signal. However, this is only an example of the transceiver 2010 and components of the transceiver 2010 are not limited to the RF transmitter and the RF receiver.

Also, the transceiver 2010 may receive and output, to the processor 2030, a signal through a wireless channel, and transmit a signal output from the processor 2030 through the wireless channel.

The memory 2020 may store a program and data required for operations of the UE. Also, the memory 2020 may store control information or data included in a signal obtained by the UE. The memory 2020 may be a storage medium, such as read-only memory (ROM), random access memory (RAM), a hard disk, a compact disk (CD)-ROM, and a digital versatile disc (DVD), or a combination of storage media.

The processor 2030 may control a series of processes such that the UE operates as described above. For example, the transceiver 2010 may receive a data signal including a control signal transmitted by the base station or the network entity, and the processor 2030 may determine a result of receiving the control signal and the data signal transmitted by the base station or the network entity.

Figure 21:
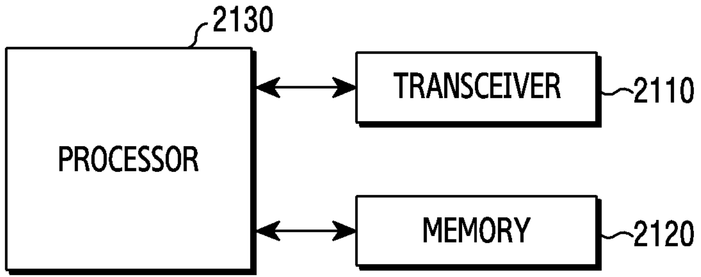
FIG. 21 illustrates a structure of a base station according to an embodiment of the disclosure of the disclosure.

FIG. 21 illustrates a structure of a base station according to an embodiment of the disclosure.

Referring to FIG. 21, the base station according to an embodiment may include a transceiver 2110, memory 2120, and a processor 2130. The transceiver 2110, the memory 2120, and the processor 2130 of the base station may operate according to a communication method of the base station described above. However, the components of the base station are not limited thereto. For example, the base station may include more or fewer components than those described above. In addition, the processor 2130, the transceiver 2110, and the memory 2120 may be implemented as a single chip. Also, the processor 2130 may include at least one processor. Furthermore, the base station of FIG. 21 corresponds to base station of FIGS. 1 to 20.

The transceiver 2110 collectively refers to a base station receiver and a base station transmitter, and may transmit/receive a signal to/from a terminal (UE) or a network entity. The signal transmitted or received to or from the terminal or a network entity may include control information and data. The transceiver 2110 may include a RF transmitter for up-converting and amplifying a frequency of a transmitted signal, and a RF receiver for amplifying low-noise and down-converting a frequency of a received signal. However, this is only an example of the transceiver 2110 and components of the transceiver 2110 are not limited to the RF transmitter and the RF receiver.

Also, the transceiver 2110 may receive and output, to the processor 2130, a signal through a wireless channel, and transmit a signal output from the processor 2130 through the wireless channel.

The memory 2120 may store a program and data required for operations of the base station. Also, the memory 2120 may store control information or data included in a signal obtained by the base station. The memory 2120 may be a storage medium, such as read-only memory (ROM), random access memory (RAM), a hard disk, a CD-ROM, and a DVD, or a combination of storage media.

The processor 2130 may control a series of processes such that the base station operates as described above. For example, the transceiver 2110 may receive a data signal including a control signal transmitted by the terminal, and the processor 2130 may determine a result of receiving the control signal and the data signal transmitted by the terminal.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:

receiving, from a base station, a physical downlink control channel (PDCCH) order for a random access procedure on a layer 1/layer 2 triggered mobility (LTM) candidate cell;

transmitting a random access preamble for an early timing advance (TA) acquisition for the LTM candidate cell, based on the PDCCH order; and receiving, from the base station, a cell switch command including a TA value of the LTM candidate cell, wherein a bandwidth part (BWP) operation is not performed for the LTM candidate cell based on the random access procedure being initiated by the PDCCH order.

2. The method of claim 1, wherein the BWP operation includes at least one of:

a transmission of an uplink-shared channel (UL-SCH) on a BWP of the LTM candidate cell, a transmission of a random access preamble on a random access channel (RACH) on the BWP, a monitoring of a PDCCH on the BWP, a transmission of a physical uplink control channel (PUCCH) on the BWP, a reporting of channel state information (CSI) on the BWP, or a reception of a downlink (DL)-SCH on the BWP.

3. The method of claim 1, further comprising:

in case that the PDCCH order indicates an initial transmission of the random access preamble, or the LTM candidate cell is different from an LTM candidate cell for a last random access preamble transmission and the PDCCH order indicates a re-transmission of the random access preamble, setting a power ramping counter of the random access preamble to 1.

4. The method of claim 3, further comprising:

in case that the random access procedure is initiated by the PDCCH order for the LTM candidate cell as the re-transmission of the random access preamble, and the PDCCH order indicates the LTM candidate and synchronization signal block (SSB) associated with the random access preamble are same as an LTM candidate associated with a last random access preamble and an SSB associated with the last random access preamble, incrementing the power ramping counter by 1.

5. The method of claim 1, further comprising:

in case that a valid physical uplink control channel (PUCCH) resource for a scheduling request (SR) and an ongoing LTM cell switch do not exist, initiating a random access procedure.

6. A method performed by a base station in a wireless communication system, the method comprising:

transmitting, to a user equipment (UE), a physical downlink control channel (PDCCH) order for a random access procedure on a layer 1/layer 2 triggered mobility (LTM) candidate cell; and transmitting, to the UE, a cell switch command including a timing advance (TA) value of the LTM candidate cell, wherein a random access preamble for an early TA acquisition for the LTM candidate cell is based on the PDCCH order, and wherein a bandwidth part (BWP) operation is not performed for the LTM candidate cell based on the random access procedure being initiated by the PDCCH order.

7. The method of claim 6, wherein the BWP operation is associated with at least one of:

an uplink-shared channel (UL-SCH) on a BWP of the LTM candidate cell, a random access preamble on a random access channel (RACH) on the BWP, a PDCCH on the BWP, a physical uplink control channel (PUCCH) on the BWP, channel state information (CSI) on the BWP, or a downlink (DL)-SCH on the BWP.

8. The method of claim 6, wherein, in case that the PDCCH order indicates an initial transmission of the random access preamble, or the LTM candidate cell is different from an LTM candidate cell for a last random access preamble transmission and the PDCCH order indicates a re-transmission of the random access preamble, a power ramping counter of the random access preamble is set to 1.

9. The method of claim 8, wherein, in case that the random access procedure is initiated by the PDCCH order for the LTM candidate cell as the re-transmission of the random access preamble, and the PDCCH order indicates the LTM candidate and synchronization signal block (SSB) associated with the random access preamble are same as an LTM candidate associated with a last random access preamble and an SSB associated with the last random access preamble, the power ramping counter is incremented by 1.

10. The method of claim 6, wherein, in case that a valid physical uplink control channel (PUCCH) resource for a scheduling request (SR) and an ongoing LTM cell switch do not exist, a random access procedure is initiated.

11. A user equipment (UE) in a wireless communication system, the UE comprising:
- a transceiver; and
- a controller coupled with the transceiver and configured to:
  - receive, from a base station, a physical downlink control channel (PDCCH) order for a random access procedure on a layer 1/layer 2 triggered mobility (LTM) candidate cell,
  - transmit a random access preamble for an early timing advance (TA) acquisition for the LTM candidate cell, based on the PDCCH order, and
  - receive, from the base station, a cell switch command including a TA value of the LTM candidate cell,
- wherein a bandwidth part (BWP) operation is not performed for the LTM candidate cell based on the random access procedure being initiated by the PDCCH order.

12. The UE of claim 11, wherein the BWP operation includes at least one of:
- a transmission of an uplink-shared channel (UL-SCH) on a BWP of the LTM candidate cell,
- a transmission of a random access preamble on a random access channel (RACH) on the BWP,
- a monitoring of a PDCCH on the BWP,
- a transmission of a physical uplink control channel (PUCCH) on the BWP,
- a reporting of channel state information (CSI) on the BWP, or
- a reception of a downlink (DL)-SCH on the BWP.

13. The UE of claim 11, wherein the controller is further configured to:
- in case that the PDCCH order indicates an initial transmission of the random access preamble, or the LTM candidate cell is different from an LTM candidate cell for a last random access preamble transmission and the PDCCH order indicates a re-transmission of the random access preamble, set a power ramping counter of the random access preamble to 1.

14. The UE of claim 13, wherein the controller is further configured to:
- in case that the random access procedure is initiated by the PDCCH order for the LTM candidate cell as the re-transmission of the random access preamble, and the PDCCH order indicates the LTM candidate and synchronization signal block (SSB) associated with the random access preamble are same as an LTM candidate associated with a last random access preamble and an SSB associated with the last random access preamble, increment the power ramping counter by 1.

15. The UE of claim 11, wherein the controller is further configured to:
- in case that a valid physical uplink control channel (PUCCH) resource for a scheduling request (SR) and an ongoing LTM cell switch do not exist, initiate a random access procedure.

16. A base station in a wireless communication system, the base station comprising:
- a transceiver; and
- a controller coupled with the transceiver and configured to:
  - transmit, to a user equipment (UE), a physical downlink control channel (PDCCH) order for a random access procedure on a layer 1/layer 2 triggered mobility (LTM) candidate cell, and
  - transmit, to the UE, a cell switch command including a timing advance (TA) value of the LTM candidate cell,
- wherein a random access preamble for an early TA acquisition for the LTM candidate cell is based on the PDCCH order, and
- wherein a bandwidth part (BWP) operation is not performed for the LTM candidate cell based on the random access procedure being initiated by the PDCCH order.

17. The base station of claim 16, wherein the BWP operation is associated with at least one of:
- an uplink-shared channel (UL-SCH) on a BWP of the LTM candidate cell,
- a random access preamble on a random access channel (RACH) on the BWP,
- a PDCCH on the BWP,
- a physical uplink control channel (PUCCH) on the BWP,
- channel state information (CSI) on the BWP, or
- a downlink (DL)-SCH on the BWP.

18. The base station of claim 16, wherein, in case that the PDCCH order indicates an initial transmission of the random access preamble, or the LTM candidate cell is different from an LTM candidate cell for a last random access preamble transmission and the PDCCH order indicates a re-transmission of the random access preamble, a power ramping counter of the random access preamble is set to 1.

19. The base station of claim 18, wherein, in case that the random access procedure is initiated by the PDCCH order for the LTM candidate cell as the re-transmission of the random access preamble, and the PDCCH order indicates the LTM candidate and synchronization signal block (SSB) associated with the random access preamble are same as an LTM candidate associated with a last random access preamble and an SSB associated with the last random access preamble, the power ramping counter is incremented by 1.

20. The base station of claim 16, wherein, in case that a valid physical uplink control channel (PUCCH) resource for a scheduling request (SR) and an ongoing LTM cell switch do not exist, a random access procedure is initiated.

* * * * *